United States Patent
Fukuda et al.

(10) Patent No.: US 6,760,322 B1
(45) Date of Patent: Jul. 6, 2004

(54) CTI CONTROL SYSTEM

(75) Inventors: Hisashi Fukuda, Kanagawa (JP); Hideaki Matsune, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/042,964

(22) Filed: Mar. 17, 1998

(30) Foreign Application Priority Data

Mar. 17, 1997 (JP) ............................................ 09-063469
Oct. 20, 1997 (JP) ............................................ 09-286330

(51) Int. Cl.[7] .............................................. M04L 12/66
(52) U.S. Cl. .................................... 370/352; 370/395.2
(58) Field of Search ................................ 370/352, 353, 370/354, 355, 356, 401, 402, 403, 405, 410, 395.2, 395.52; 709/200, 201, 203, 217, 218, 219, 227, 228, 229, 249, 250; 379/88.17, 93.01, 93.09, 93.17, 219, 220, 225, 229, 231, 234

(56) References Cited

U.S. PATENT DOCUMENTS

| | | | |
|---|---|---|---|
| 5,659,542 A | * 8/1997 | Bell et al. | 370/496 |
| 5,862,134 A | * 1/1999 | Deng | 370/352 |
| 5,940,479 A | * 8/1999 | Guy et al. | 379/93.01 |
| 5,970,126 A | * 10/1999 | Bowater et al. | 379/114 |
| 6,069,890 A | * 5/2000 | White et al. | 370/352 |
| 6,097,804 A | * 8/2000 | Gilbert et al. | 379/230 |
| 6,130,933 A | * 10/2000 | Miloslavsky | 379/90.01 |
| 6,141,345 A | * 10/2000 | Goeddel et al. | 370/389 |
| 6,163,532 A | * 12/2000 | Taguchi et al. | 370/338 |
| 6,175,564 B1 | * 1/2001 | Miloslavsky et al. | 370/352 |
| 6,243,373 B1 | * 6/2001 | Turock | 370/352 |

FOREIGN PATENT DOCUMENTS

| | | |
|---|---|---|
| DE | 42 12 102 | 11/1992 |
| GB | 2 287 610 | 9/1995 |
| JP | 57-212862 | 10/1982 |
| JP | 59-205864 | 11/1984 |
| JP | 62-245755 | 10/1987 |
| JP | 63-87064 | 4/1988 |
| JP | 3-143151 | 6/1991 |
| JP | 5-7246 | 1/1993 |
| JP | 5-75720 | 3/1993 |
| JP | 6-244960 | 9/1994 |

OTHER PUBLICATIONS

International Callback Service Nikkei Communications, Oct. 21, 1996, No. 232, Nikkei Business Publications, Inc. p. 140, col. 1, line 13 to p. 142, col. 2 line 33, Figs. 2–4.

J. Silling, "CTI, Piece By Piece", Byte US Mcgraw–Hill Inc. St. Peterborough, vol. 22, No. 2, Feb. 11, 1997, pp. 85–88, 90, XP000680522: ISSN: 0360–5280.

R. P. Swale, "Distributed Intelligence and Data in Public and Private Network", BT Technology Journal, GB, BT Laboratories, vol. 13, No. 2, Apr. 1, 1995, pp. 94–105, XP000500761, ISSN: 1358–3948.

(List continued on next page.)

*Primary Examiner*—Kwang Bin Yao
(74) *Attorney, Agent, or Firm*—Katten Muchin Zavis Rosenman

(57) ABSTRACT

When a telephone a belonging to an office a calls up a telephone b belonging to an office b, a subscriber of the telephone a operates a WS a connected to a computer network and edits camp-on request information when the telephone b is busy. The camp-on request information is transferred from the WS a to a CTI server b belonging to the office b connected to the computer network. The CTI server unit b performs camp-on control between the telephone b belonging to the office b and the telephone a belonging to the office a by controlling a private branch exchange b based on a schedule corresponding to the received camp-on request information.

37 Claims, 59 Drawing Sheets

OTHER PUBLICATIONS

A. Catchpole, et al. "Introduction to Computer Telephony Integration" British Communications Engineering, vol. 14, Part 2, Jul. 1, 1995 pp. 98–105, XP000520841, ISSN: 0262–401X.

M. Katz, "When CTI Meets the Internet", pp. 31, 33–34, 36–37, XP000770874, ISSN: 0040–2494, 1997.

P. Cronin, "An Introduction to TSAPI and Network Telephony" IEEE Communications Magazine, US IEEE Service Center, vol. 34, No. 4: Apr. 1, 1996, pp. 48–54, XP000586070, ISSN: 0163–6804.

* cited by examiner

| | |
|---|---|
| 2000 | : DESTINATION NUMBER |
| 044-123-4567 | : SOURCE TELEPHONE NUMBER |
| PUBLIC NETWORK | : TELEPHONE NETWORK TYPE (SOURCE STATION/ TOLL NETWORK/PUBLIC NETWORK) |
| ISSUE OF RESULT NOTIFICATION | : ISSUE/NON-ISSUE OF RESULT NOTIFICATION |
| 5 MINUTES | : MONITOR TIME |

FIG. 7

| | |
|---|---|
| 044-222-3333 | : DESTINATION TELEPHONE NUMBER |
| PUBLIC NETWORK | : TELEPHONE NETWORK |
| 2000 | : EXTENSION NUMBER OF DESTINATION |
| 7000-2001 | |
| TOLL NETWORK | |
| 2001 | |
| ... | |

1 INFORMATION UNIT

| | |
|---|---|
| 2000 | : DESTINATION NUMBER |
| 044-123-4567 | : SOURCE TELEPHONE NUMBER |
| SUCCESS | : RESULT (SUCCESS/FAILURE) |

FIG. 17

| |
|---|
| 044-890-1234 |
| 2001 |
| PUBLIC NETWORK |
| ISSUE OF RESULT NOTIFICATION |
| RETRIAL |
| MONITOR TIME |

: DESTINATION NUMBER

: SOURCE TELEPHONE NUMBER

: TELEPHONE NETWORK TYPE

: ISSUE/NON-ISSUE OF RESULT NOTIFICATION

: RETRIAL (CAMP-ON)/NON-RETRIAL

: MONITOR TIME DURING RETRIAL

FIG. 18

| | | | | | | |
|---|---|---|---|---|---|---|
| 2000 | 7000-2000 | 044-123-4567 | 2001 | 7000-2001 | 0 (NONE) | . . . . . |

: INTERNAL LINE
: RELAY LINE
: EXTERNAL LINE

1 INFORMATION UNIT

| | |
|---|---|
| REQUEST TYPE | : CAMP-ON REQUEST |
| REQUEST NUMBER | : OPTIONAL NUMBER FOR USE IN CONTROLLING REQUESTS |
| DESTINATION NUMBER | : DESTINATION TELEPHONE NUMBER |
| SOURCE TELEPHONE NUMBER | : SOURCE TELEPHONE NUMBER |
| TELEPHONE NETWORK TYPE | : INTERNAL LINE/TOLL NETWORK/PUBLIC NETWORK |
| MONITOR TIME | : MONITOR TIME |

| | |
|---|---|
| 03-1111-2222 | : DESTINATION NUMBER |
| PUBLIC NETWORK | : TELEPHONE NETWORK TYPE |
| 133.33.3.128 | : IP ADDRESS |
| 7000— | |
| TOLL NETWORK | |
| 166.66.200 | |
| .... | |

1 INFORMATION UNIT

| |
|---|
| RESPONSE TYPE |
| REQUEST NUMBER |
| CAMP-ON STATUS |

RESPONSE TYPE : CAMP-ON REPLY

REQUEST NUMBER : REQUEST NUMBER ACCEPTED DURING CAMP-ON REQUEST

CAMP-ON STATUS : CAMP-ON RESULT (SUCCESS/FAILURE/CANCELLATION COMPLETED)

FIG. 21

| REQUEST TYPE | : CANCELING CAMP-ON |
| --- | --- |
| REQUEST NUMBER | : REQUEST NUMBER SPECIFIED DURING CAMP-ON REQUEST |

FIG. 22

| REQUEST TYPE |
|---|
| REQUEST NUMBER |
| MONITOR TELEPHONE NUMBER |
| TELEPHONE NETWORK TYPE |
| MONITOR STATUS |

REQUEST TYPE : STARTING STATUS MONITOR

REQUEST NUMBER : OPTIONAL NUMBER FOR USE IN CONTROLLING REQUESTS

MONITOR TELEPHONE NUMBER : TELEPHONE NUMBER FOR USE IN MONITORING STATUS

TELEPHONE NETWORK TYPE : TELEPHONE NETWORK TYPE

MONITOR STATUS : MONITOR STATUS (COMBINATION OF CALL ARRIVAL/ANSWER/DISCONNECTION (PLURAL STATUSES))

FIG. 24

| |
|---|
| RESPONSE TYPE |
| REQUEST NUMBER |
| STATUS |

RESPONSE TYPE : COMPLETION OF STATUS MONITOR

REQUEST NUMBER : REQUEST NUMBER SPECIFIED AT START OF STATUS MONITOR

STATUS : DETECTED STATUS (CALL ARRIVAL/ANSWER/DISCONNECTION/FAILURE)

FIG. 25

| | |
|---|---|
| REQUEST TYPE | : COMPLETION OF STATUS MONITOR |
| REQUEST NUMBER | : REQUEST NUMBER SPECIFIED AT START OF STATUS MONITOR |

FIG. 26

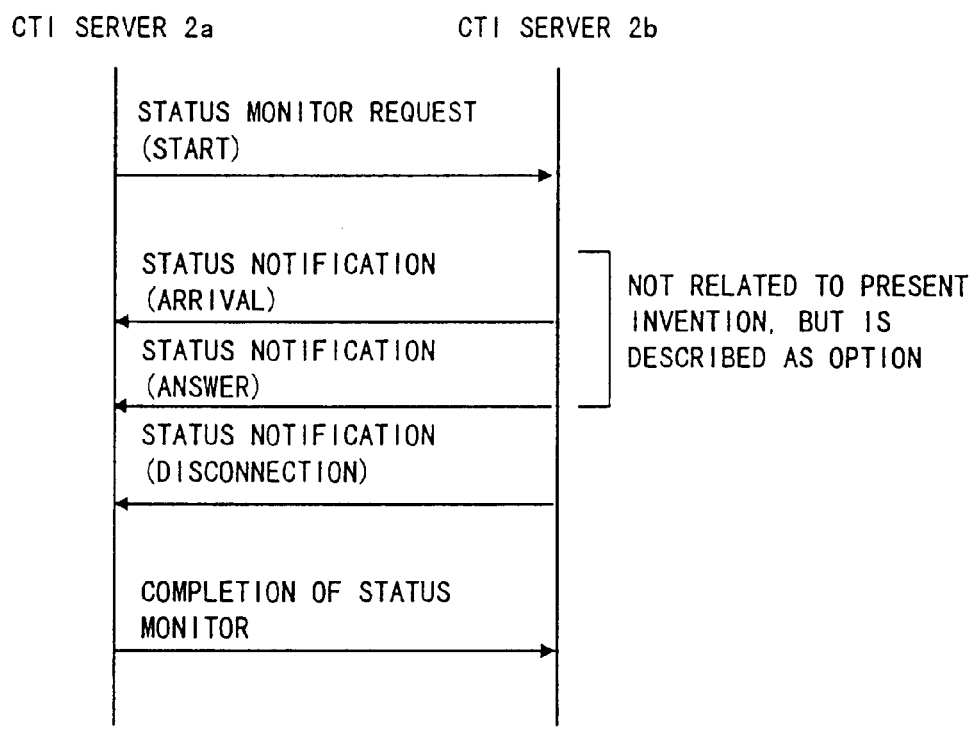
F I G. 2 7

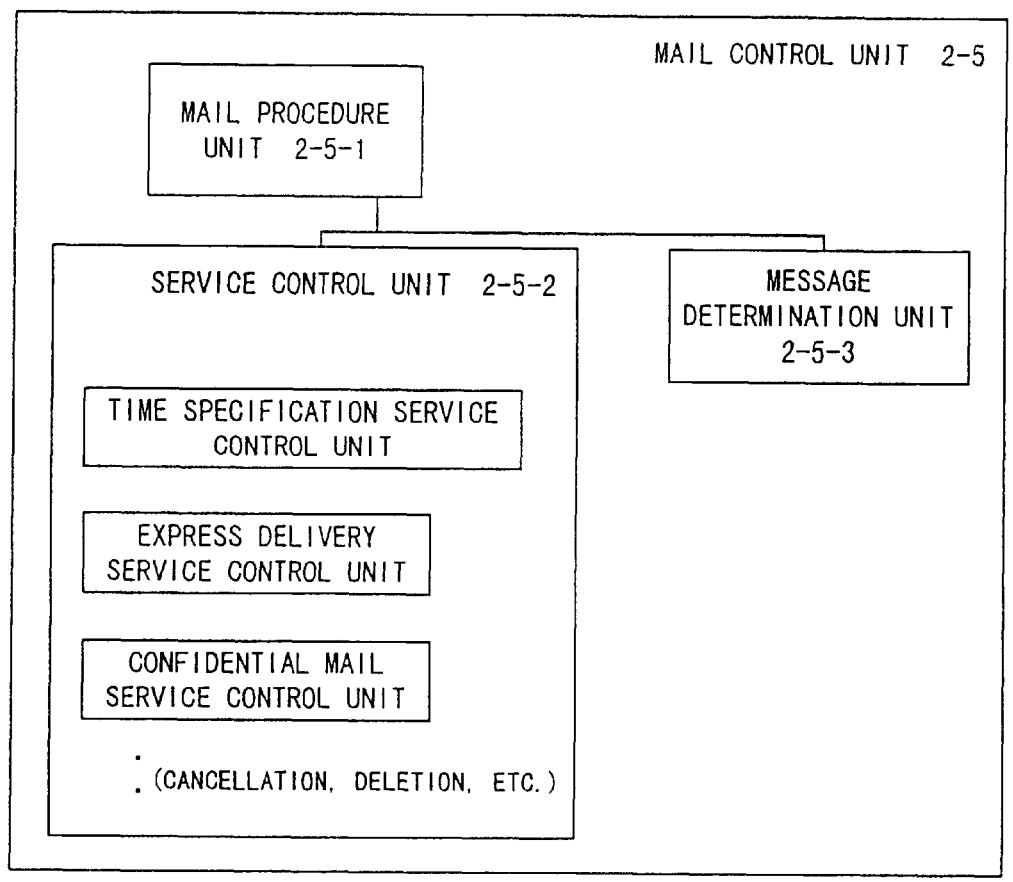
F I G. 3 1

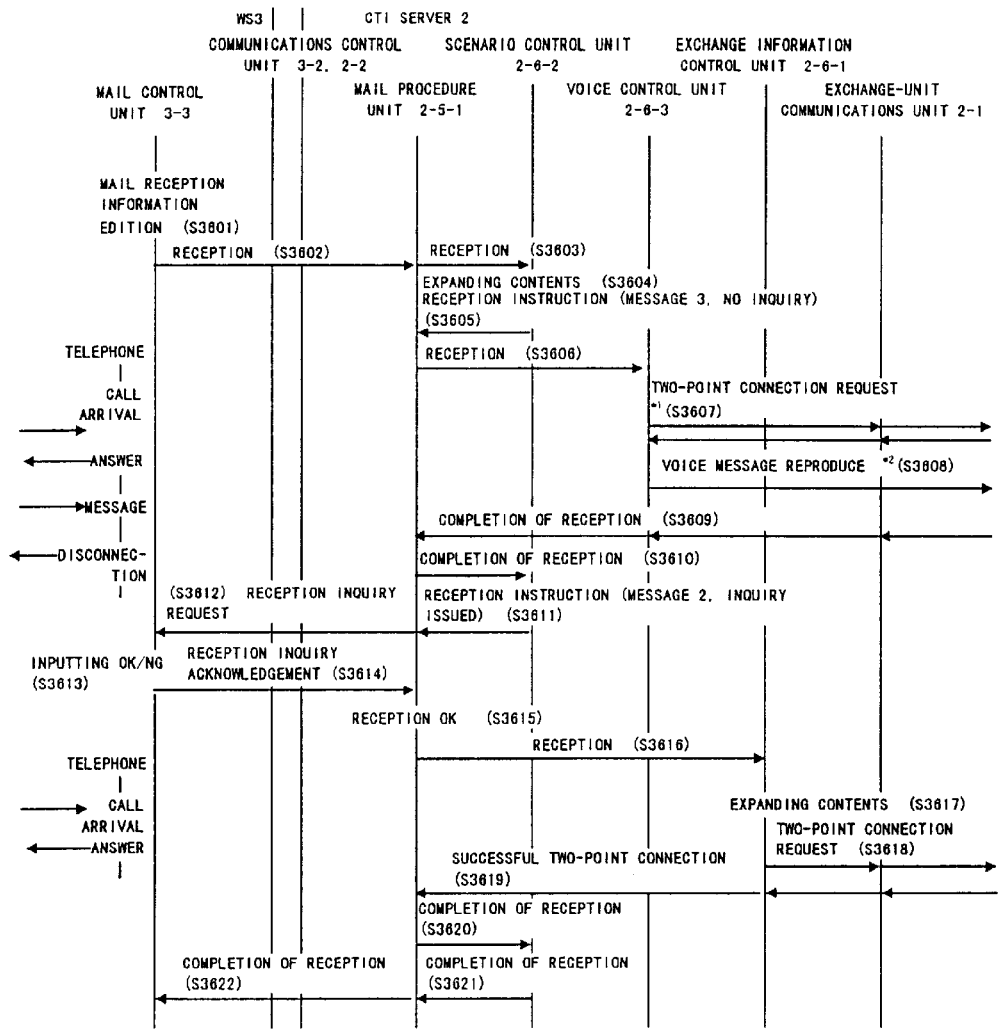
F I G. 3 6

| | | |
|---|---|---|
| tarou | : USER ID | ⎫ |
| 0 | : IP ADDRESS | ⎬ 1 INFORMATION UNIT |
| jirou | | ⎭ |
| 166.66.66.128 | | |
| hanako | | |
| 133.33.33.250 | | |
| ⋮ | | |

FIG. 38

MESSAGE 3 = VOICE MESSAGE

MESSAGE 2 = EXCHANGE INFORMATION MESSAGE

CONTENTS (MAIL INFORMATION, MEDIA TYPE = SCENARIO)

```
play  = MESSAGE 3    : RECEIVING MESSAGE 3
pause = MESSAGE 2    : INQUIRING WHETHER OR NOT MESSAGE 2 IS TO BE RECEIVED, AND DETERMINING
                       WHETHER OR NOT MESSAGE 2 IS TO BE RECEIVED AT USER INSTRUCTION
```

F I G. 4 2

MESSAGE 2 = VOICE MESSAGE

MESSAGE 3 = FAX MESSAGE

MESSAGE 4 = EXCHANGE INFORMATION MESSAGE

CONTENTS (MAIL INFORMATION, MEDIA TYPE = SCENARIO)

play = MESSAGE 2, MESSAGE 3 : RECEIVING MESSAGES 2 AND 3 SIMULTANEOUSLY *1 pause = MESSAGE 4 : INQUIRING WHETHER OR NOT MESSAGE 2 IS TO BE RECEIVED, AND DETERMINING WHETHER OR NOT MESSAGE 2 IS TO BE RECEIVED AT USER INSTRUCTION

*1 : REGENERATING FAX MESSAGE (DISPLAYING ON SCREEN OF WS) WITHOUT WAITING FOR COMPLETION OF REPRODUCTION OF VOICE MESSAGE.

SIMULTANEOUS REPRODUCTION IS POSSIBLE BECAUSE DIFFERENT MEDIA ARE USED.

FIG. 43

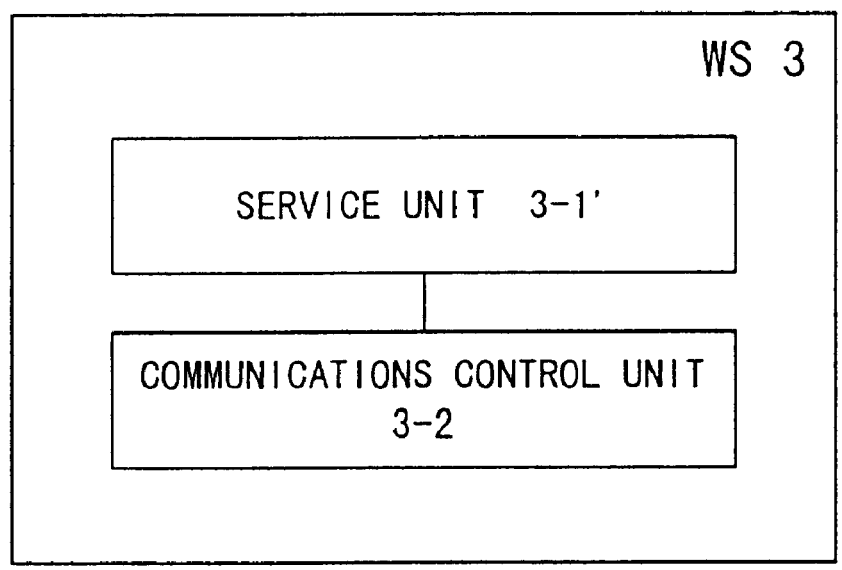
F I G. 4 6

| |
|---|
| ADDITIONAL CONNECTION |
| 044-222-3333 |
| 044-123-4567 |
| PUBLIC NETWORK |
| FUJI TSUTARO |
| RESULT NOTIFICATION |

: REQUEST TYPE

: DESTINATION NUMBER

: SOURCE TELEPHONE NUMBER (THE NUMBER TO BE ADDITIONALLY CONNECTED)

: TELEPHONE NETWORK TYPE (CURRENT STATION/TOLL NETWORK/PUBLIC NETWORK)

: NAME OF SUBSCRIBER TO BE ADDITIONALLY CONNECTED

: EXISTENSE/NON-EXISTENSE OF RESULT NOTIFICATION

| ADDITIONAL CONNECTION REQUEST | : REQUEST TYPE (ADDITIONAL CONECTION/INTERRUPTION) |
| --- | --- |
| FUJI TSUTARO | : REQUESTOR'S NAME |

SERVICE NOTIFICATION

ADDITIONAL CONNECTION REQUEST HAS BEEN RECEIVED FROM TSUTARO FUJI.

DO YOU ACCEPT?

YES    NO

F I G. 5 0

| ADDITIONAL CONNECTION REQUEST | : REQUEST TYPE (ADDITIONAL CONNECTION/INTERRUPTION) |
|---|---|
| OK | : RECEIPT RESULT |

| |
|---|
| ADDITIONAL CONNECTION |
| 044-222-3333 |
| 044-123-4567 |
| SUCCESSFUL |

REQUEST TYPE (ADDITIONAL CONNECTION/INTERRUPTION/TRANSFER ENTRY·RELEASE)

DESTINATION NUMBER/TRANSFER SOURCE NUMBER

SOURCE TELEPHONE NUMBER/TRANSFER DESTINATION NUMBER

RESULT (SUCCESS/FAILURE)

| | |
|---|---|
| INTERRUPTION | REQUEST TYPE |
| 044-222-3333 | DESTINATION NUMBER |
| 044-123-4567 | SOURCE TELEPHONE NUMBER (THE NUMBER TO INTERRUPT) |
| PUBLIC NETWORK | TELEPHONE NETWORK TYPE (CURRENT STATION/TOLL NETWORK/PUBLIC NETWORK) |
| FUJI TSUTARO | NAME OF SUBSCRIBER TO INTERRUPT |
| RESULT NOTIFICATION | EXISTENCE/NON-EXISTENCE OF RESULT NOTIFICATION |

F I G. 5 4

F I G. 57

| TRANSFER ENTRY | : REQUEST TYPE (TRANSFER ENTRY/RELEASE) |
| --- | --- |
| 2000 | : TRANSFER SOURCE NUMBER |
| 044-123-4567 | : TRANSFER DESTINATION NUMBER |
| PUBLIC NETWORK | : TELEPHONE NETWORK TYPE (CURRENT STATION/TOLL NETWORK/PUBLIC NETWORK) |

FIG. 58

| | |
|---|---|
| 2000 | : TRANSFER SOURCE NUMBER |
| 044-123-4567 | : TRANSFER DESTINATION NUMBER |
| PUBLIC NETWORK | : TELEPHONE NETWORK TYPE (CURRENT STATION/TOLL NETWORK/PUBLIC NETWORK) |
| ... | |

CTI CONTROL SYSTEM

BACKGROUND OF THE INVENTION

1. Field of the Invention

The present invention relates to the CTI technology of setting a schedule for line connection through telephone networks.

2. Description of the Related Art

With the growing popularity of the Internet and LANs (Local Area Networks), a media signal of an exchange unit such as a voice/FAX message, etc. conventionally controlled only by an exchange unit, can be communicated between a computer terminal unit and a destination terminal unit (telephone terminal unit, FAX terminal unit, etc.) in a switching network (local area switching network and public switching network) by connecting the computer terminal unit to the exchange unit through a modem and a terminal adapter connected to the computer terminal unit, or through a server unit to which the computer terminal unit is connected in a network.

Recently, a technology has been developed to communicate in real time a voice message, etc. between computer terminal units connected to the Internet, a LAN, etc., without switching networks. This technology is recognized as a new technology replacing the conventional international telephone switching network.

Furthermore, an interface between a computer and an exchange unit is being standardized, and technology called CTI (Computer Telephony Integration) for controlling the storage/reproduction of a voice/FAX message when connecting a line or through a connected line by controlling a private branch exchange, etc. using a computer terminal unit such as a personal computer, a work station, etc. is being developed.

A camp-on service can be considered a part of the conventional CTI technology.

The camp-on service enables a retrial for a communications connection based on a specified scheduling (setting a time to come back to the office, specific time, etc.) when a destination terminal unit does not answer or when the terminal units such as telephone terminal units connected to a predetermined exchange unit are busy.

Implementing the camp-on service remarkably increases the operability of telephone communications etc. in and between organizations.

However, in the conventional camp-on service, terminal units allowed to receive a service are limited to those connected to the same exchange unit, or to those belonging to a switching network connected via a private line controlled by a No.7 common line signal system, etc., and no services can be provided to terminal units connected via a public switching network such as a public telephone network, a public ISDN network, etc.

The technology of communicating between a computer terminal unit and a telephone terminal unit, etc. through a switching network, by connecting from the computer terminal unit to an exchange unit, enables the computer terminal unit to replace the conventional telephone terminal unit and FAX terminal unit, but does not realize an advanced CTI technology, for example, a camp-on service, including control of a destination terminal unit.

Furthermore, the technology of communicating a voice message, etc. in real time between computer terminal units connected to a network without an exchange unit realizes communications of a voice message, etc. through a connectionless network, which is quite different from a line switching network connected by an exchange unit, and belongs to a category different from the CTI technology for realizing a high-performance line switching network through an exchange unit.

Additionally, the CTI technology of controlling an exchange unit such as a private branch exchange, etc. using a computer terminal unit such as a personal computer, a work station, etc., has recently been standardized and high-level services from this technology are being prepared.

SUMMARY OF THE INVENTION

The present invention has been developed under the above described background and aims at realizing CTI covering a large line switching network independent of a type of a telephone network.

The present invention is based on the CTI control system to implement the CTI control for controlling the connection of an exchange line terminated by an exchange unit.

The first aspect of the present invention includes the following configuration.

First, a CTI client unit (WS 3) transmits CTI control request information (camp-on request information) through which CTI control is requested.

A CTI server unit (CTI server 2) is connected to a computer network (computer network 5) accessible by the CTI client unit, receives CTI control request information from the CTI client unit, and executes CTI control on an exchange unit (private branch exchange 1) based on the CTI control request information.

With the above described configuration according to the first aspect of the present invention, CTI control can be realized between offices connected through, for example, a public telephone network, if it is possible to access the CTI server unit from the CTI client unit through a computer network such as the Internet, etc., and if an exchange unit is located within a range in which a call can be issued. Thus, CTI control can be realized over a large line switching network regardless of the type of telephone network.

The second aspect of the present invention includes the following configuration.

First, a CTI client unit (WS 3) transmits CTI control request information (telephone connection request information) through which CTI control is requested.

A CTI server unit (a CTI server 2*a*, for example, etc.) is connected to a computer network (computer network 5) accessible by the CTI client unit, receives CTI control request information from the CTI client unit in an area under control of the CTI server unit, and executes CTI control on an exchange unit (private branch exchange 1*a*, etc.) according to the CTI control request information if the CTI control request information is to be processed by the CTI server unit. If the CTI control request information is not to be processed by the CTI server unit, it transfers the CTI control request information (camp-on request information) to another CTI server unit (CTI server 2*b*, etc.) which is to process the CTI control request information.

In this case, the present invention further includes a CTI database unit (CTIDB 2-4) for storing a host address information of the CTI server unit in a computer network which is to process, for each destination number, the CTI control request information containing a destination number. The CTI server unit can be designed such that, when the CTI control request information is not to be processed by the CTI server unit itself, the CTI server unit can obtain host address information corresponding to another CTI server unit which is to process the CTI control request information by accessing the CTI database unit, based on the destination number contained in the CTI control request information, and transmit the CTI control request information using the host address information as the destination.

With the above described configuration according to the second aspect of the present invention in addition to the configuration according to the first aspect of the present invention, the required CTI server unit can execute the CTI control according to the destination number, etc. set in the CTI control request information, thereby automatically distinguishing, for example, the CTI control within an office from the CTI control between two offices, that is, realizing flexible and extended CTI control. Since the CTI database unit is referred to according to the destination number set in the CTI control request information, the required CTI server unit corresponding to each CTI control request information can be efficiently determined.

With the configuration according to the above described first and second aspects of the present invention, the CTI server unit can be designed to include the following configuration.

That is, the CTI server unit first includes a first communications control unit (communications control unit 2-2) for communicating the CTI control request information and information related to the CTI control request information between the CTI server unit and the CTI client unit through a computer network.

Then, the CTI server unit includes a CTI control execution unit (camp-on control unit 2-3) for receiving the CTI control request information from the CTI client unit through the computer network and the first communications control unit, generating exchange request information for use in requesting an exchange unit for CTI control according to the CTI control request information, and executing the CTI control on the exchange unit according to the information.

Then, the CTI server unit further includes an exchange-unit communications unit (exchange-unit communications unit 2-1) for communicating between the CTI server unit and an exchange unit the exchange request information transmitted from the CTI control execution unit and information related to the exchange request information.

With the above described configuration according to the first or second aspect of the present invention, the CTI client unit can be designed to include the following configuration.

That is, the CTI client unit first includes a CTI control request information editing unit (camp-on request unit 3-1) for editing CTI control request information for use in requesting CTI control.

Then, the CTI client unit includes a second communications control unit (communications control unit 3-2) for communicating the CTI control request information and information related to the CTI control request information between the CTI client unit and the CTI server unit through a computer network.

Furthermore, with the above described configuration according to the first or second aspect of the present invention, the CTI control request information can be designed to include information specifying the issue/non-issue of a result notification and information specifying a monitor time, etc., and the CTI server unit can be designed to return to the CTI client unit a notification as to whether or not the CTI control has successfully been executed within a monitor time set in the CTI control request information, if the information specifying the issue of the result notification is set in the CTI control request information.

Thus, by setting the information specifying the issue/non-issue of a result notification and the information specifying a monitor time, the CTI control can be executed and the control result can be checked more efficiently and flexibly.

The third aspect of the present invention includes the following configuration.

First, the CTI client unit (WS 3a1, etc.) transmits electronic mail including exchange information for use in requesting the CTI control.

Then, the CTI server unit (CTI server 2a, etc.) is connected to a computer network (computer network 5) accessible by the CTI client unit, receives electronic mail containing exchange information from the CTI client unit, and executes the CTI control on the exchange unit (private branch exchange 1a, etc.) according to the exchange information contained in the electronic mail.

With the above described configuration according to the third aspect of the present invention, the CTI client unit, even if it is a simple portable information terminal unit, etc. equipped with the function of at least sending electronic mail, can execute CTI control over a large line switching network regardless of the type of telephone network by sending electronic mail including the exchange information to the CTI server unit through a computer network such as the Internet, etc. Additionally, a line exchange terminal unit having the function of controlling the CTI can be easily realized by, for example, combining the function of the CTI client unit according to the present invention with the function of a portable telephone, etc. such as a PHS terminal unit, etc.

The fourth aspect of the present invention includes the following configuration.

First, the CTI client unit (WS 3a) transmits electronic mail including exchange information for use in requesting CTI control.

The CTI server unit (CTI server 2a) is connected to a computer network (computer network 5) accessible by the CTI client unit, receives electronic mail containing exchange information from the CTI client unit in an area under control of the CTI server unit. When the electronic mail is to be processed by the CTI server unit 2a, it executes the CTI control on an exchange unit according to the exchange information contained in the electronic mail. When the electronic mail is not to be processed by the CTI server unit 2a, it transfers the electronic mail to another CTI server unit (CTI server 2b, etc.) which is to process the electronic mail.

In this case, the present invention further includes a destination database unit (destination DB 2-9) for storing host address information of the CTI server unit in the computer network which should process, for each electronic mail destination address, the electronic mail assigned an electronic mail destination address. The CTI server unit can be designed such that, when the electronic mail is not to be process by itself, it can obtain host address information corresponding to another CTI server unit which is to process the electronic mail by accessing a destination database unit based on the electronic mail destination address contained in the electronic mail, and can transmit the electronic mail to a destination according to the host address information.

With the above described configuration according to the fourth aspect of the present invention, the effect of the above described configuration according to the second aspect of the present invention can be added to the effect of the above described configuration according to the third aspect of the present invention.

With the configuration according to the third or fourth aspect of the present invention, the CTI server unit can be designed to include the following configuration.

That is, the CTI server unit first includes a first communications control unit (communications control unit 2-2) for communicating electronic mail containing exchange information with the CTI client unit through a computer network.

Then, the CTI server unit includes a CTI control execution unit (a mail control unit, a media control unit 2-6, and a mailbox delivery control unit 2-7) for receiving the electronic mail containing the exchange information from the CTI client unit through the computer network and the first communications control unit, generating exchange request information for use in requesting an exchange unit to perform CTI control according to the exchange information contained in the electronic mail, and executing CTI control on the exchange unit based on the generated exchange request information.

Then, the CTI server unit includes an exchange-unit communications unit (exchange-unit communications unit 2-1) for communicating exchange request information transmitted from the CTI control execution unit and information related to the exchange request information with an exchange unit.

Furthermore, with the configuration according to the third or fourth aspect of the present invention, the CTI client unit can be designed to include the following configuration.

That is, the CTI client unit first includes an electronic mail editing unit (mail control unit 3-3) for editing electronic mail containing exchange information for use in requesting CTI control.

Then, the CTI client unit includes a second communications control unit (communications control unit 3-2) for communicating electronic mail containing exchange information with the CTI server unit through a computer network.

With the above described configuration according to the third or fourth aspect of the present invention, the exchange information can be designed to contain information specifying the issue/non-issue of a result notification and information specifying a monitor time, and the CTI server unit can be designed to return to the CTI client unit the electronic mail containing a notification as to whether or not the CTI control has been successfully performed within the monitor time set in the exchange information, if the information specifying the issue of result notification is set in the exchange information.

Thus, by setting the information specifying the issue/non-issue of a result notification and the information specifying a monitor time, the CTI control can be executed and the control result can be checked more efficiently and flexibly using the electronic mail.

With the above described configuration according to the third or fourth aspect of the present invention, the following configuration can be adopted.

That is, the present invention includes a selection unit (set by data contained in an execution trigger field) for use in selecting, as a trigger for the execution of CTI control based on the exchange information contained in electronic mail, either a user reception time when a user corresponding to the electronic mail destination address contained in the electronic mail receives the electronic mail, or a system recognition time when the CTI server unit receives the electronic mail.

If the selection unit selects the user reception time, the CTI server unit delivers the electronic mail to the mailbox (mailbox 2-8) of the user corresponding to the electronic mail destination address contained in the electronic mail, when the CTI server unit receives the electronic mail containing exchange information, and executes the CTI control on an exchange unit based on the exchange information contained in the electronic mail when the user receives the electronic mail.

If the selection unit selects the system recognition time, the CTI server unit executes the CTI control on an exchange unit according to the exchange information contained in the electronic mail when the CTI server unit receives the electronic mail containing exchange information from the CTI client unit.

Thus, the CTI control can be performed to meet the needs of a user by setting the function of selecting an execution trigger of the CTI control using electronic mail.

With the above described configuration according to the third or fourth aspect of the present invention, electronic mail can contain message information about one or more media in addition to the exchange information, and the CTI server unit can be designed to further include one or more media control units (a voice control unit 2-6-3 and a FAX control unit 2-6-4) for processing a message of each medium contained in the electronic mail.

In this case, the electronic mail can contain scenario information specifying the process timing and process type for the exchange information and the message information about one or more media contained in the electronic mail, and the CTI server unit can be designed to process the exchange information and the message information about one or more media contained in the electronic mail according to the scenario information (scenario control unit 2-6-2) contained in the electronic mail.

Thus, by the electronic mail containing exchange information and message information about one or more media, and by specifying using the scenario information the process timing and the process type for the exchange information and the message information about one or more media, a message can be effectively transmitted through simple CTI control via electronic mail.

Additionally, with the above described configuration according to the third or fourth aspect of the present invention, the CTI server unit can be designed to further include a process timing control unit for controlling the process timing of electronic mail.

Thus, CTI control can be performed to meet the needs of a user by setting the function of controlling the process timing of electronic mail in performing CTI control by electronic mail.

With the above described configuration according to the first through fourth aspects of the present invention, CTI control refers to, for example, a two-point connection control for connecting through an exchange unit a source terminal unit which can issue a call with a destination terminal unit. This two-point connection control is periodically executed until, for example, a destination terminal unit answers. Otherwise, the two-point connection control is executed by, for example, waiting for a call release notification indicating that a destination terminal unit enters a ready state.

Thus, according to the present invention, a concrete camp-on service of performing the two-point connection control can be efficiently realized.

The fifth aspect of the present invention is realized as a CTI server having the following configuration based on the first or second aspect of the present invention.

First, the CTI control request information is additional connection request information to request an additional connection for the communications which have already been connected.

The CTI server unit first comprises an extension terminating unit (voice board 2-11) for terminating two or more extensions (voice board extensions 7-1 and 7-2) connected to an exchange unit.

The CTI server unit further comprises an additional connection control unit (service control unit 2-3' and voice board control unit 2-10) for receiving additional connection request information from the CTI client unit through a computer network, requesting an exchange unit to connect a first extension (voice board extension 7b-1) which is one of optional extensions to the communications which have already been connected according to the additional connection request information, requesting an exchange unit to connect a second extension (voice board extension 7b-2) which is another optional extension to a terminal unit (telephone 4a) specified by the additional connection request information, and requesting an extension terminating unit to connect the first and second extensions.

The sixth aspect of the present invention is realized as a CTI server having the following configuration based on the first or second aspect of the present invention.

First, the CTI control request information is interruptive connection request information for use in requesting an interruptive connection by holding one terminal unit which establishes communications which have already been connected.

The CTI server unit first comprises an extension terminating unit (voice board 2-11) for terminating two or more extensions (voice board extensions 7-1 and 7-2) connected to the exchange unit.

The CTI server unit further comprises an interruptive connection control unit (service control unit 2-3' and voice board control unit 2-10) for receiving interruptive connection request information from the CTI client unit through a computer network, requesting an exchange unit to connect a first extension (voice board extension 7b-1) which is one of optional extensions described above to the communications which have already been connected according to the interruptive connection request information, and requesting an exchange to hold the terminal unit (telephone 4b-2) currently establishing communications, and further requesting an exchange unit to connect a second extension (voice board extension 7b-2) which is another optional extension described above to a terminal unit (telephone 4a) specified by the interruptive connection request information, and requesting an extension terminating unit to connect the first and second extensions.

The seventh aspect of the present invention is realized as a CTI server having the following configuration based on the first or second aspect of the present invention.

First, the CTI control request information is transfer control request information (transfer entry request information and transfer release request information) for use in requesting an entry or release of call transfer to an optional destination terminal unit.

The CTI server unit first comprises an extension terminating unit (a voice board 2-11) for terminating two or more extensions (voice board extensions 7-1 and 7-2) connected to an exchange unit.

Next, the CTI server unit further comprises a transfer control unit (service control unit 2-3', voice board control unit 2-10, and transfer management data 2-12) for entering or releasing transfer control information to an optional destination terminal unit (telephone 4b-1) according to the transfer control request information when receiving the transfer control request information from the CTI client unit through a computer network, instructing an exchange unit according to the transfer control request information to output a destination specification request for an instruction about the destination when a call is issued to an optional destination terminal unit described above, indicating as a call destination the first extension (voice board extension 7b-1), which is one of the optional extensions, to the exchange unit when the destination specification request is output from the exchange unit, instructing the exchange unit to connect the second extension (voice board extension 7b-2), which is another one of the optional extensions, to a terminal unit (telephone 4c) specified by the transfer control request information, and instructing the extension terminating unit to connect the first and second extensions.

With the configurations according to the above described fifth, sixth, and seventh aspects, an additional/interruptive connection service or an arrival transfer service can be realized for 3-person-communications under the flexible and wide-scope CTI control covering a wide-area circuit switching network independent of the type of telephone network which is an important feature of the first and second aspects of the present invention.

Furthermore, with the above described configuration according to the first through seventh aspects of the present invention, the source terminal unit and the destination terminal unit communicate with each other through, for example, an exchange unit and a switching network (telephone network 6) to which the exchange unit is connected. Otherwise, a source terminal unit and a destination terminal unit are connected to an exchange unit, and communicate with each other through an extension network controlled by the exchange unit.

The CTI server unit, the CTI client unit, and the exchange unit are individually included in the scope of the present invention.

BRIEF DESCRIPTION OF THE DRAWINGS

Other objects and features of the present invention are easily understood by one of ordinary skill in the art through the attached drawings and preferred embodiments of the present invention.

FIG. 7 shows an example of the configuration of the data of camp-on request information according to the first preferred embodiment of the present invention;

FIG. 8 shows an example of the configuration of the phone number conversion data;

FIG. 9 shows an example of the configuration of the data of camp-on result notification information;

FIG. 17 shows an example of the configuration of the data of telephone connection request information;

FIG. 18 shows an example of the configuration of the data of the internal/external line conversion DB;

FIG. 19 shows an example of the configuration of the data of camp-on request information according to the second preferred embodiment of the present invention;

FIG. 20 shows an example of the configuration of the data of the CTIDB;

FIG. 21 shows an example of the configuration of the data of camp-on answer information;

FIG. 22 shows an example of the configuration of the data of camp-on cancel information;

FIG. 24 shows an example of the configuration of the data of status monitor request information;

FIG. 25 shows an example of the configuration of the data of status notification information;

FIG. 26 shows an example of the configuration of the data of status monitor termination information;

FIG. 27 shows the outline of the sequence of status monitor control;

FIG. 31 shows the configuration of the mail control unit;

FIG. 36 shows the sequence (3) of the operations according to the third preferred embodiment of the present invention;

FIG. 38 shows an example of the configuration of the data of the destination DB;

FIG. 42 shows a practical example (1) of scenario data;

FIG. 43 shows a practical example (2) of scenario data;

FIG. 46 shows the configuration of the WS according to the fourth, fifth, and sixth preferred embodiments of the present invention;

FIG. 48 shows an example of the configuration of data in the additional connection request information;

FIG. 49 shows an example of the configuration of data of service notification information to the WS;

FIG. 50 shows an example of a service notification screen displayed on the WS;

FIG. 51 shows an example of the data configuration of service response information from the WS;

FIG. 52 shows an example of the data configuration of result notification information;

FIG. 54 shows an example of data configuration of interruption request information;

FIG. 57 shows an example of data configuration of transfer entry/release information;

FIG. 58 shows an example of the configuration of transfer management data; and

DESCRIPTION OF THE PREFERRED EMBODIMENTS

The preferred embodiments of the present invention are described in detail by referring to the attached drawings.

First Preferred Embodiment

Figure 1:
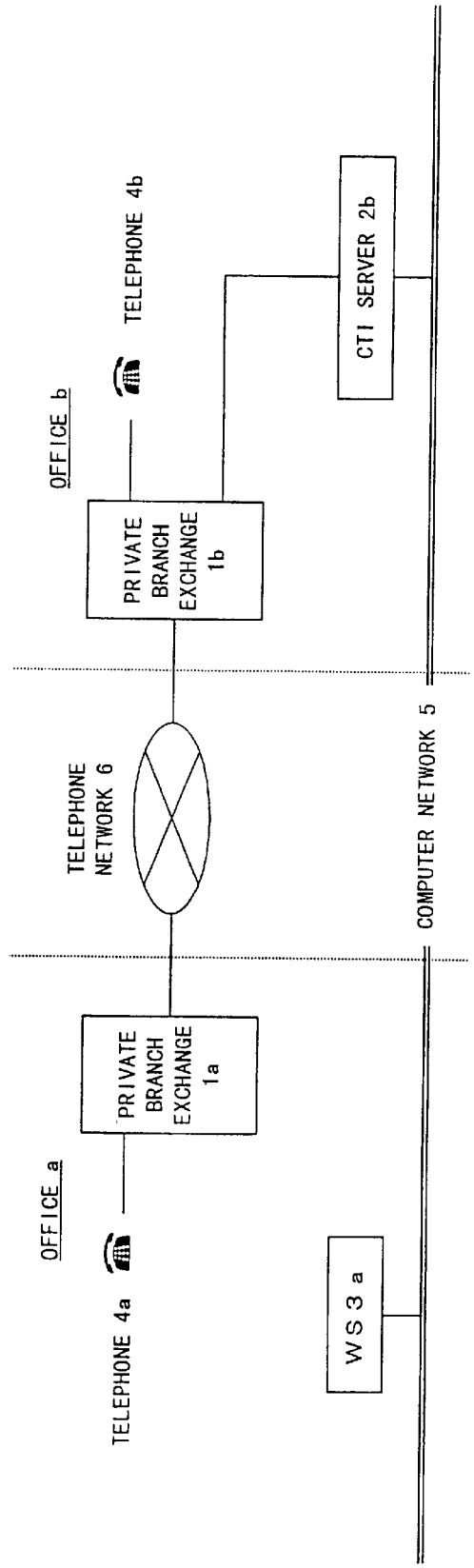
FIG. 1 shows the configuration of the system according to the first preferred embodiment of the present invention.

FIG. 1 shows the configuration of the system according to the first preferred embodiment of the present invention.

According to the first preferred embodiment, a telephone 4a belonging to an office a is connected to the telephone network 6 which is a public network through a private branch exchange 1a, while a telephone 4b belonging to an office b is connected to the telephone network 6 through a private branch exchange 1b. Thus, a subscriber of the telephone 4a belonging to the office a and a subscriber of the telephone 4b belonging to the office b can directly communicate with each other through the telephone network 6.

The office a and the office b are also interconnected through the computer network 5.

The computer network 5 is established between the office a and the office b, and is structured by a LAN (Local Area Network) including the interconnection via a private line or an ISDN line. Otherwise, the computer network 5 is formed by a LAN belonging to the office a, a LAN belonging to the office b, and the Internet by which these LANs are connected. Thus, the type of the computer network 5 can be an optional network as long as the computers connected to the computer network 5 can communicate data with each other using a predetermined data communications protocol.

According to the first preferred embodiment of the present invention, if the telephone 4b is busy or does not answer within a predetermined number of ring tones when the telephone 4a belonging to the office a calls up the telephone 4b belonging to the office b, a subscriber of the telephone 4a operates work station (WS) 3a belonging to the office a connected to the computer network 5, and edits the camp-on request information. The camp-on request information is transferred from the WS 3a to the CTI server 2b belonging to the office b connected to the computer network 5 through the computer network 5. The CTI server 2b executes camp-on control between the telephone 4b belonging to the office b and the telephone 4a belonging to the office a by controlling the private branch exchange 1b belonging to the office b based on the schedule corresponding to the received camp-on request information. Thus, the feature of the present invention that the camp-on control can be performed between offices connected through the telephone network 6 is represented by the first preferred embodiment.

It is obvious that bi-directional camp-on control can be realized by setting a CTI server 2 in the office a as well as the CTI server 2b in the office b.

Figure 2:
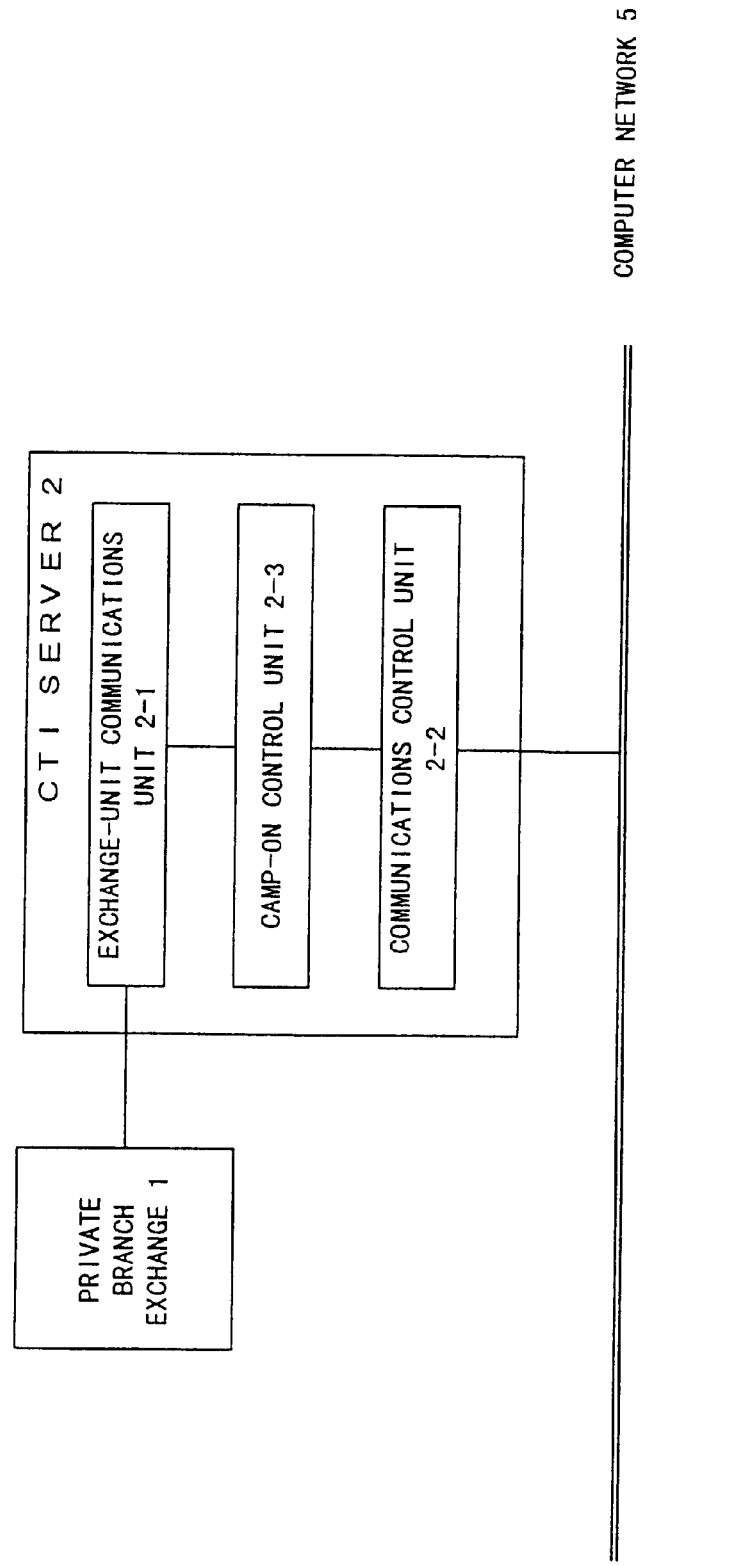
FIG. 2 shows the CTI server according to the first preferred embodiment of the present invention.

FIG. 2 shows the configuration of the CTI server 2 (corresponding to the CTI server 2b shown in FIG. 1) according to the first preferred embodiment of the present invention. The CTI server 2 comprises the exchange-unit communications unit 2-1, the communications control unit 2-2, and the camp-on control unit 2-3.

The exchange-unit communications unit 2-1 controls the transmission/reception of each type of camp-on control information for the private branch exchange 1 (corresponding to the private branch exchange 1b shown in FIG. 1) based on the interface standard called Versit TSAPI.

The communications control unit 2-2 controls the transmission/reception of each type of camp-on control information for the WS 3 (corresponding to the WS 3a shown in FIG. 1) through the computer network 5. To be more concrete, the communications control unit 2-2 controls the transmission/reception of an Ethernet frame or an ATM cell, an IP datagram capsulated in the Ethernet frame or the ATM cell, a TCP segment, capsulated in the IP datagram, and further each type of camp-on control information capsulated in the TCP segment, etc., based on a LAN protocol such as an Ethernet LAN protocol, an ATM LAN protocol, etc. and based on a global network protocol such as a Transmission Control Protocol/Internet Protocol (TCP/IP), etc.

Figure 4:
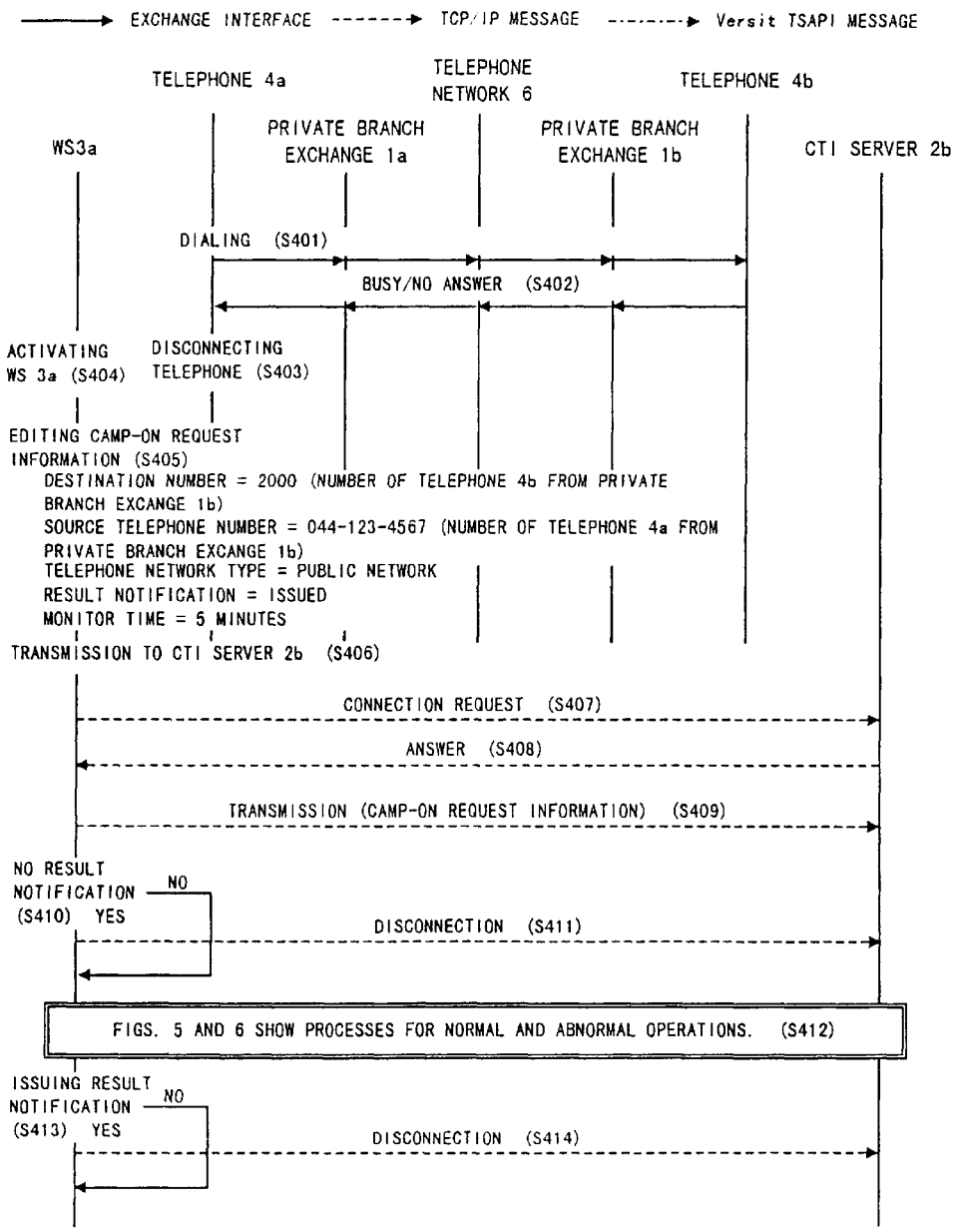
FIG. 4 shows the sequence (1) of the operations according to the first preferred embodiment of the present invention.
Figure 5:
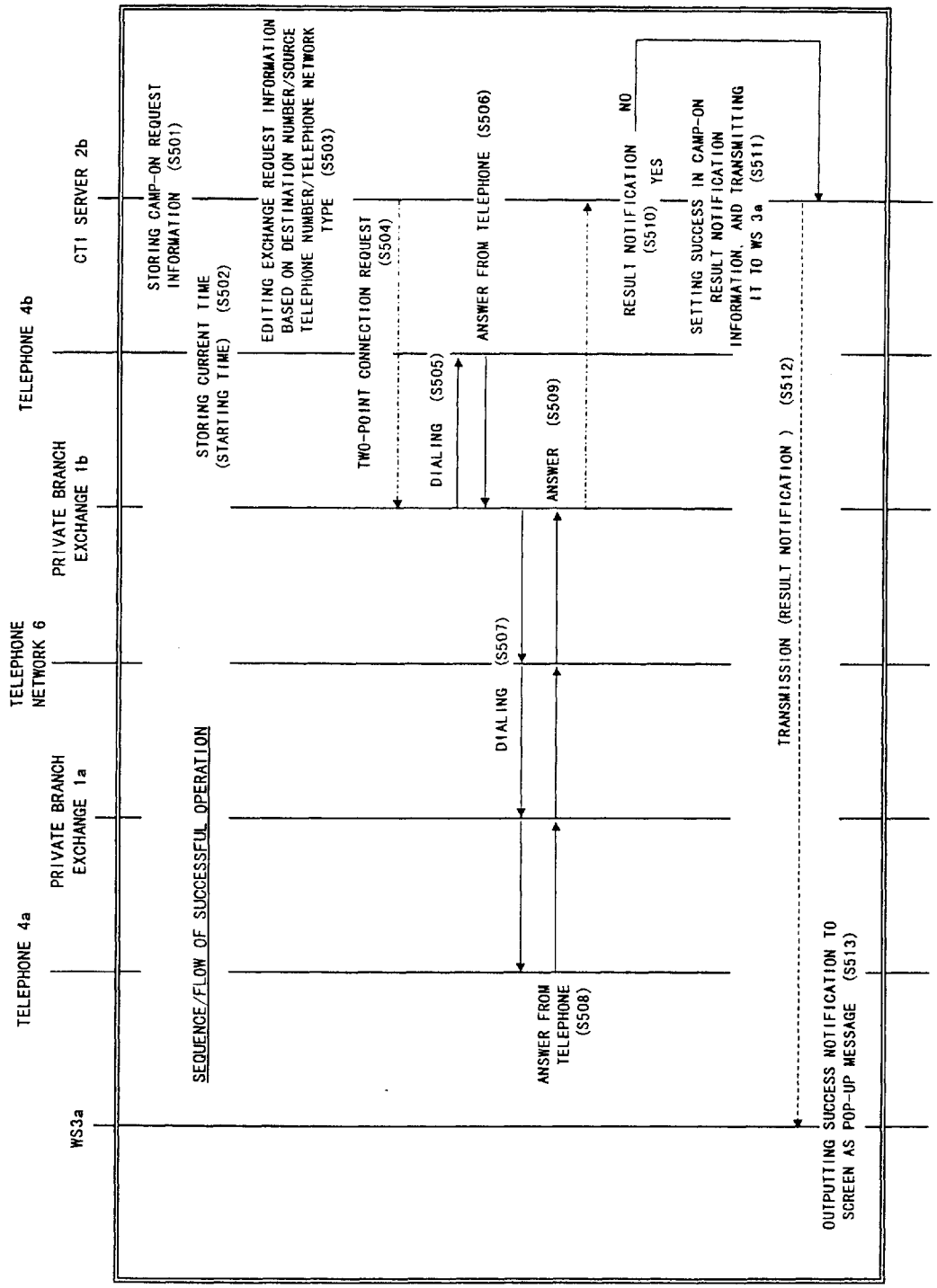
FIG. 5 shows the sequence (2) of the operations according to the first preferred embodiment of the present invention.
Figure 6:
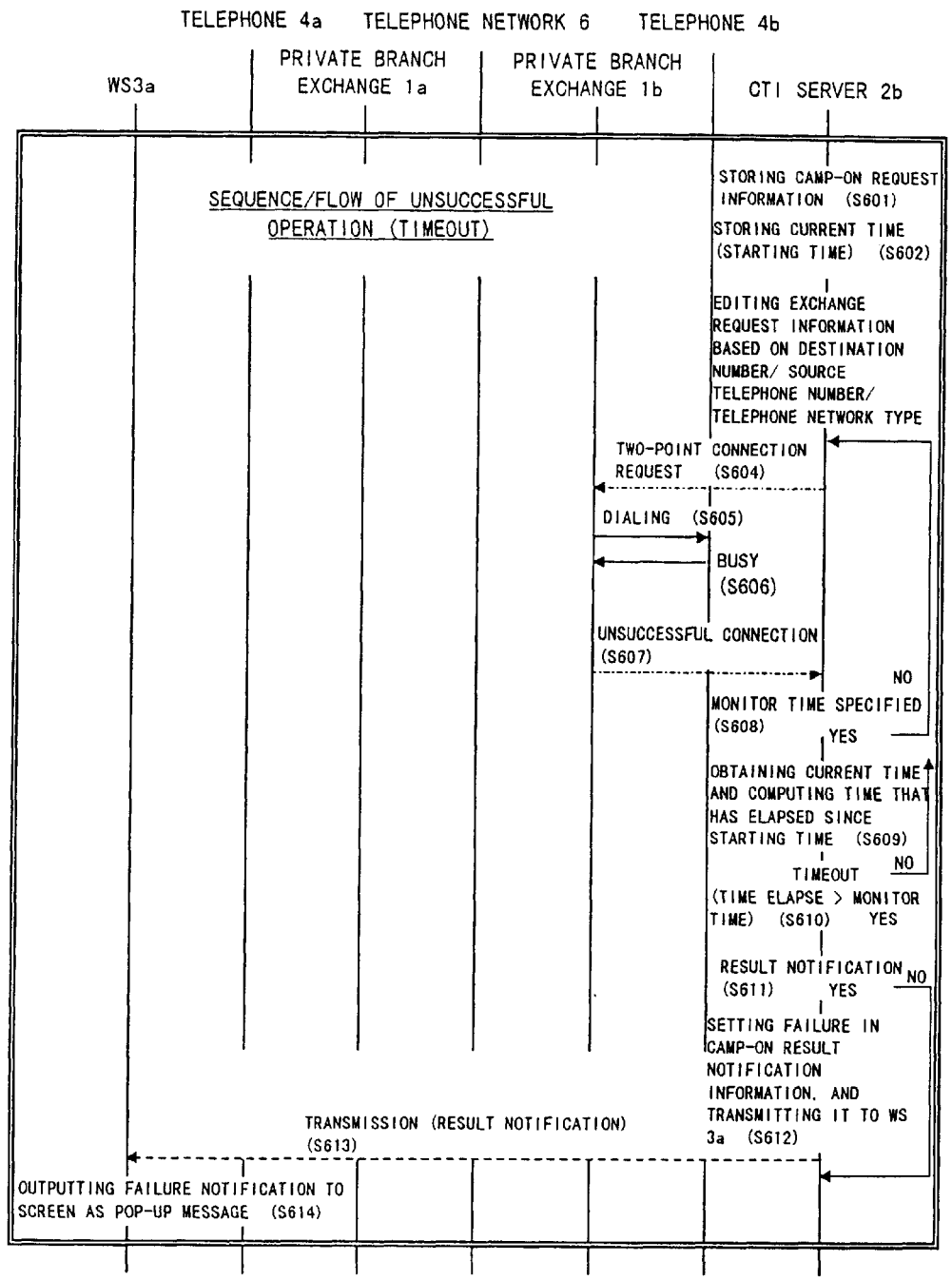
FIG. 6 shows the sequence (3) of the operations according to the first preferred embodiment of the present invention.

The camp-on control unit 2-3 executes camp-on control based on the sequence of operations shown in FIGS. 4 through 6.

Figure 3:
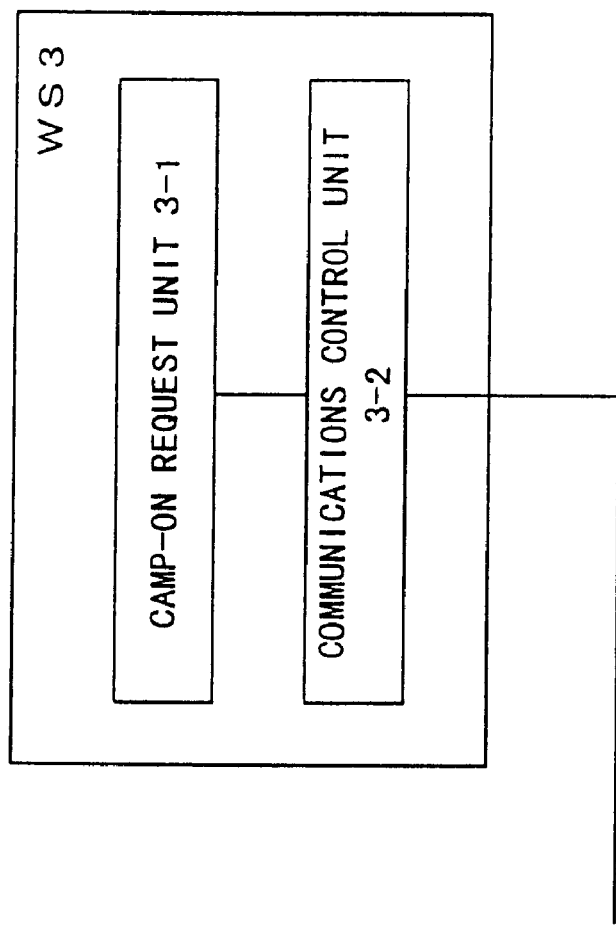
FIG. 3 shows the configuration of the Work Station according to the first preferred embodiment of the present invention.

FIG. 3 shows the configuration of the WS 3 (corresponding to the WS 3a shown in FIG. 1) according to the first preferred embodiment of the present invention. The WS 3 comprises the camp-on request unit 3-1 and the communications control unit 3-2.

The camp-on request unit 3-1 controls the editing and transmission of the camp-on request information, to be described later.

The communications control unit 3-2 controls the transmission/reception of each type of camp-on control information for the CTI server 2 through the computer network 5. To be more concrete, the communications control unit 3-2 controls the transmission/reception of the above described Ethernet frame or ATM cell, the IP datagram capsulated in the Ethernet frame or the ATM cell, the TCP segment capsulated in the IP datagram, and each type of camp-on control information capsulated in the TCP segment, based on a LAN protocol such as an Ethernet LAN protocol, an ATM LAN protocol, etc., and based on a global network protocol such as a Transmission Control Protocol/Internet Protocol (TCP/IP), etc.

FIGS. 4 through 6 show the sequence of the operations according to the first preferred embodiment with the configuration shown in FIGS. 1 through 3.

In FIG. 4, assume that the telephone 4b belonging to the office b is busy or does not answer (S402) when the telephone 4a belonging to the office a dials the number of the telephone 4b (S401).

In this case, the subscriber of the telephone 4a disconnects the telephone 4a (S403), activates work station (WS) 3a belonging to the office a connected to the computer network 5, and edits the camp-on request information (S405). The editing operation is controlled by the camp-on request unit 3-1 (shown in FIG. 3) belonging to the WS 3a.

The camp-on request information has the data configuration as shown in FIG. 7.

The destination number field (for example, 2000) indicates the extension number of the telephone 4b from the private branch exchange 1b belonging to the office b.

The source telephone number field (for example, 044-123-4567) indicates the external line number of the telephone 4a from the private branch exchange 1b belonging to the office b.

The telephone network type field (for example, 'public network') specifies whether the telephone 4b belongs to the internal station (the private branch exchange 1a), is connected to the telephone 4a through a toll network, or is connected to the telephone 4a through a public network. Thus, according to the first preferred embodiment, it is an outstanding feature of the present invention that camp-on control can be realized with a relay network optionally specified.

The telephone network type field (for example, 'public network') and a destination number (for example, 2000) which is an extension number of the destination subscriber, can be automatically set by allowing the WS 3a to have telephone number conversion data, for example as shown in FIG. 8, and by specifying the external line number (for example, 044-222-3333) of the telephone 4b from the private branch exchange 1a belonging to the office a as a destination telephone number.

The issue/non-issue of result notification field (for example, 'issue') specifies whether or not the CTI server 2b notifies the WS 3a of the execution result of the camp-on control.

The monitor time field (for example, 5 minutes) indicates the time length during which the camp-on control is retried on the telephone 4b. Unless the monitor time is specified, the camp-on control is retried until the telephone 4b answers.

After operating the WS 3a and generating the edited camp-on request information containing the above described contents, the subscriber of the telephone 4a issues a transmitting instruction to transmit the camp-on request information to the CTI server 2b (S406 shown in FIG. 4). The transmitting instruction contains an IP address (or a host address) of the CTI server 2b belonging to the office b.

As a result, if the communications control unit 3-2 (shown in FIG. 3) in the WS 3a belonging to the office a issues a connection request to the communications control unit 2-2 (shown in FIG. 2) belonging to the CTI server 2b belonging to the office b (S407), and the communications control unit 2-2 belonging to the CTI server 2b answers the communications control unit 3-2 in the WS 3a (S408), then the communications control unit 3-2 in the WS 3a returns the camp-on request information to the communications control unit 2-2 in the CTI server 2b belonging to the office b (S409). The communicating operations are performed based on the above described LAN protocol such as an Ethernet LAN protocol, an ATM LAN protocol, etc., and based on a global network protocol such as a Transmission Control Protocol/Internet Protocol (TCP/IP), etc., through the computer network 5.

When the issue/non-issue of a result notification in the camp-on request information indicates 'non-issue', (YES in step S410), the communications control unit 3-2 (shown in FIG. 3) in the WS 3a belonging to the office a terminates the connection to the CTI server 2b by instructing the communications control unit 2-2 (shown in FIG. 2) in the CTI server 2b belonging to the office b to disconnect the CTI server 2b. If the issue/non-issue of a result notification in the camp-on request information indicates 'issue', (NO in step S410), then the communications control unit 3-2 does not terminate the connection to the CTI server 2b, but waits for the camp-on result notification from the CTI server 2b.

When the CTI server 2b belonging to the office b receives the above described camp-on request information from the WS 3a belonging to the office a executes camp-on control (S412). FIG. 5 shows the sequence of the operations when the camp-on control can be successfully executed. FIG. 6 shows the sequence of the operations when the camp-on control fails.

The sequence in S412 shown in FIG. 4 of the operations when the camp-on control can be successfully executed is described below by referring to FIG. 5.

In FIG. 5, when the communications control unit 2-2 (shown in FIG. 2) in the CTI server 2b belonging to the office b receives the camp-on request information from the WS 3a belonging to the office a, the communications control unit 2-2 passes the information to the camp-on control unit 2-3 (shown in FIG. 2) in the CTI server 2b. The camp-on control unit 2-3 stores the camp-on request information in memory (or a disk device, etc.) not shown in FIG. 5, (S501 shown in FIG. 5), and obtains and stores the current time as a starting time from the clock in the CTI server 2 (S502). At this time, the source IP address set in the IP datagram storing the above described camp-on request information is obtained from the communications control unit 2-2, and is stored with the above described camp-on request information.

Then, the camp-on control unit 2-3 in the CTI server 2b edits the exchange request information based on the destination number, the source telephone number, and the telephone network type contained in the above described camp-on request information (S503).

The camp-on control unit 2-3 transmits the above described exchange request information as a two-point connection request to the private branch exchange 1b (shown in FIG. 1) belonging to the office b through the exchange-unit communications unit 2-1 (FIG. 2) in the CTI server 2b (S504). This transmitting operation is performed based on the interface standard called Versit TSAPI as described above.

When the private branch exchange 1b belonging to the office b receives the above described exchange request information, it dials the number of the telephone 4b belonging to the office b (S505). When the private branch exchange 1b receives an answer from the telephone 4b (S506), it dials the number of the telephone 4a belonging to the office a through the telephone network 6 (shown in FIG. 1) via the private branch exchange 1a belonging to the office a (S507). When the private branch exchange 1b receives an answer from the telephone 4a (S508), it returns an answer to the CTI server 2b belonging to the office b (S509). The answering operation is performed based on the interface standard called Versit TSAPI as described above.

When the camp-on control unit 2-3 in the CTI server 2b receives the above described answer through the exchange-unit communications unit 2-1, it determines whether or not 'issue' is specified in the issue/non-issue of a result notification field contained in the above described camp-on request information (S510).

When 'issue' is specified in the issue/non-issue of a result notification field, (YES in step S510), the camp-on control unit 2-3 generates camp-on result notification information whose result field contains successfully executed as shown in FIG. 9, and issues a transmitting instruction to transmit the information to the WS 3a belonging to the office a (S511). This transmitting instruction contains the destination number and the source telephone number just as they are set in the camp-on request information, and also contains the IP address of the WS 3a belonging to the office a stored when the camp-on request information is received.

As a result, the communications control unit 2-2 in the CTI server 2b belonging to the office b transmits the above described camp-on result notification information to the communications control unit 3-2 preliminarily connected in the WS 3a belonging to the office a (refer to S407 and S408 shown in FIG. 4) (S512). The transmitting operations are performed based on the above described LAN protocol such as an Ethernet LAN protocol, an ATM LAN protocol, etc., and based on a global network protocol such as a Transmission Control Protocol/Internet Protocol (TCP/IP), etc. through the computer network 5 as described above.

When the camp-on request unit 3-1 (FIG. 3) in the WS 3a belonging to the office a receives the above described camp-on result notification information through the communications control unit 3-2 (FIG. 3), the camp-on request unit 3-1 displays a success notification about the camp-on control on the display screen of the WS 3a as a pop-up message (S513).

Then, the communications control unit 3-2 in the WS 3a terminates the connection to the CTI server 2b by instructing the communications control unit 2-2 (shown in FIG. 2) in the CTI server 2b belonging to the office b to disconnect the CTI server 2b (S413 to S414 shown in FIG. 4).

When 'non-issue' is specified in the issue/non-issue of a result notification field contained in the camp-on request information, (NO in step S510), the camp-on control unit 2-3 receives an answer from the private branch exchange 1*b* (S509) and then terminates the camp-on control on the above described camp-on request information. In this case, since the CTI server 2*b* belonging to the office b is already disconnected from the WS 3*a* belonging to the office a (refer to S411 shown in FIG. 4), the disconnecting process in S414 shown in FIG. 4 is not performed.

Then, the sequence of the operations of unsuccessful camp-on control in S412 shown in FIG. 4 is described below by referring to FIG. 6.

First, each of the processes in S601 through S605 shown in FIG. 6 are performed, which are the same as those in S501 through S505 shown in FIG. 5.

If the camp-on control unit 2-3 in the CTI server 2*b* transmits as a two-point connection request the exchange request information generated according to the camp-on request information to the private branch exchange 1*b*, the private branch exchange 1*b* dials the number of the telephone 4*b* belonging to the office b, and if the telephone 4*b* is busy or does not answer within a predetermined number of ring tones (S606), then the camp-on control unit 2-3 returns a connection failure notification to the CTI server 2*b* (S607). This transmitting operation is performed based on the interface standard called Versit TSAPI as described above.

When the camp-on control unit 2-3 in the CTI server 2*b* receives the connection failure notification through the exchange-unit communications unit 2-1, it determines whether or not a monitor time (refer to FIG. 7) is specified in the received camp-on request information (S608).

Unless the monitor time is specified in the above described camp-on request information, the camp-on control unit 2-3 repeats the operation of transmitting the exchange request information as a two-point connection request to the private branch exchange 1*b* on a predetermined cycle until the telephone 4*b* answers (S608 to S604).

When the telephone 4*b* answers as a result of the above described repeating operation, the controlling operations in and after S506 shown in FIG. 5 are performed.

If the monitor time is specified in the above described camp-on request information, the camp-on control unit 2-3 obtains the current time from the clock in the CTI server 2, computes the time that has elapsed from the starting time (refer to S602) to the current time (S609), and determines whether or not the time that has elapsed exceeds the monitor time (S610). While the time that has elapsed does not exceed the monitor time (NO in S610), the camp-on control unit 2-3 repeats the operation of transmitting exchange request information as a two-point connection request to the private branch exchange 1*b* on a predetermined cycle (S610 to S604).

When the telephone 4*b* answers as a result of the above described repeating operation, the controlling operations in and after step S506 shown in FIG. 5 are performed.

When the time that has elapsed exceeds the monitor time (when the determination is YES in S610), the above described repeating operation is stopped.

As a result, the camp-on control unit 2-3 in the CTI server 2*b* determines whether or not 'issue' is specified in the issue/non-issue of a result notification field in the above described camp-on request information (S611).

If 'issue' is specified in the issue/non-issue of a result notification field, (YES in step S611), then the camp-on control unit 2-3 sets 'failure' in the result field, generates camp-on result notification information having a data configuration shown in FIG. 9, and issues an instruction to transmit the information to the WS 3*a* belonging to the office a (S612). This transmitting instruction contains the destination number and the source telephone number set in the camp-on request information, and also contains the IP address of the WS 3*a* belonging to the office a stored when the camp-on request information was received.

As a result, the communications control unit 2-2 in the CTI server 2*b* belonging to the office b transmits the above described camp-on result notification information to the communications control unit 3-2 preliminarily connected in the WS 3*a* belonging to the office a (refer to S407 and S408 shown in FIG. 4) (S613). The communicating operations are performed based on the above described LAN protocol such as an Ethernet LAN protocol, an ATM LAN protocol, etc., and based on a global network protocol such as a Transmission Control Protocol/Internet Protocol (TCP/IP), etc. through the computer network 5 as described above.

When the camp-on request unit 3-1 (FIG. 3) in the WS 3*a* belonging to the office a receives the above described camp-on result notification information through the communications control unit 3-2 (FIG. 3), the camp-on request unit 3-1 displays a failure notification about the camp-on control on the display screen of the WS 3*a* as a pop-up message (S614).

Then, the communications control unit 3-2 in the WS 3*a* terminates the connection to the CTI server 2*b* by instructing the communications control unit 2-2 (shown in FIG. 2) in the CTI server 2*b* belonging to the office b to disconnect the CTI server 2*b* (S413 to S414 shown in FIG. 4).

When 'non-issue' is specified in the issue/non-issue of a result notification field, (NO in step S611), the camp-on control unit 2-3 terminates the camp-on control on the above described camp-on request information after there arises a timeout and the determination in S610 in FIG. 6 indicates YES. In this case, since the CTI server 2*b* belonging to the office b is disconnected from the WS 3*a* belonging to the office a (refer to S411 shown in FIG. 4), the disconnecting process in S414 shown in FIG. 4 is not performed.

The above described first preferred embodiment of the present invention has a configuration with which the CTI server 2*b* belonging to the office b performs camp-on control according to the camp-on request information from the WS 3*a* belonging to the office a. On the other hand, the configuration can be designed such that the CTI server 2*b* is not provided in the office b, but the CTI server 2*a* is provided in the office a, and the CTI server 2*a* belonging to the office a performs camp-on control according to the camp-on request information from the WS 3*a* belonging to the office a. In this case, the external line number of the telephone 4*b* from the private branch exchange 1*a* belonging to the office a is specified in the destination number field contained in the camp-on request information, and the extension number of the telephone 4*a* from the private branch exchange 1*a* belonging to the office a is specified in the source telephone number field contained in the camp-on request information.

According to the above described first preferred embodiment of the present invention, when the camp-on control unit 2-3 in the CTI server 2*b* belonging to the office b performs camp-on control, it repeats the operation of transmitting a two-point connection request to the private branch exchange 1*b* on a predetermined cycle until the telephone 4*b* answers (S608 to S604 shown in FIG. 6). On the other hand, the configuration according to the first preferred embodiment can be designed such that the camp-on control unit 2-3 instructs the private branch exchange 1b belonging to the office b to monitor the state of the telephone 4b, and transmits the two-point connection request to the private branch exchange 1b when the status of the telephone 4b turns into a ready state. This system is described further in detail by referring to the second preferred embodiment of the present invention.

According to the above described first preferred embodiment of the present invention, the telephone 4a belonging to the office a can be completely separate from the WS 3a. On the other hand, for example, a PHS (Personal Handy phone System) communications terminal unit can have the functions of the telephone 4a and the WS 3a. In this case, the telephone network 6 shown in FIG. 1 contains a PHS network, and the computer network 5 also contains the PHS network.

Second Preferred Embodiment

Figure 10:
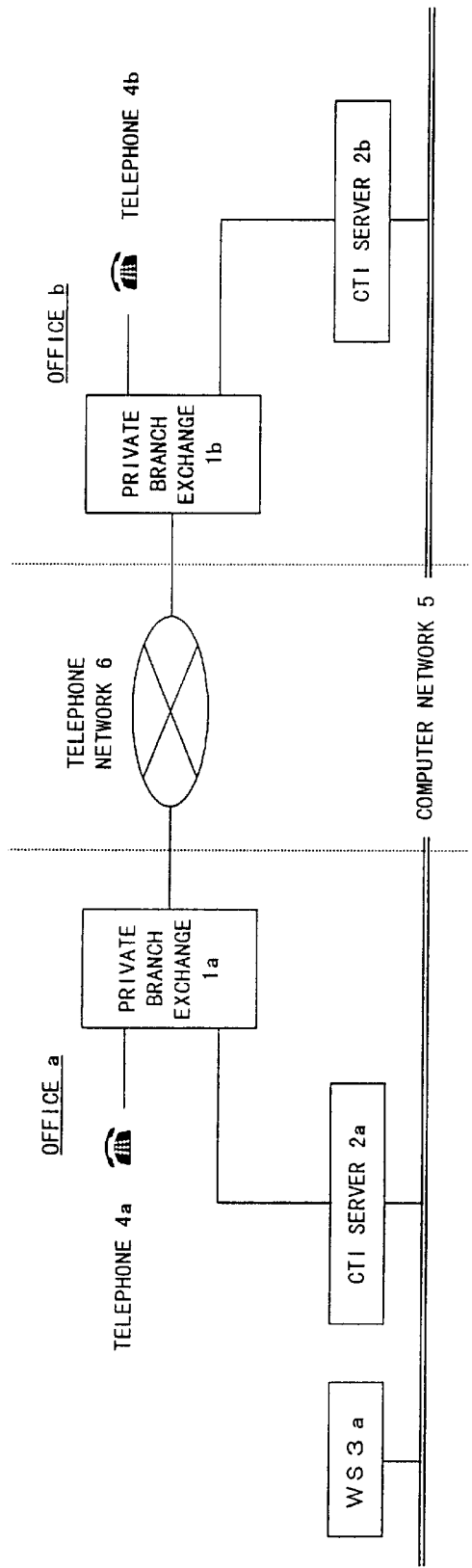
FIG. 10 shows the configuration of the system according to the second preferred embodiment of the present invention.

FIG. 10 shows the configuration of the system according to the second preferred embodiment of the present invention.

In FIG. 10, units assigned the same numbers as in the first preferred embodiment have the same function as the corresponding units as described in the first preferred embodiment.

The configuration according to the second preferred embodiment shown in FIG. 10 is different from the first preferred embodiment shown in FIG. 1 in that the office a is provided with the CTI server 2a connected to the computer network 5. The CTI server 2a performs camp-on control with the CTI server 2b belonging to the office b according to the camp-on request information from the WS 3a belonging to the office a, if the information relates to the telephone 4b belonging to the external office b, and also performs the camp-on control according to the camp-on request information if the above described camp-on request information relates to a telephone 4 (c, d, e, . . . ) belonging to the office a.

Figure 11:
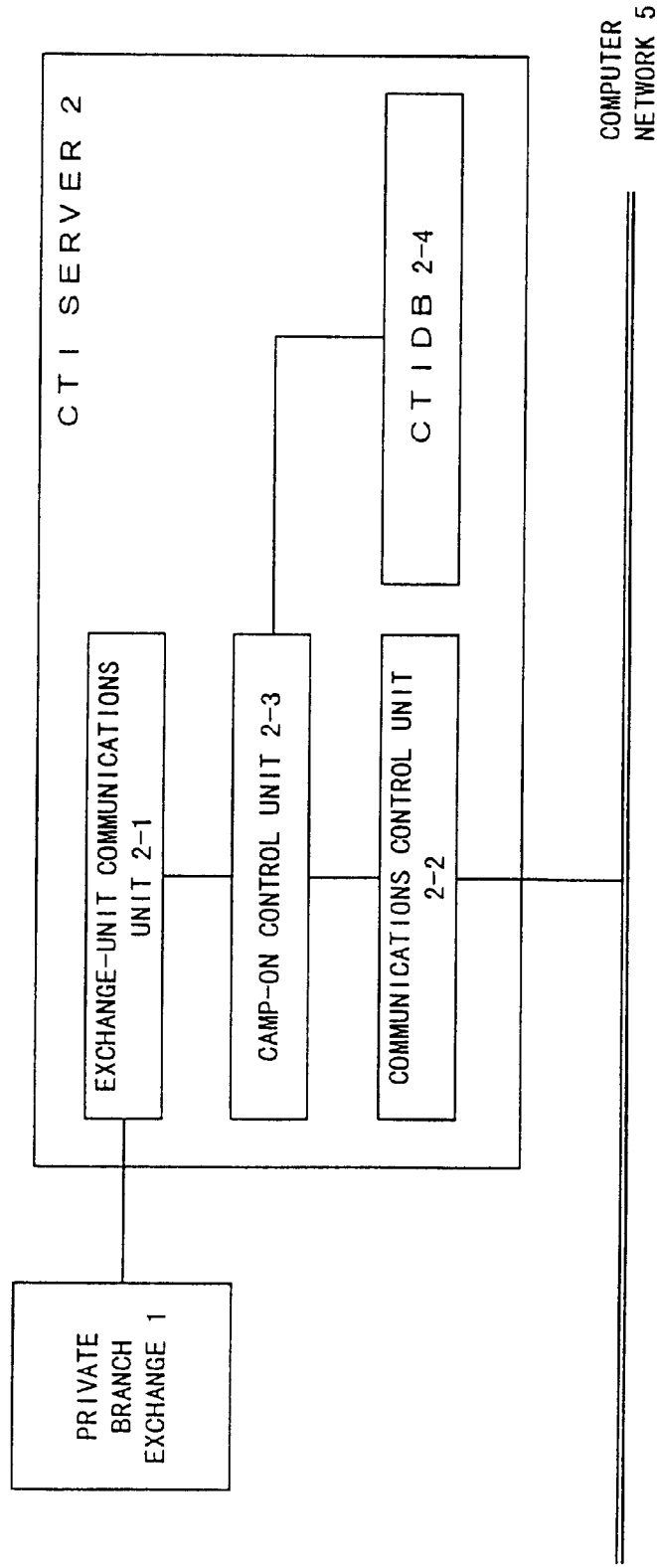
FIG. 11 shows the configuration of the CTI server according to the second preferred embodiment of the present invention.

FIG. 11 shows the configuration of the CTI server 2 (corresponding to the CTI servers 2a and 2b shown in FIG. 10) according to the second preferred embodiment. The CTI server 2 according to the second preferred embodiment comprises a CTI database (CTIDB 2-4) in addition to the exchange-unit communications unit 2-1, the communications control unit 2-2, and the camp-on control unit 2-3 which are similarly included in the CTI server 2 according to the first preferred embodiment of the present invention shown in FIG. 2.

For each destination number specified by editing camp-on request information in the WS 3a, the CTIDB 2-4 holds a telephone network type which specifies that either the telephone corresponding to the destination number belongs to its own station, or that it is connected through a toll network, or that it is connected through a public network, and an IP address in the computer network 5 of the CTI server 2 for executing camp-on control on the telephone corresponding to the above described destination number.

Upon receipt of camp-on request information from the WS 3a belonging to the office a, the CTI server 2a belonging to the office a can perform appropriate camp-on control by referring to the CTIDB 2-4 using the destination number contained in the camp-on request information as a key. This is the feature of the second preferred embodiment of the present invention.

The configuration of the WS 3 (corresponding to the WS 3a shown in FIG. 10) according to the second preferred embodiment is the same as the configuration of the WS 3 according to the first preferred embodiment shown in FIG. 3.

FIGS. 12 through 16 show the sequence of the operations according to the second preferred embodiment having the configuration shown in FIGS. 10, 11, and 3.

Figure 12:
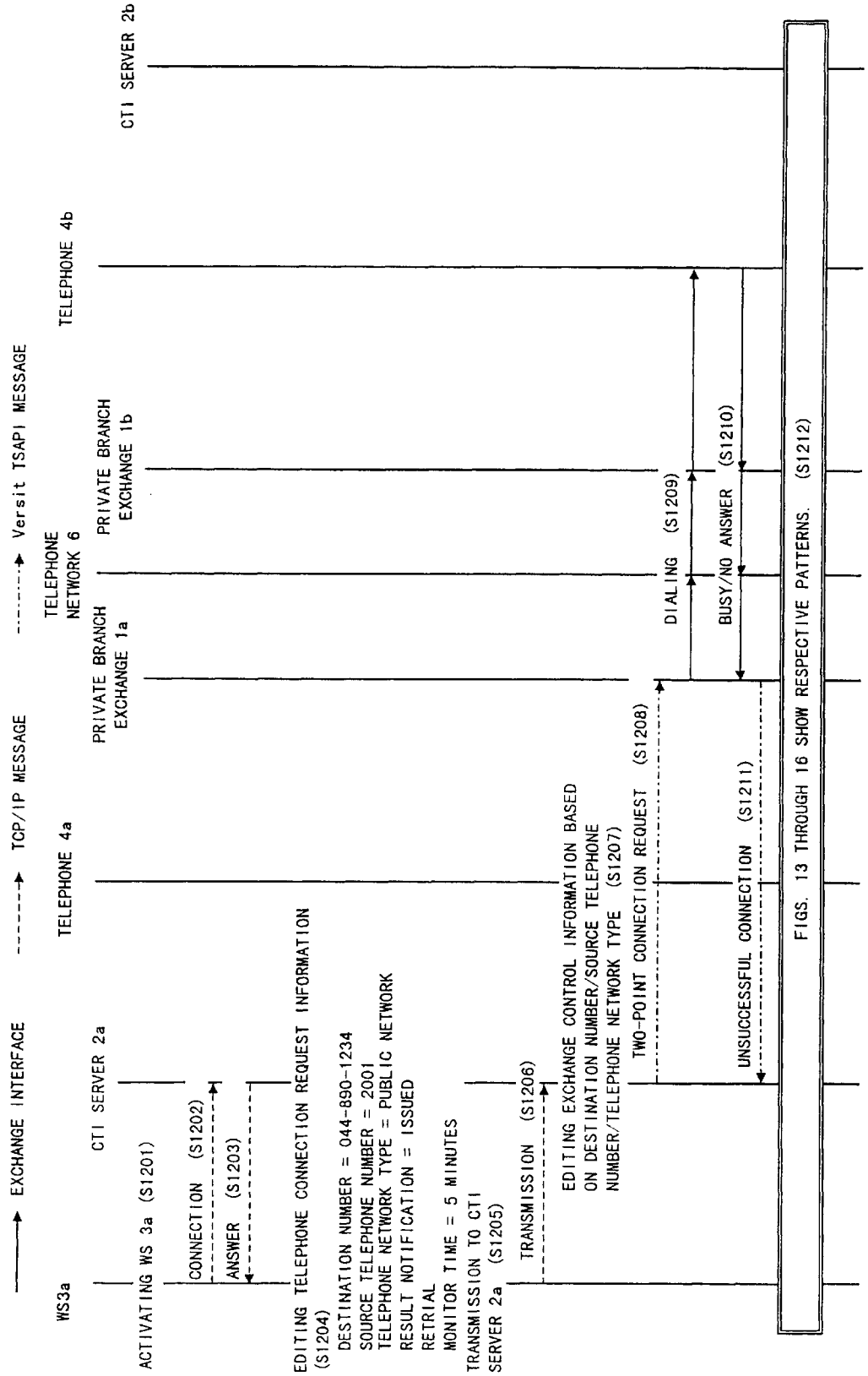
FIG. 12 shows the sequence (1) of the operations according to the second preferred embodiment of the present invention.

In FIG. 12, a connection from the WS 3a to the CTI server 2a belonging to the office a is tried (S1202) by a subscriber of the telephone 4a activating the WS 3a belonging to the office a connected to the computer network 5 (S1201). If the CTI server 2a answers as a result (S1203), the connection between the WS 3a and the CTI server 2a is established.

Then, the subscriber of the telephone 4a operates the WS 3a and edits the telephone connection request information (S1204). The editing operation is controlled by the camp-on request unit 3-1 (shown in FIG. 3) belonging to the WS 3a.

This telephone connection request information has the data configuration shown in, for example, FIG. 17.

The destination number field (for example, 044-890-1234) indicates the external line number of the destination telephone (the telephone 4b belonging to the office b in the example shown in FIG. 12).

The source telephone number field (for example, 2001) indicates the extension number of the telephone 4a from the private branch exchange 1a belonging to the office a.

The telephone network type field (for example, 'public network'), the issue/non-issue of a result notification (for example, 'issue'), and the monitor time are respectively identical to the telephone network type, the issue/non-issue of a result notification, and the monitor time in the camp-on request information shown in FIG. 7.

Furthermore, the retrial/no-retrial (camp-on/non-camp-on) field (for example, 'retrial') indicates whether or not camp-on control should be performed when a connection is tried once to the telephone 4b and the trial fails.

The subscriber of the telephone 4a operates the WS 3a, generates the telephone connection request information containing the above described information, and then issues an instruction to transmit the telephone connection request information to the CTI server 2a (S1205 shown in FIG. 12). The transmitting instruction contains an IP address (or a host address) of the CTI server 2b belonging to the office b.

As a result, the communications control unit 3-2 (shown in FIG. 3) in the WS 3a belonging to the office a transmits the above described telephone connection request information to the communications control unit 2-2 (FIG. 11) belonging to the CTI server 2a belonging to the office a (S1206).

Upon receipt of the above described telephone connection request information, the communications control unit 2-2 in the CTI server 2a passes it to the camp-on control unit 2-3 (FIG. 11) in the CTI server 2a.

Then, the camp-on control unit 2-3 in the CTI server 2a edits the exchange request information according to the destination number, the source telephone number, and the telephone network type contained in the above described telephone connection request information (S1207).

The camp-on control unit 2-3 then transmits the above described exchange request information as a two-point connection request to the private branch exchange 1a (shown in FIG. 10) belonging to the office a through the exchange-unit communications unit 2-1 (FIG. 11) in the CTI server 2a (S1208). This transmitting operation is performed based on the interface standard called Versit TSAPI as described above in explaining the first preferred embodiment of the present invention.

Upon receipt of the above described exchange request information, the private branch exchange 1a belonging to the office a dials the number of the telephone 4b belonging to the office b (S1209). If the telephone 4b is busy or does not answer within a predetermined number of ring tones (S1210), then the private branch exchange 1a returns a connection failure notification to the CTI server 2a (S1211). The returning operation is performed based on the interface standard called Versit TSAPI as described above.

Upon receipt of the above described connection failure notification through the exchange-unit communications unit 2-1, the camp-on control unit 2-3 in the CTI server 2a executes one of the four controlling operations shown in FIGS. 13 through 16 (S1212).

Described below is the sequence of the operations shown in FIG. 13 as an example of the process in S1212 in FIG. 12. The sequence of the operations corresponds to an example of normally completing the two-point connection by the CTI server 2b belonging to the office b by monitoring the status of the destination telephone 4b and performing the two-point connection according to the camp-on request information from the CTI server 2a belonging to the office a.

Figure 13:
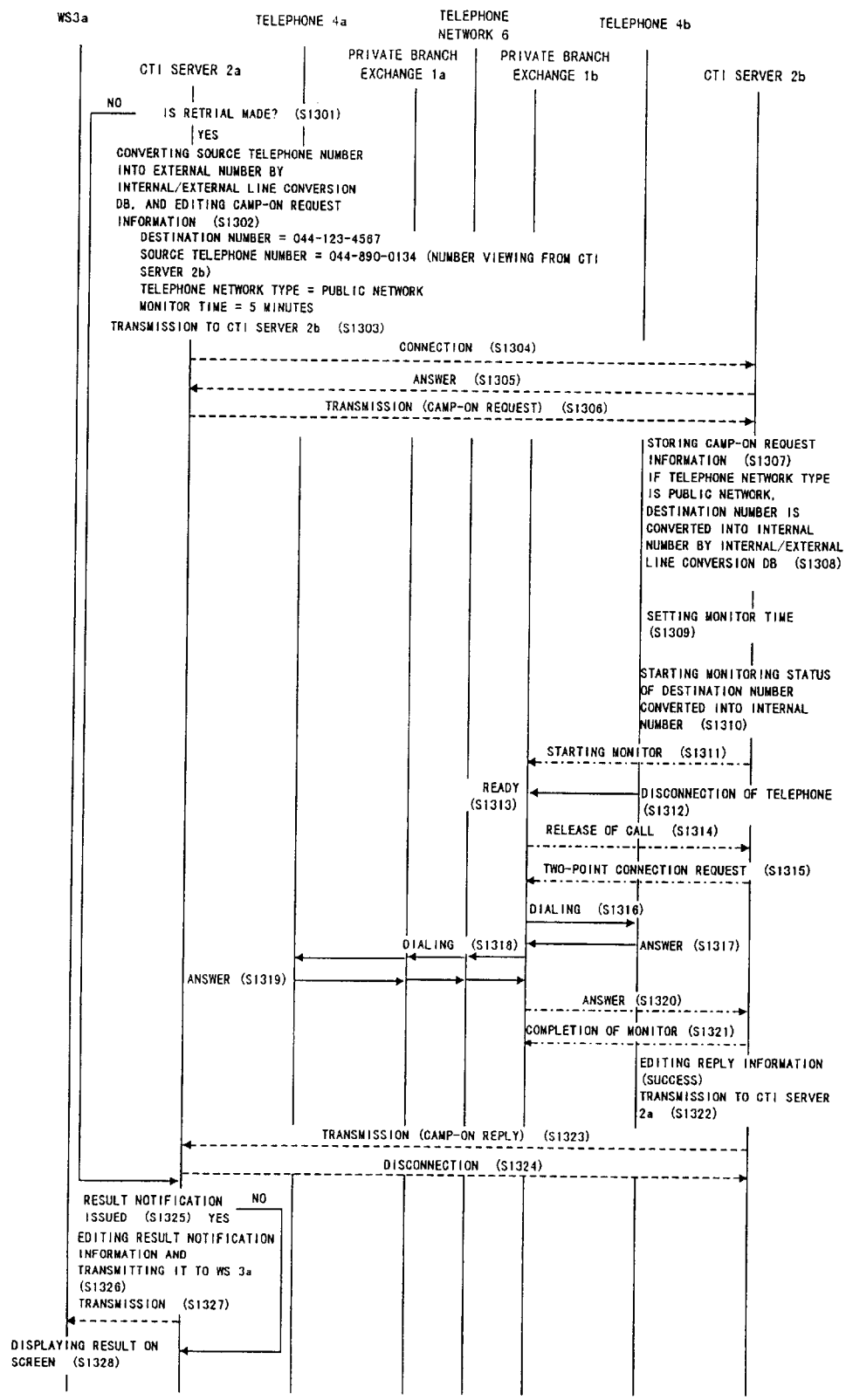
FIG. 13 shows the sequence (2) of the operations according to the second preferred embodiment of the present invention.

First, the camp-on control unit 2-3 in the CTI server 2a belonging to the office a determines whether or not 'retrial' is specified in the retrial/non-retrial field contained in a telephone connection request information received from the WS 3a belonging to the office a (S1301 in FIG. 13).

Unless 'retrial' is specified in the retrial/noretrial field (the determination in S1301 is NO), the camp-on control is not performed after the failure of a telephone connection to the destination telephone 4b (S1211 in FIG. 12).

If 'retrial' is specified in the retrial/no-retrial field contained in the telephone connection request information, (YES in step S1301), the camp-on control unit 2-3 generates camp-on result notification information in which 'failure' (refer to S1210 shown in FIG. 12) is set in the result field shown in FIG. 9, and issues an instruction to transmit the information to the WS 3a belonging to the office a (S1325 and S1326). This transmitting instruction contains the destination number and the source telephone number set in the telephone connection request information, and the IP address, stored when the camp-on request information is received, of the WS 3a belonging to the office a.

As a result, the communications control unit 2-2 (shown in FIG. 11) in the CTI server 2a belonging to the office a transmits the above described camp-on result notification information to the communications control unit 3-2 (shown in FIG. 3) in the WS 3a belonging to office a (S1327). This transmitting operation is performed through the computer network 5 based on a LAN protocol such as an Ethernet LAN protocol or an ATM LAN protocol, etc., and based on a global network protocol such as a Transmission Control Protocol/Internet Protocol (TCP/IP), etc. as described above.

Upon receipt of the above described camp-on result notification information through the communications control unit 3-2 (FIG. 3), the camp-on request unit 3-1 (FIG. 3) in the WS 3a belonging to the office a displays a failure notification of camp-on control as a pop-up message on the display screen of the WS 3a (S1328).

Unless 'issue' is specified in the issue/non-issue of a result notification field contained in the telephone connection request information, (NO in the determination in S1325), the camp-on control unit 2-3 in the CTI server 2a does not particularly notify the WS 3a of the camp-on result notification information.

If 'retrial' is specified in the retrial/no-retrial field contained in the telephone connection request information, (the determination in S1301 is YES), then the camp-on control described below is performed after the connection of telephone to the telephone 4b to be connected fails (S1211 in FIG. 12).

First, the camp-on control unit 2-3 in the CTI server 2a belonging to the office a edits the camp-on request information having a data configuration shown in FIG. 19 (S1302) based on the telephone connection request information specified from the WS 3a belonging to the office a.

First, a camp-on request is specified in the request type field.

Then, an optional number is set in the request number field for use in managing a request for camp-on control.

The destination number field posts the destination number set in the telephone connection request information in an external number format. In this case, if a 'public network' is specified in the telephone network type field as described later, the destination number is converted by the CTI server 2b belonging to the office b into an extension number comprehensible by the private branch exchange 1b belonging to the office b (refer to S1308).

The source telephone number field contains data corresponding to the source telephone number set in the telephone connection request information. In this case, the data format relating to the above described source telephone number is converted from an internal number format into an external number format comprehensible by the private branch exchange 1b belonging to the office b using the internal/external line conversion DB (internal/external line conversion database) having the data configuration shown in FIG. 18.

The telephone network type and the monitor time are specified as they are set in the camp-on request information shown in FIG. 7 according to the first preferred embodiment of the present invention.

The camp-on control unit 2-3 in the CTI server 2a edits the above described camp-on request information, and then issues an instruction to transmit the information to the CTI server 2b (S1303 in FIG. 13). In this case, the camp-on control unit 2-3 retrieves the IP address of the CTI server 2b belonging to the office b with the destination number set in the camp-on request information as a key using the CTIDB (CTI database) having the data configuration shown in FIG. 20, and then sets the address in the above described transmitting instruction.

As a result, the communications control unit 2-2 (shown in FIG. 11) in the CTI server 2a belonging to the office a issues a connection request to the communications control unit 2-2 (shown in FIG. 11) belonging to the CTI server 2b belonging to the office b (S1304). When the communications control unit 2-2 belonging to the CTI server 2b answers the communications control unit 2-2 in the CTI server 2a (S1305), the communications control unit 2-2 in the CTI server 2a transmits the camp-on request information to the communications control unit 2-2 in the CTI server 2b belonging to the office b (S1306). These communicating operations are performed through the computer network 5 based on a LAN protocol such as an Ethernet LAN protocol or an ATM LAN protocol, etc., and based on a global network protocol such as a Transmission Control Protocol/Internet Protocol (TCP/IP), etc. as described above.

Then, the camp-on control unit 2-3 in the CTI server 2a belonging to the office a waits for a camp-on answer notification from the CTI server 2b (refer to S1323 described later).

Upon receipt of the camp-on request information from the CTI server 2a belonging to the office a, the communications control unit 2-2 (FIG. 11) in the CTI server 2b belonging to the office b passes the camp-on request information to the camp-on control unit 2-3 (FIG. 11) in the CTI server 2b. The camp-on control unit 2-3 stores the camp-on request information in a memory (or on a disk device, etc.) not shown in FIG. 11 (S1307).

If a 'public network' is set in the telephone network type field contained in the above described camp-on request information, the camp-on control unit 2-3 in the CTI server 2b converts the data format of the destination number contained in the above described camp-on request information from the external number format to the internal number format comprehensible by the private branch exchange 1b belonging to the office b, using the internal/external number conversion DB having the data configuration as shown in FIG. 18 (S1308).

Then, the camp-on control unit 2-3 in the CTI server 2b sets the monitor time contained in the received camp-on request information in an internal register, etc. (S1309).

Furthermore, the camp-on control unit 2-3 in the CTI server 2b instructs the private branch exchange 1b (shown in FIG. 10) belonging to the office b to start monitoring the status of the telephone 4b corresponding to the destination number converted into an internal number format through the exchange-unit communications unit 2-1 (shown in FIG. 11) in the CTI server 2b (S1310). This instructing operation is performed based on the interface standard called Versit TSAPI as described above.

As a result, the private branch exchange 1b belonging to the office b starts monitoring the status of the telephone 4b belonging to the office b. When the telephone 4b is released (S1312) in the monitor time set in S1309 and the telephone 4b enters a ready state (S1313), the private branch exchange 1b notifies the camp-on control unit 2-3 in the CTI server 2b of the release of the call through the exchange-unit communications unit 2-1 in the CTI server 2b (S1314).

As a result, the camp-on control unit 2-3 transmits a two-point connection request between the telephone 4b belonging to the office b corresponding to the destination number set in the received camp-on request information and the telephone 4a belonging to the office a corresponding to the source telephone number to the private branch exchange 1b through the exchange-unit communications unit 2-1 in the CTI server 2b (S1315). This transmitting operation is performed based on the interface standard called Versit TSAPI as described above.

Upon receipt of the above described two-point connection request, the private branch exchange 1b dials the number of the telephone 4b belonging to the office b (S1316). When the private branch exchange 1b receives a reply from the telephone 4b (S1317), it dials the number of the telephone 4a belonging to the office a through the telephone network 6 (shown in FIG. 10) and the private branch exchange 1a belonging to the office a (S1318). When the private branch exchange 1b receives a reply from the telephone 4a (S1319), it returns a reply to the CTI server 2b belonging to the office b (S1320). This returning operation is performed based on the interface standard called Versit TSAPI as described above.

The camp-on control unit 2-3 in the CTI server 2b which received the above described reply instructs the private branch exchange 1b to terminate the monitoring (S1321).

The camp-on control unit 2-3 generates the camp-on reply information in which 'camp-on reply' is set in the response type field, the request number (refer to FIG. 19) set in the camp-on request information which activated the above described camp-on control is set in the request number field, and 'success' is set in the camp-on status field as shown in FIG. 21. The camp-on control unit 2-3 then issues an instruction to transmit the generated information to the CTI server 2a belonging to the office a (S1322). This transmitting instruction is assigned the IP address of the CTI server 2a belonging to the office a stored when the camp-on request information was received.

As a result, the communications control unit 2-2 in the CTI server 2b belonging to the office b transmits the above described camp-on reply information to the communications control unit 2-2 (refer to S1304) in the CTI server 2a belonging to the office a for which a connection has already been established (S1323). This transmitting operation is performed through the computer network 5 as described above based on a LAN protocol such as an Ethernet LAN protocol, an ATM LAN protocol, etc., and based on a global network protocol such as a Transmission Control Protocol/Internet Protocol (TCP/IP), etc.

Figure 23:
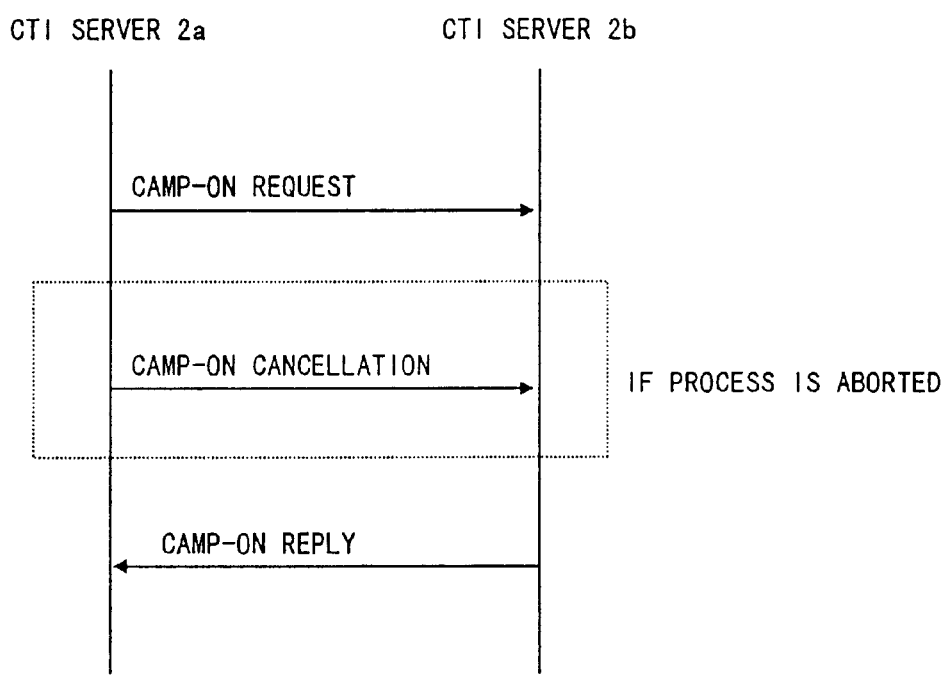
FIG. 23 shows the outline of the sequence of the camp-on control.

During the execution of the camp-on control on the CTI server 2a by the CTI server 2b, the CTI server 2a can transmit the camp-on request information in which 'cancellation of camp-on' is set in the request type field and a desired request number is set as shown in FIG. 22. Upon receipt of the camp-on cancellation information, the CTI server 2b stops the camp-on control corresponding to the request number (refer to the outline of the sequence shown in FIG. 23).

Upon receipt of the above described camp-on reply information through the communications control unit 2-2, the camp-on control unit 2-3 in the CTI server 2a belonging to the office a terminates the connection to the CTI server 2b by instructing the communications control unit 2-2 in the CTI server 2b belonging to the office b to disconnect the CTI server 2b (S1324).

If 'issue' is specified in the issue/non-issue of a result notification field contained in the telephone connection request information received from the WS 3a, (YES in step S1325), the camp-on control unit 2-3 in the CTI server 2a generates camp-on result notification information in which 'success' is set in the result field as shown in FIG. 9, and issues an instruction to transmit the information to the WS 3a belonging to the office a (S1325 and S1326). This transmitting instruction contains the destination number and the source telephone number set in the telephone connection request information, and the IP address of the WS 3a belonging to the office a stored when the camp-on request information was received.

As a result, the communications control unit 2-2 in the CTI server 2a belonging to the office a transmits the above described camp-on result notification information to the communications control unit 3-2 (FIG. 3) in the WS 3a belonging to the office a (S1327).

Upon receipt of the above described camp-on result notification information through the communications control unit 3-2, the camp-on request unit 3-1 (FIG. 3) in the WS 3a belonging to the office a displays a camp-on control success notification as a pop-up message on the display screen (S1328).

If 'issue' is not specified in the issue/non-issue of a result notification field contained in the telephone connection request information, (NO in S1325), the camp-on control unit 2-3 in the CTI server 2a does not particularly transmit camp-on result notification information to the WS 3a.

Described below is the sequence of the operations shown in FIG. 14 as an example of S1212 shown in FIG. 12. The sequence of the operations refers to an example in which the two-point connection does not normally terminate by monitoring the status of the destination telephone 4b and performing of the two-point connection by the CTI server 2b belonging to the office b according to the camp-on request information from the CTI server 2a belonging to the office a.

Figure 14:
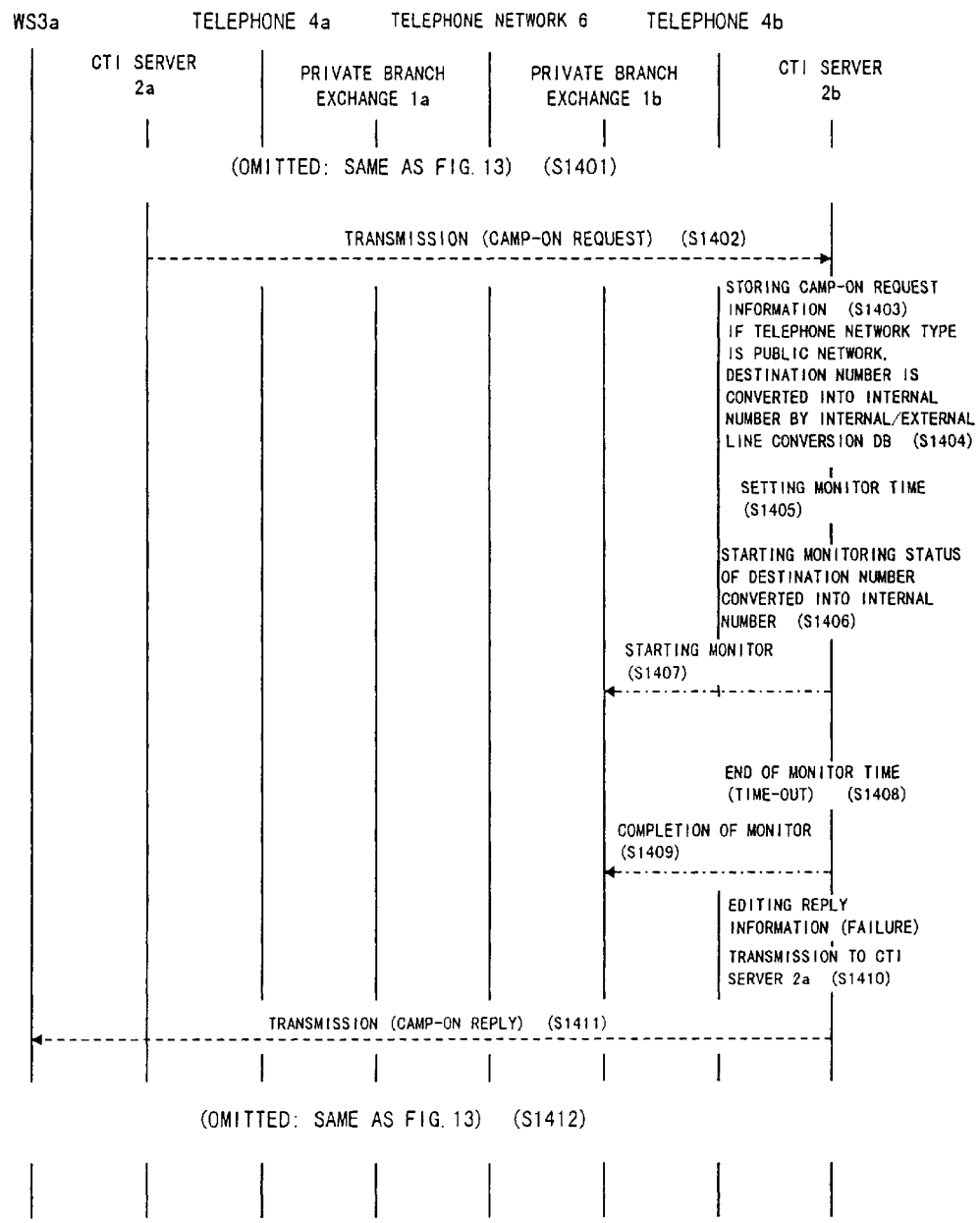
FIG. 14 shows the sequence (3) of the operations according to the second preferred embodiment of the present invention.

As in the processes in S1301 through S1305 shown in FIG. 13, the camp-on control unit 2-3 in the CTI server 2a belonging to the office a determines the execution/non-execution of camp-on control (S1301), edits the camp-on request information if the camp-on control is executed (S1302), and controls the transmission (S1303 through S1305) of the camp-on request information to the CTI server 2b belonging to the office b (S1401 shown in FIG. 14). As in the process in S1306 shown in FIG. 13, the camp-on request information is transmitted from the CTI server 2a to the CTI server 2b (S1402).

The series of the processes of receiving camp-on request information, instructing the start of monitoring the private branch exchange 1b belonging to the office b, etc. in S1403 through S1407 shown in FIG. 14, are similar to the processes in S1307 through S1311 shown in FIG. 13.

If the set monitor time (refer to S1405) is ended (timeout), without disconnection of the telephone 4b, after the monitor on the telephone 4b has started in the private branch exchange 1b (S1408), then the camp-on control unit 2-3 in the CTI server 2b instructs the private branch exchange 1b to terminate the monitoring (S1409).

Then, the camp-on control unit 2-3 generates the camp-on reply information in which 'camp-on reply' is set in the response type field, the request number (refer to FIG. 19) which is the same data set in the camp-on request information which activated the above described camp-on control is set in the request number field, and 'failure' is set in the camp-on status field as shown in FIG. 21. The camp-on control unit 2-3 then issues an instruction to transmit the generated information to the CTI server 2a belonging to the office a (S1410). Based on this instruction, the communications control unit 2-2 in the CTI server 2b executes transmitting operation of the camp-on reply information (S1411).

The subsequent controlling operations in the CTI server 2a belonging to the office a are similar to those in S1324 through S1328 shown in FIG. 13, except, however, that the camp-on result notification information indicating 'failure' is transmitted from the CTI server 2a to the WS 3a (S1412).

Described below is the sequence of the operations shown in FIG. 15 as an example of the above described process in S1212 shown in FIG. 12. The sequence of the operations corresponds to an example in which the two-point connection normally terminates by monitoring the status of the destination telephone 4b by the CTI server 2b belonging to the office b according to the status monitor request information from the CTI server 2a belonging to the office a, and performing the two-point connection based on the monitor result by the CTI server 2a belonging to the office a, not by the CTI server 2b belonging to the office b.

Figure 15:
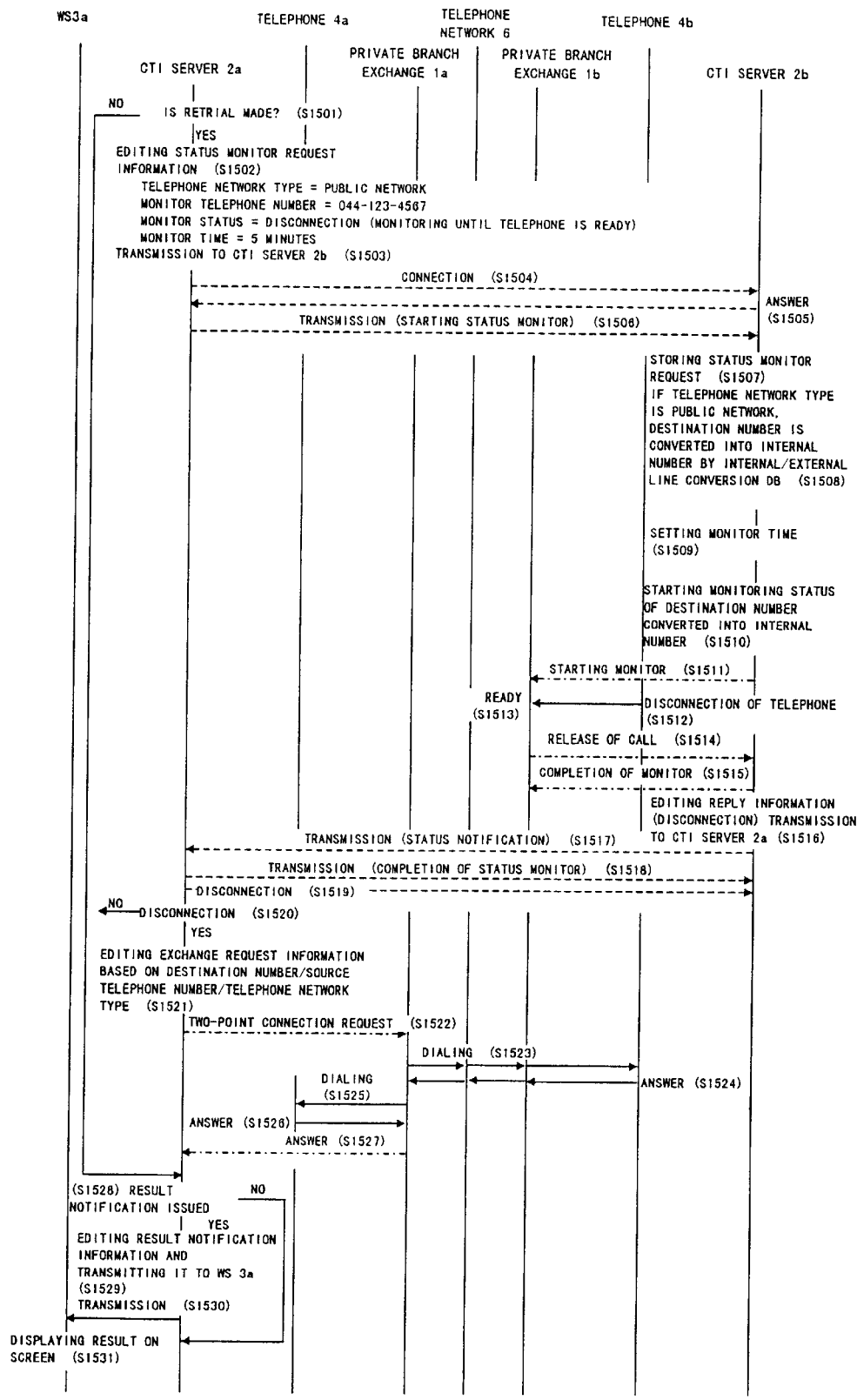
FIG. 15 shows the sequence (4) of the operations according to the second preferred embodiment of the present invention.

The camp-on control unit 2-3 in the CTI server 2a belonging to the office a determines whether or not 'retrial' is specified in the retrial/no-retrial field contained in the telephone connection request information received from the WS 3a belonging to the office a (S1501 in FIG. 15).

If 'retrial' is not specified in the retrial/no-retrial field (the determination in S1501 is NO), then the subsequent camp-on control is not executed after the connection to the destination telephone 4b fails (S1211 shown in FIG. 12).

If 'issue' is specified in the issue/non-issue of a result notification field contained in the telephone connection request information by a series of the processes in S1528 through S1531 in FIG. 15 as in the processes in S1325 through S1328 shown in FIG. 13, then the camp-on result notification information indicating failure is transmitted from the CTI server 2a to the WS 3a.

If 'retrial' is specified in the retrial/no-retrial field contained in the telephone connection request information (the determination in S1501 is YES), then the subsequent camp-on control described below is executed after the connection to the destination telephone 4b fails (S1211 shown in FIG. 12).

First, the camp-on control unit 2-3 in the CTI server 2a belonging to the office a edits the status monitor request information having the data configuration shown in FIG. 24 based on the telephone connection request information specified by the WS 3a belonging to the office a (S1502).

In FIG. 24, 'start of status monitor' is set in the request type field.

An optional number indicating the management of the request for status monitor is set in the request number field.

The destination number set in the telephone connection request information is moved to the monitor telephone number field in an external line number format. In this case, if a 'public network' is set as the telephone network type field as described below, then the value in the above described monitor telephone number field is converted by the CTI server 2b belonging to the destination office b into the internal number format comprehensible by the private branch exchange 1b belonging to the office b (refer to S1508).

The telephone network type field contains the value set in the camp-on request information shown in FIG. 7 or 19.

The monitored status field can contain as a monitor request statusl and, although not specifically related 'reception', 'reply', or a combination of these.

After editing the above described status monitor request information, the camp-on control unit 2-3 in the CTI server 2a issues an instruction to transmit it to the CTI server 2b (S1503 in FIG. 15). As in the case shown in FIG. 13, the camp-on control unit 2-3 retrieves the IP address of the CTI server 2b belonging to the office b and sets it in the above described transmitting instruction using the CTIDB having the data configuration shown in FIG. 20 and using the monitor telephone number set in the camp-on request information as a key.

As a result, when the communications control unit 2-2 (shown in FIG. 11) in the CTI server 2a belonging to the office a issues a connection request to the communications control unit 2-2 (shown in FIG. 11) in the CTI server 2b belonging to the office b (S1504) and the communications control unit 2-2 belonging to the CTI server 2b returns a reply to the communications control unit 2-2 in the CTI server 2a (S1505), the communications control unit 2-2 in the CTI server 2a transmits status monitor request information to the communications control unit 2-2 in the CTI server 2b belonging to the office b (S1506). These communicating operations are performed through the computer network 5 based on a LAN protocol such as an Ethernet LAN protocol, an ATM LAN protocol, etc., and based on a global network protocol such as a Transmission Control Protocol/Internet Protocol (TCP/IP), etc.

Then, the camp-on control unit 2-3 in the CTI server 2a belonging to the office a waits for a status notification from the CTI server 2b (refer to S1517 described later).

The communications control unit 2-2 (shown in FIG. 11) in the CTI server 2b belonging to the office b which received the status monitor request information from the CTI server 2a belonging to the office a passes the status monitor request information to the camp-on control unit 2-3 (shown FIG. 11) in the CTI server 2b. The camp-on control unit 2-3 stores the status monitor request information in memory (or a disk unit, etc.) not shown in FIG. 11 (S1507).

When a 'public network' is set in the telephone network type field in the above described status monitor request information, the camp-on control unit 2-3 in the CTI server 2b converts the data format of the monitor telephone number field contained in the status monitor request information from the external number format into the internal number format comprehensible by the private branch exchange 1b belonging to the office b using the internal/external line conversion DB having the data configuration shown in FIG. 18 (S1508).

Then, the camp-on control unit 2-3 in the CTI server 2b sets the monitor time contained in the received status monitor request information in an internal register, etc. (S1509).

Furthermore, the camp-on control unit 2-3 in the CTI server 2b instructs private branch exchange 1b (shown in FIG. 10) belonging to the office b to start monitoring the status of the telephone 4b corresponding to the monitor telephone number converted into the internal number format through the exchange-unit communications unit 2-1 (shown in FIG. 11) in the CTI server 2b (S1511). This instructing operation is performed based on the interface standard called Versit TSAPI as described above.

As a result, the private branch exchange 1b belonging to the office b starts monitoring the status of the telephone 4b belonging to the office b. The private branch exchange 1b notifies the camp-on control unit 2-3 in the CTI server 2b through the exchange-unit communications unit 2-1 in the CTI server 2b of the release of a call (S1514) when the telephone 4b is disconnected (S1512) within the monitor time set in S1509 and the status of the telephone 4b becomes ready (S1513).

When the camp-on control unit 2-3 in the CTI server 2b receives the notification, it instructs the private branch exchange 1b to terminate the monitoring (S1515).

As shown in FIG. 25, the camp-on control unit 2-3 generates the status notification information in which 'termination of status monitor' is set in the response type field, the request number (refer to FIG. 24) set in the status monitor request information which activated the above described status monitor control is set in the request number field, and 'disconnection' is set in the status field. The camp-on control unit 2-3 then issues an instruction to transmit the generated information to the CTI server 2a belonging to the office a (S1516). This transmitting instruction is assigned the IP address of the CTI server 2a belonging to the office a stored when the camp-on request information was received.

As a result, the communications control unit 2-2 in the CTI server 2b belonging to the office b transmits the above described status notification information to the communications control unit 2-2 (refer to S1304) in the CTI server 2a belonging to the office a for which a connection has already been established (S1517). This transmitting operation is performed through the computer network 5 based on a LAN protocol such as an Ethernet LAN protocol, an ATM LAN protocol, etc., and based on a global network protocol such as a Transmission Control Protocol/Internet Protocol (TCP/IP), etc. as described above.

Upon receipt of the above described state notification information through the communications control unit 2-2, the camp-on control unit 2-3 in the CTI server 2a belonging to the office a generates the status monitor termination information in which 'termination of status monitor' is set in the response type field, the request number (refer to FIG. 24) set in the status monitor request information which activated the above described status monitor control is set in the request number field, and issues to the communications control unit 2-2 in the CTI server 2b belonging to the office b an instruction to transmit the generated information to the CTI server 2a belonging to the office a. This transmitting instruction is assigned the IP address of the CTI server 2b belonging to the office b retrieved using the CTIDB when the state monitor request information corresponding to the request number is edited. As a result, the communications control unit 2-2 in the CTI server 2a belonging to the office a transmits the above described status monitor termination information to the IP address corresponding to the CTI server 2b belonging to the office b (S1518).

Upon receipt of the above described status monitor termination information through the communications control unit 2-2 in the CTI server 2b, the camp-on control unit 2-3 in the CTI server 2b belonging to the office b terminates the status monitor control corresponding to the request number contained in the received state monitor termination information.

After transmitting the status monitor termination information, the camp-on control unit 2-3 in the CTI server 2a belonging to the office a terminates the connection to the CTI server 2b by instructing the communications control unit 2-2 in the CTI server 2b belonging to the office b to disconnect.

Although it is not specifically related to the present invention, the CTI server 2b can transmit to the CTI server 2a the state notification information (shown in FIG. 25) in which 'arrival' or 'reply' is set in a status field as shown in FIG. 27 when the private branch exchange 1b detects an arrival or reply from the telephone 4b during the execution of the status monitor control of the CTI server 2a by the CTI server 2b.

Upon receipt of the status notification information from the CTI server 2b belonging to the office b about the above described disconnection of the telephone 4b, the camp-on control unit 2-3 in the CTI server 2a belonging to the office a edits the exchange request information based on the destination number, the source telephone number, and the telephone network type contained in the telephone connection request information which activates the status monitor control (S1520 and S1521).

Then, the camp-on control unit 2-3 transmits the above described exchange request information as a two-point connection request to the private branch exchange 1a belonging to the office a through the exchange-unit communications unit 2-1 in the CTI server 2a (S1522). This transmitting operation is performed based on the interface standard called Versit TSAPI as described above.

Upon receipt of the above described two-point connection request, the private branch exchange 1a dials the number of the telephone 4b belonging to the office b (S1523). When receiving a reply from the telephone 4b through the telephone network 6 (FIG. 10) and the private branch exchange 1b belonging to the office b (S1524), the private branch exchange 1a dials the number of the telephone 4a belonging to the office a (S1525). When receiving a reply from the telephone 4a (S1526), the private branch exchange 1a returns a reply to the CTI server 2*a* belonging to the office a (S1527). This returning operation is performed based on the interface standard called Versit TSAPI as described above.

As described later, when the camp-on control unit 2-3 in the CTI server 2*a* receives the status notification information indicating a time-out (failure in status monitor) or the status notification information indicating that, although not relating to the present invention, the telephone 4*b* receives or answers a call, the above described process for a two-point connection request is not performed (NO in S1520).

The result of the above described two-point connection control or the status of arrival or reply notified according to the status notification information is notified from the CTI server 2*a* to the WS 3*a* and displayed on the display screen of the WS 3*a*, when 'issue' is specified in the issue/non-issue of a result notification field contained in the telephone connection request information by a series of processes in S1528 through S1531 shown in FIG. 15 as in the processes in S1324 through S1328 shown in FIG. 13.

Described below is the sequence of the operations shown in FIG. 16 as an example of a process in S1212 shown in FIG. 12 as described above. The sequence of the operations corresponds to an example in which the two-point connection does not normally terminate by monitoring of the status of the telephone 4*b* by the CTI server 2*b* belonging to the office b according to the status monitor request information from the CTI server 2*a* belonging to the office a, and performing of the two-point connection based on the monitor result by the CTI server 2*a* belonging to the office a, not by the CTI server 2*b* belonging to the office b.

Figure 16:
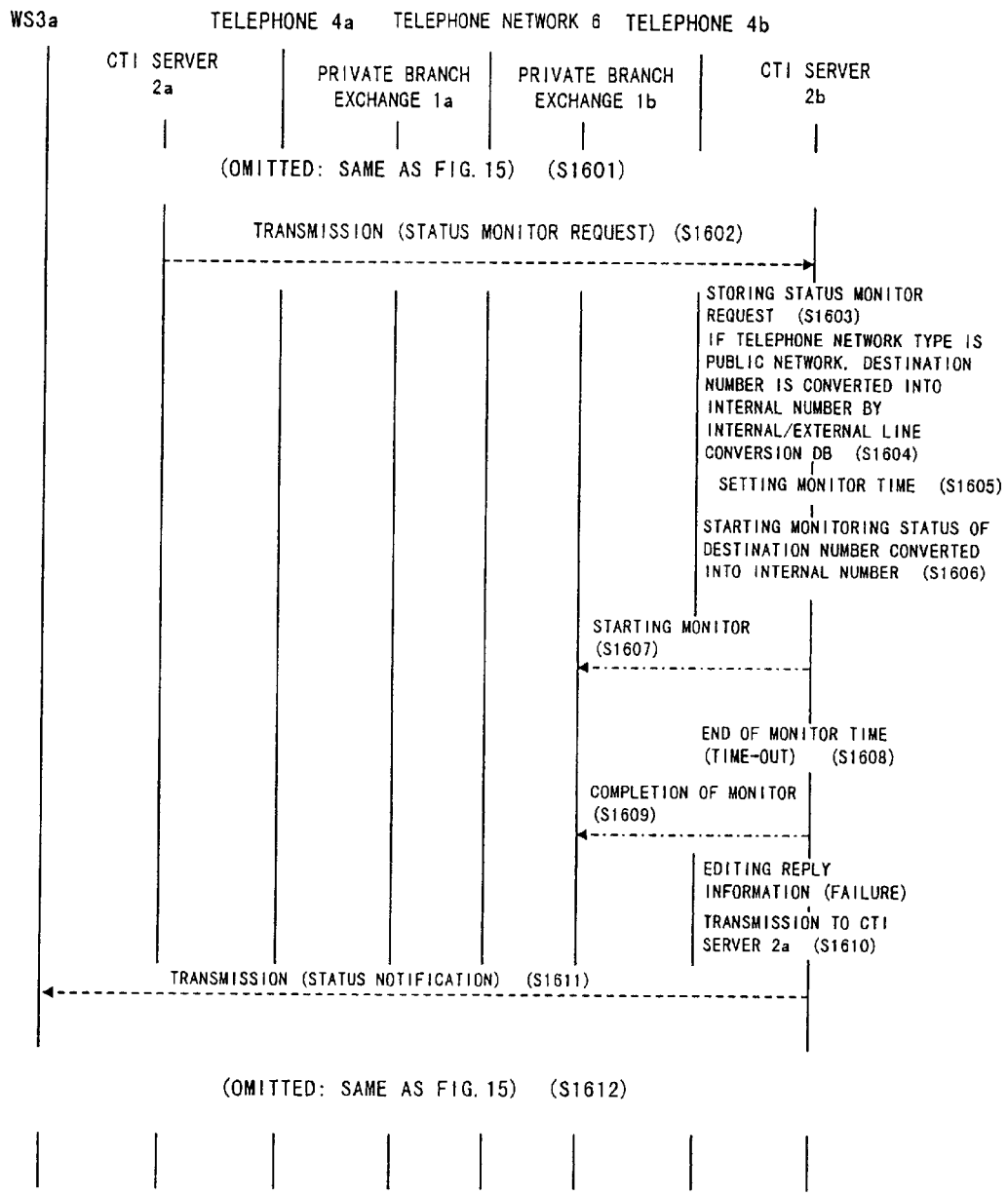
FIG. 16 shows the sequence (5) of the operations according to the second preferred embodiment of the present invention.

As in the processes in S1501 through S1505 shown in FIG. 15, the camp-on control unit 2-3 in the CTI server 2*a* belonging to the office a determines the execution/non-execution of camp-on control (S1501), edits the status monitor request information if the camp-on control is executed (S1502), and controls the transmission (S1503 through S1505) of the status monitor request information to the CTI server 2*b* belonging to the office b (S1601 shown in FIG. 16). As in the process in S1506 shown in FIG. 15, the status monitor request information is transmitted from the CTI server 2*a* to the CTI server 2*b* (S1602).

The series of the processes of receiving status monitor request information, instructing the start of monitoring the private branch exchange 1*b* belonging to the office b, etc. in S1603 through S1607 shown in FIG. 16 are similar to the series of processes in S1507 through S1511 shown in FIG. 15.

If the monitor time (refer to S1605) set with the telephone 4*b* connected is ended (time-out) after the monitor on the telephone 4*b* has started in the private branch exchange 1*b* (S1608), then the camp-on control unit 2-3 in the CTI server 2*b* instructs the private branch exchange 1*b* to terminate the monitoring (S1609).

As shown in FIG. 25, the camp-on control unit 2-3 generates the status notification information in which 'termination of status monitor' is set in the response type field, the request number (refer to FIG. 24) which is the same data set in the status monitor request information which activated the above described status monitor control is set in the request number field, and 'failure' is set in the status field. The camp-on control unit 2-3 then issues an instruction to transmit the generated information to the CTI server 2*a* belonging to the office a (S1610). Based on this, the communications control unit 2-2 in CTI server 2*b* executes the transmitting operation of the status notification information (S1611).

The subsequent controlling operations in the CTI server 2*a* belonging to the office a are similar to the operations in S1518 through S1531 shown in FIG. 15. However, upon receipt of the status notification information indicating the time-out (failure in status monitor) as described above, the camp-on control unit 2-3 in CTI server 2*a* does not process the two-point connection request in S1521 through S1527 shown in FIG. 15 (NO in S1520), the camp-on result notification information indicating a 'failure' is provided by the CTI server 2*a* for the WS 3*a*, and the failure notification is displayed on the display screen of the WS 3*a* (S1612).

Third Preferred Embodiment

Figure 28:
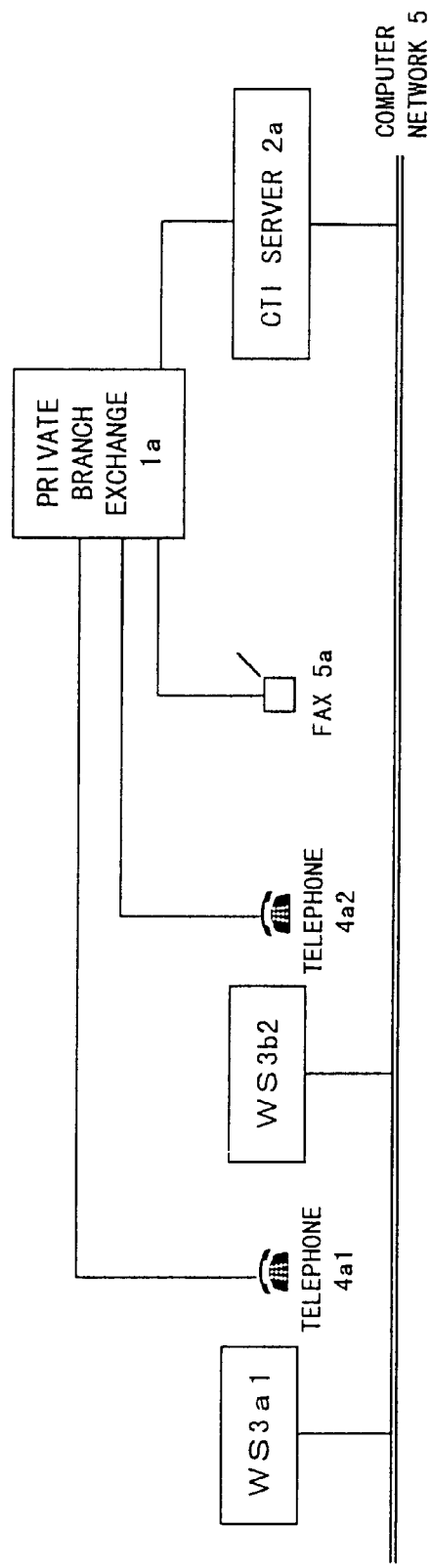
FIG. 28 shows the configuration (1) of the system according to the third preferred embodiment of the present invention.
Figure 29:
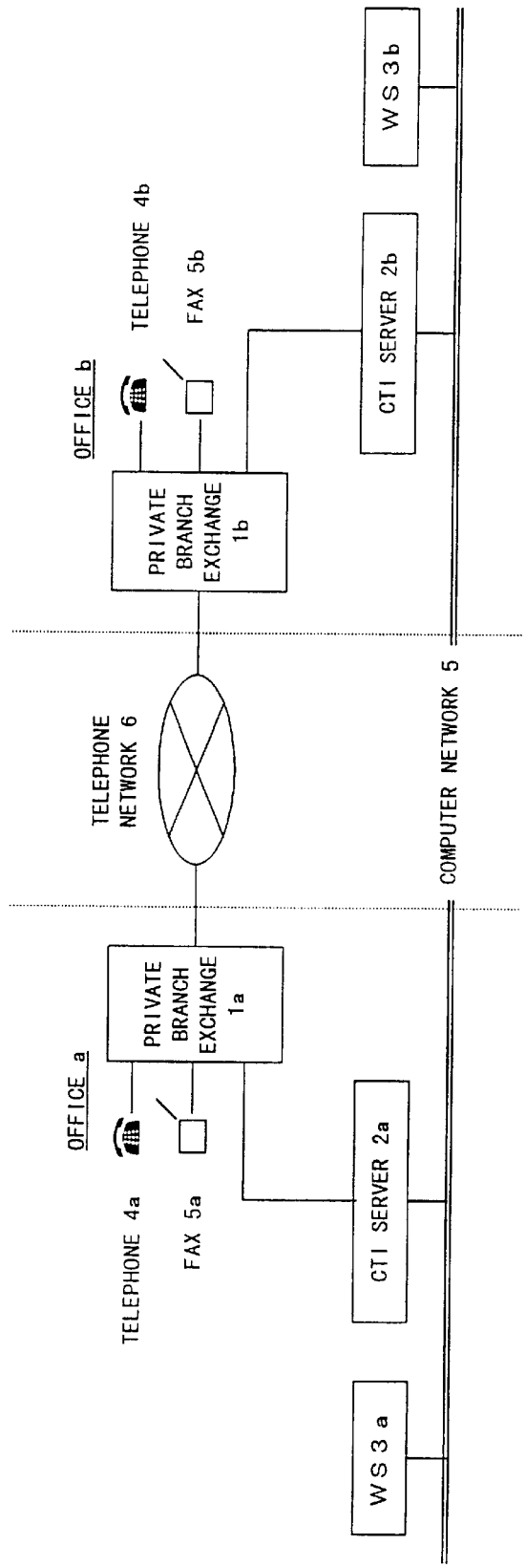
FIG. 29 shows the configuration (2) of the system according to the third preferred embodiment of the present invention.

FIGS. 28 and 29 show the configuration of the system according to the third preferred embodiment of the present invention.

The feature of the third preferred embodiment is not to realize camp-on control through the communications based on a special communications protocol between the WS 3 and the CTI server 2 or between two CTI servers 2 as in the first or second preferred embodiment, but to realize it through an operation of sending predetermined electronic mail from the WS 3 requesting the camp-on control to the CTI server 2 belonging to the destination telephone 4.

With the system configuration shown in FIG. 28, a telephone 4*a*1, a telephone 4*a*2, a FAX device 5*a*, etc. are connected to the private branch exchange 1*a* in the office a, and the private branch exchange 1*a* is controlled by the CTI server 2*a* connected to the computer network 5.

With the system configuration shown in FIG. 28, when a user of the telephone 4*a*1 requests to perform the camp-on control to a user of the telephone 4*b*2, the user of the telephone 4*a*1 transmits electronic mail (hereinafter referred to simply as mail) requesting the camp-on to the user of the telephone 4*b*2 by operating the WS 3*a*1. This mail is received by the CTI server 2*a* controlling the telephones 4*a*1 and 4*b*2. This CTI server 2*a* performs the camp-on control between the telephones 4*a*1 and 4*b*2 according to the exchange information set in the received mail.

With the system configuration shown in FIG. 29, as in the case according to the first or second preferred embodiment (shown in FIG. 1 or 10) described above, the telephone 4*a* or the FAX device 5*a*, etc. belonging to the office a is connected to the telephone network 6, which is a public network, through the private branch exchange 1*a*, and the telephone 4*b* or the FAX device 5*b*, etc. belonging to the office b is connected to the telephone network 6, which is a public network, through the private branch exchange 1*b*. The offices a and b are interconnected through the computer network 5. The WS 3*a* which can be operated by the user of the telephone 4*a* and the CTI server 2*a* capable of controlling the private branch exchange 1*a* belonging to the office a are connected to a part of the computer network 5 belonging to the office a. The WS 3*b* operated by the user of the telephone 4*b* and the CTI server 2*b* capable of controlling the private branch exchange 1*b* belonging to the office b are connected to a part of the computer network 5 belonging to the office b.

With the system configuration shown in FIG. 29, for example, when a user of the telephone 4*a* belonging to the office a requests to perform the camp-on to a user of the telephone 4*b* belonging to the office b, the user of the telephone 4*a* transmits electronic mail requesting the camp-on to the user of the telephone 4*b* by operating the WS 3*a*. This mail is relayed by the CTI server 2*a* controlling the telephone 4*a* and received by the CTI server 2*b* controlling the telephone 4b. This CTI server 2b performs the camp-on control between the telephones 4a and 4b according to the exchange information set in the received mail.

Figure 30:
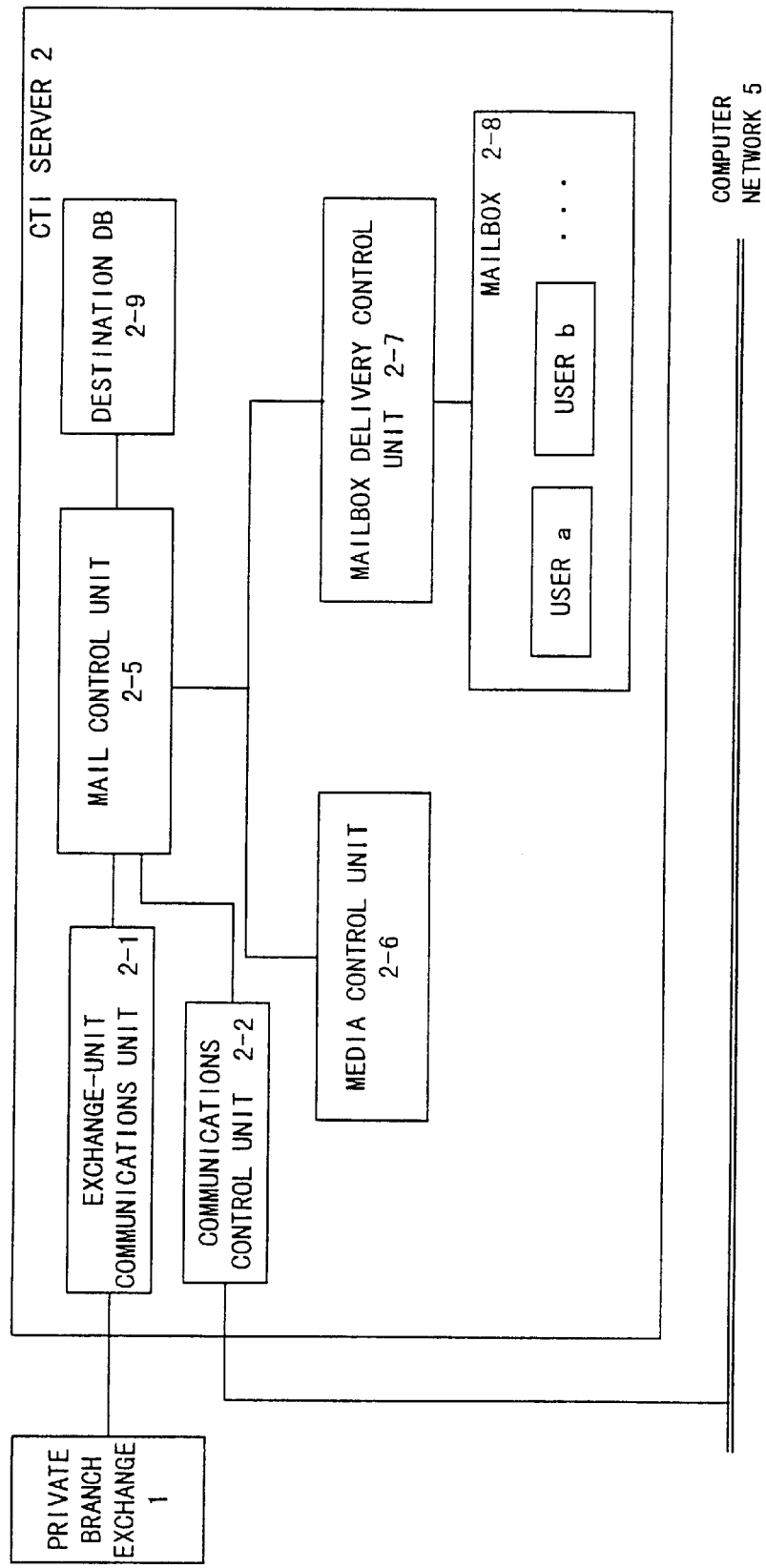
FIG. 30 shows the configuration of the CTI server according to the third preferred embodiment of the present invention.

FIG. 30 shows the configuration of the CTI server 2 (corresponding to the CTI servers 2a and 2b shown in FIGS. 28 and 29) according to the third preferred embodiment of the present invention. The CTI server 2 comprises the exchange-unit communications unit 2-1, the communications control unit 2-2, a mail control unit 2-5, the media control unit 2-6, the mailbox delivery control unit 2-7, the mailbox 2-8, and the destination DB 2-9.

The exchange-unit communications unit 2-1 and the communications control unit 2-2 are similar to those shown in FIG. 2 or 11 according to the first or second preferred embodiment respectively.

The mail control unit 2-5 controls the entire operations of transmitting, receiving and relaying the mail relating to a user belonging to a domain under the control of the CTI server 2 containing the mail control unit 2-5. It comprises a mail procedure unit 2-5-1, a service control unit 2-5-2, and a message determination unit 2-5-3 as shown in FIG. 31.

Figure 32:
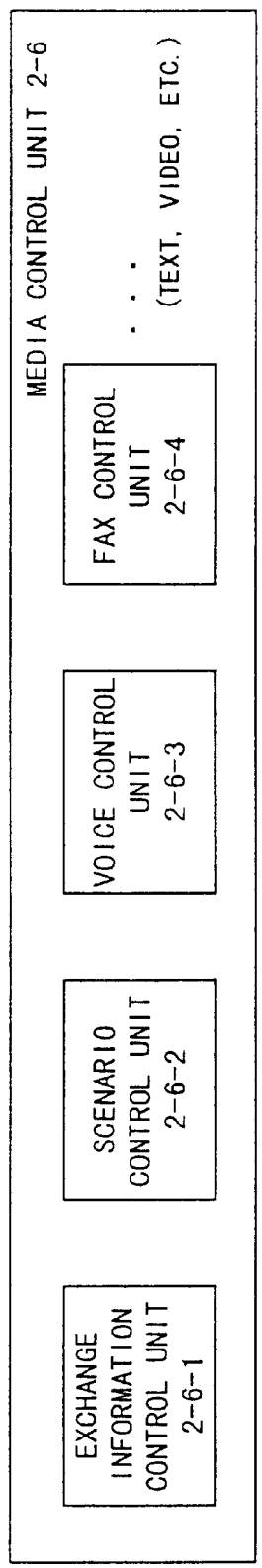
FIG. 32 shows the configuration of the media control unit.

The media control unit 2-6 controls the information for each medium contained in the mail, and comprises an exchange information control unit 2-6-1, scenario control unit 2-6-2, a voice control unit 2-6-3, a FAX control unit 2-6-4, etc., as shown in FIG. 32.

The mailbox delivery control unit 2-7 controls the delivery of received mail to the mailbox 2-8 of a destination user.

Figure 33:
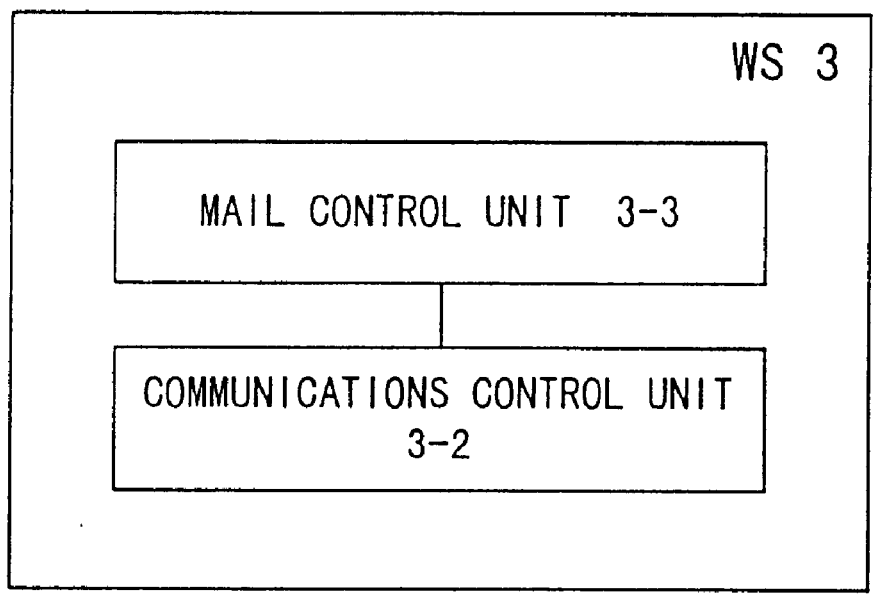
FIG. 33 shows the configuration of the Work Station according to the third preferred embodiment of the present invention.

FIG. 33 shows the configuration of the WS 3 (corresponding to the WS 3a1 or WS 3b shown in FIG. 28 or 29) according to the third preferred embodiment of the present invention. The WS 3 comprises the mail control unit 3-3 and the communications control unit 3-2.

The mail control unit 3-3 controls editing, transmitting, receiving, etc. of mail.

The communications control unit 3-2 is similar to that according to the first of second preferred embodiment shown in FIG. 3.

Figure 34:
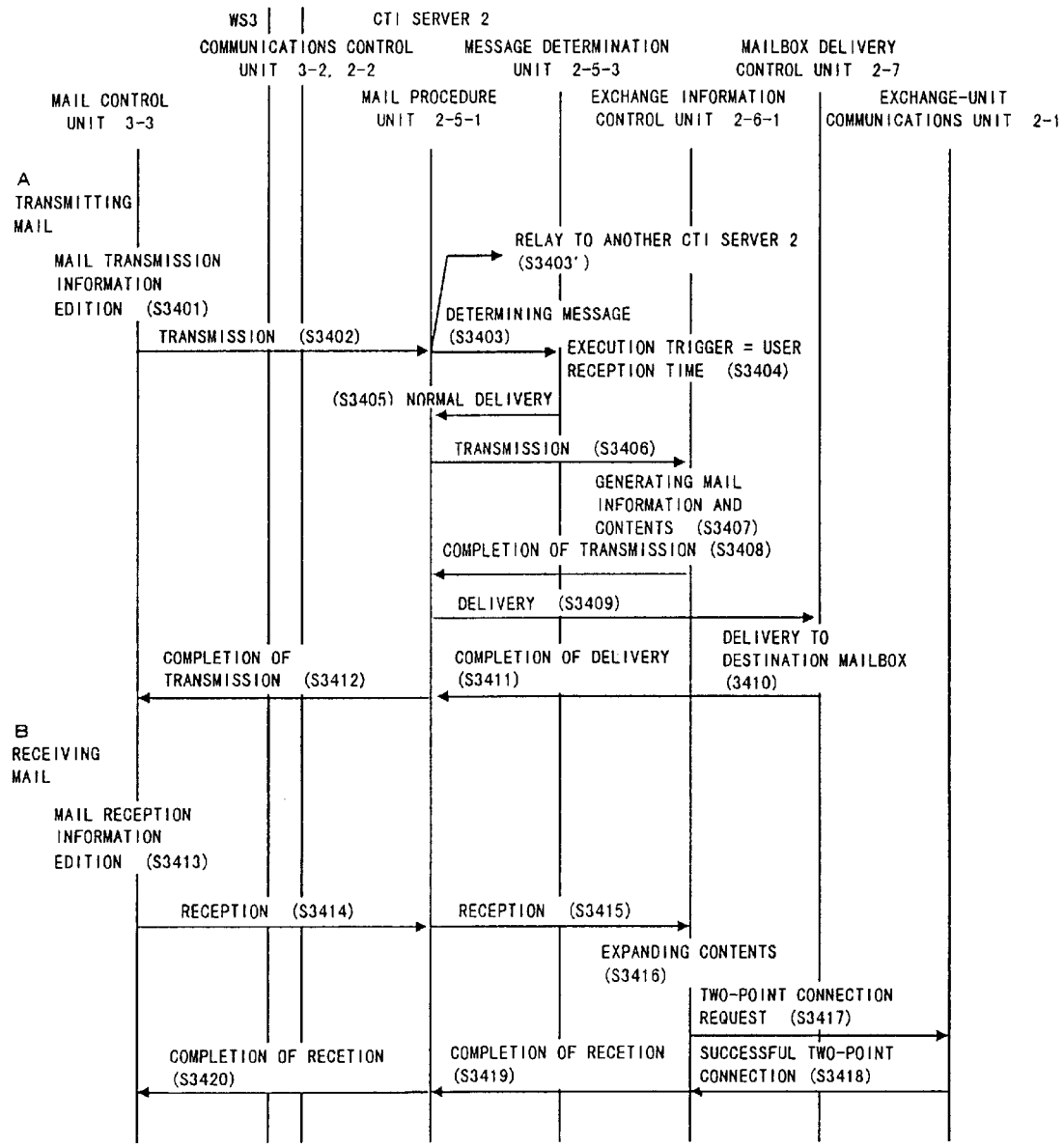
FIG. 34 shows the sequence (1) of the operations according to the third preferred embodiment of the present invention.
Figure 35:
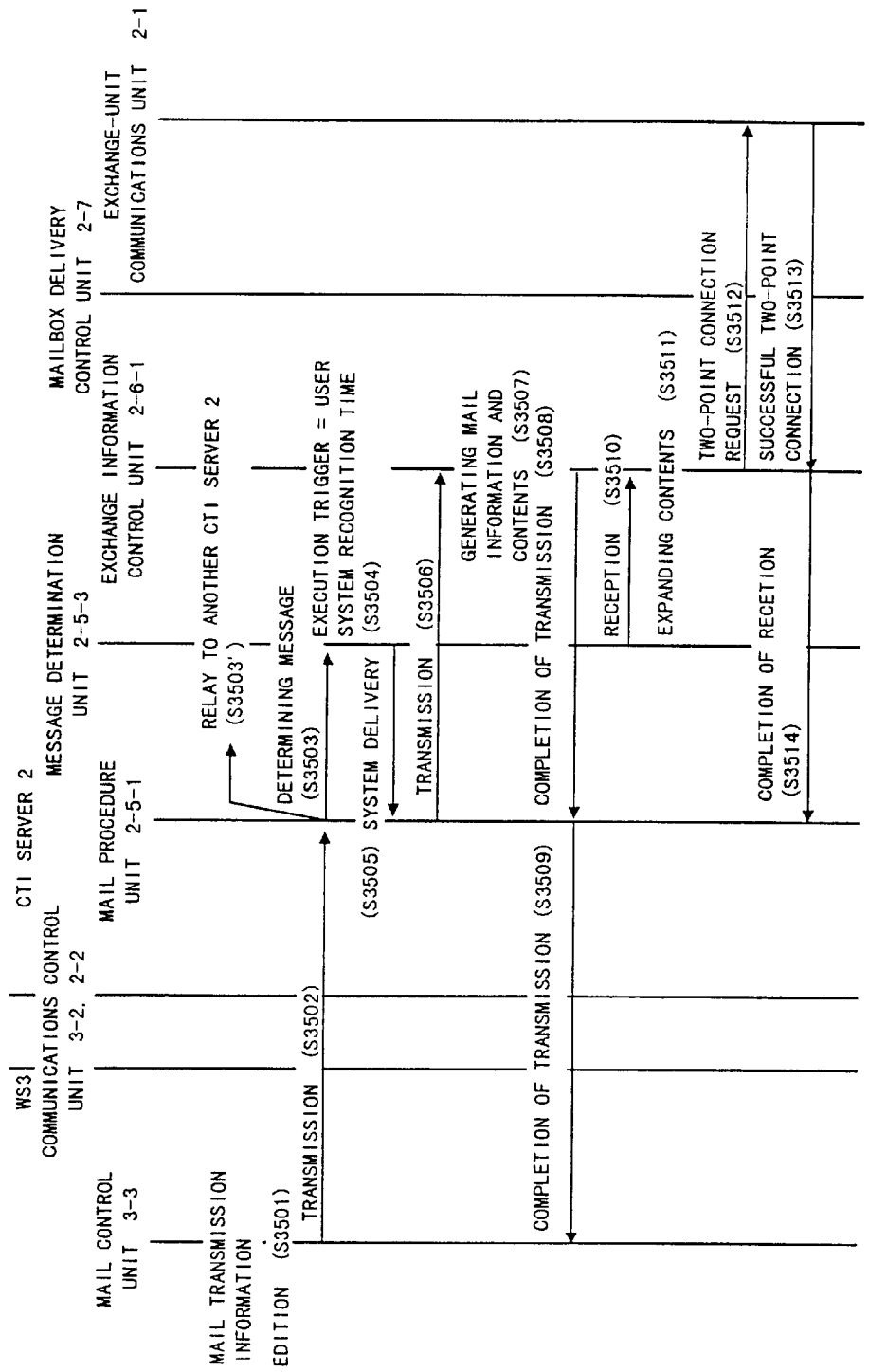
FIG. 35 shows the sequence (2) of the operations according to the third preferred embodiment of the present invention.

FIGS. 34 through 36 show the sequence of the operations according to the third preferred embodiment with the configuration shown in FIGS. 29 through 33.

First, FIG. 34 shows the sequence of the operations indicating the camp-on control when 'user reception time' is set in the execution trigger field (refer to FIG. 39) in the exchange information contained in the mail. That is, if the execution trigger field contains the user reception time, the two-point connection control is not performed until the transmitted mail is received by the destination user. This control is effective when a telephone call can be made at any time and the destination user is sure to answer the telephone. That is, the telephone of the destination user can be reliably connected by performing the two-point connection control when the destination user performs a mail receiving operation.

FIG. 34 shows an operation A when mail is transmitted.

First, the source user edits transmission information mail by operating the WS 3 (S3401). This operation is controlled by the mail control unit 3-3 (FIG. 33) in the WS 3.

When the source user issues a mail transmission instruction to transmit mail, the edited mail is transmitted from the mail control unit 3-3 in the WS 3 to the CTI server 2, for controlling a domain to which the WS 3 belongs, through the communications control unit 3-2 (S3402). This transmitting operation is performed through the computer network 5 as described above based on a LAN protocol such as an Ethernet LAN protocol, an ATM LAN protocol, etc., and based on a global network protocol such as a Transmission Control Protocol/Internet Protocol (TCP/IP), etc., and, for example, an SMTP (simple mail transfer protocol) for communicating mail.

The transmitted mail is received by the service control unit 2-5-2 (FIG. 31) in the mail control unit 2-5 (FIG. 30) through the communications control unit 2-2 in the CTI server 2.

The service control unit 2-5-2 performs a timing process control process shown in the flowchart of the operations shown in FIG. 37 on the mail received from the WS 3 in the domain (hereinafter referred to as a current domain) under control of the CTI server 2 containing the service control unit 2-5-2. This process timing control process can be designed to be performed immediately before performing the message determining process described later by the CTI server 2.

First, the service control unit 2-5-2 determines whether or not 'time specification' is set as a service type (refer to FIG. 39) contained in the received mail (S3701).

Unless the 'time specification' is set as a service type, the mail procedure unit 2-5-1 activates an express delivery service control unit, a confidential mail service control unit, etc. (refer to FIG. 31), and immediately instructs the mail procedure unit 2-5-1 (FIG. 31) to start the message processes for relaying mail as described later or determining a message (S3704).

If the 'time specification' is set as a service type, the service control unit 2-5-2 activates a time specification service control unit (refer to FIG. 31). The time specification service control unit repeats the process of checking the delivery time (refer to FIG. 39) set in the received mail and determining whether or not the current time has passed the above described delivery time (repetition of the processes S3702→S3703→S3702).

When the time specification service control unit determines that the current time has passed the above described delivery time, it instructs the mail procedure unit 2-5-1 (FIG. 31) to start the message processes for relaying mail or determining a message as described later (S3703→S3704).

When the mail procedure unit 2-5-1 starts the message process, it first determines whether or not the domain, to which the destination user belongs, contained in the received mail (hereinafter referred to as a destination domain) matches the domain under control of the CTI server 2 containing the mail procedure unit 2-5-1, that is, the current domain.

If the above described destination domain does not match the current domain, the mail procedure unit 2-5-1 obtains the IP address of the CTI server 2 controlling the destination domain by referring to the destination DB (database) 2-9 shown in FIG. 30 having the data configuration shown in FIG. 38, relays the mail to the retrieved CTI server 2 through the communications control unit 2-2 (FIG. 30) (S3403' in FIG. 34). If the mail procedure unit 2-5-1 is designed to have a standard mail transfer agent such as a sendmail system, etc. as a base in the Internet, then the mail procedure unit 2-5-1 sends an inquiry to a DNS server (domain name system server) distributed through the Internet to obtain the IP address of the CTI server 2 controlling the destination domain so that the destination DB 2-9 need not be stored.

As described above, the mail received by the mail procedure unit 2-5-1 in the mail control unit 2-5 through the communications control unit 2-2 in the CTI server 2 can be transmitted from the WS 3 in the current domain, or can be relayed by the CTI server 2 in another domain.

If the destination domain set in the received mail matches the current domain, the mail procedure unit 2-5-1 requests the message determination unit 2-5-3 (FIG. 31) to perform the following message determining process (S3403 in FIG. 34). With the system configuration shown in FIG. 28, the mail transmitted from the WS 3a1 belonging to the office a is received by the mail procedure unit 2-5-1 in the CTI server 2a belonging to the office a which controls the domain to which the WS 3a1 belongs, and the mail procedure unit 2-5-1 detects the matching between the destination domain and the current domain. With the system configuration shown in FIG. 29, the mail transmitted from the WS 3a belonging to the office a is received by the mail procedure unit 2-5-1 in the CTI server 2a belonging to the office a which controls the domain to which the WS 3a belongs, and the mail procedure unit 2-5-1 detects the non-matching between the destination domain and the current domain. Thus, the relayed mail is received by the mail procedure unit 2-5-1 in the CTI server 2b belonging to the office b, and the mail procedure unit 2-5-1 detects the matching between the destination domain and the current domain.

Next, the message determination unit 2-5-3 determines the contents of the execution trigger field in the exchange information contained in the received mail. In the sequence of the operations shown in FIG. 34, the message determination unit 2-5-3 determines that 'user reception time' is set in the execution trigger field (S3404).

In this case, the message determination unit 2-5-3 instructs the mail procedure unit 2-5-1 to perform normal delivery (S3405).

When the mail procedure unit 2-5-1 is instructed to perform the normal delivery and the received mail contains the contents of the exchange information, the mail procedure unit 2-5-1 transmits the received mail to the exchange information control unit 2-6-1 (FIG. 32) in the media control unit 2-6 (FIG. 30) (S3406).

Figure 39:
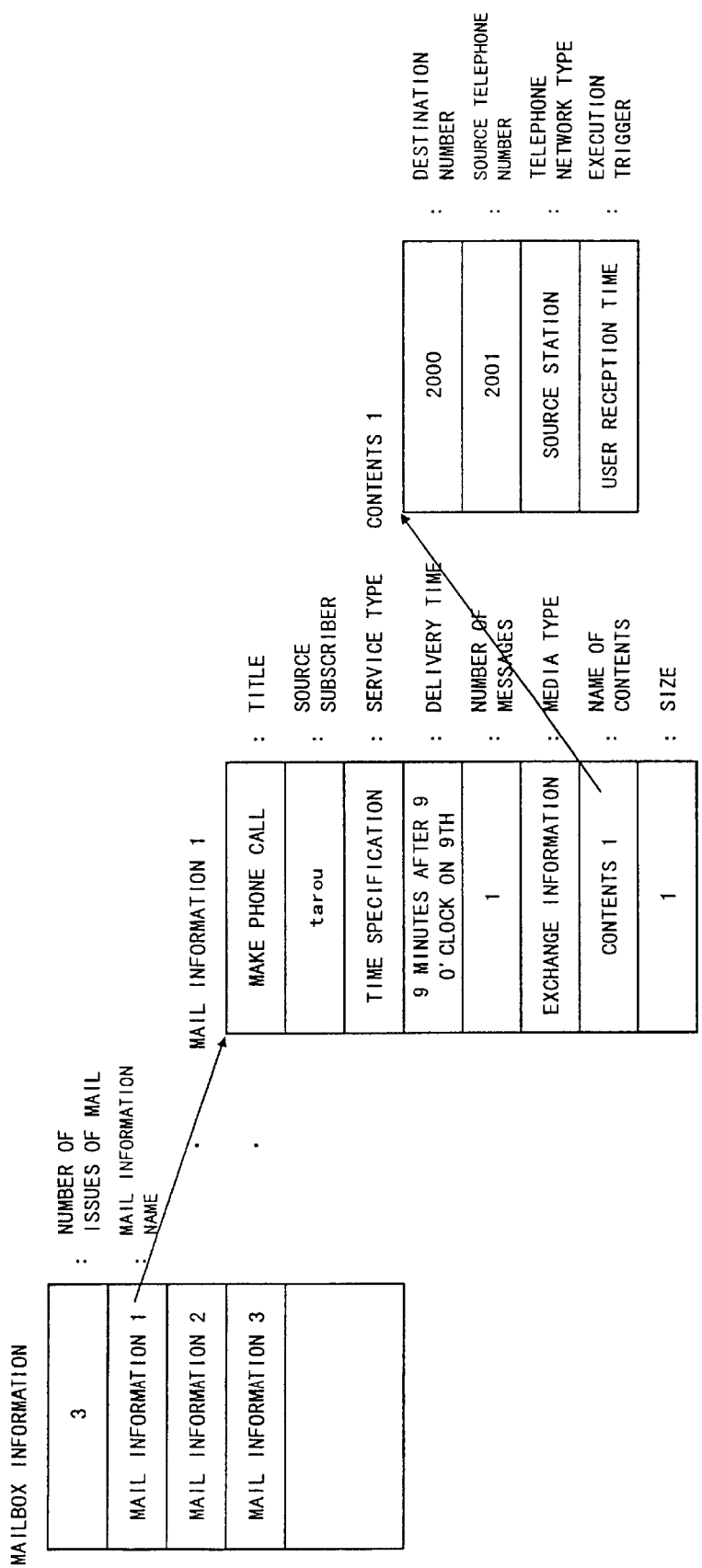
FIG. 39 shows an example (1) of the configuration of the data of mail information and contents.
Figure 40:
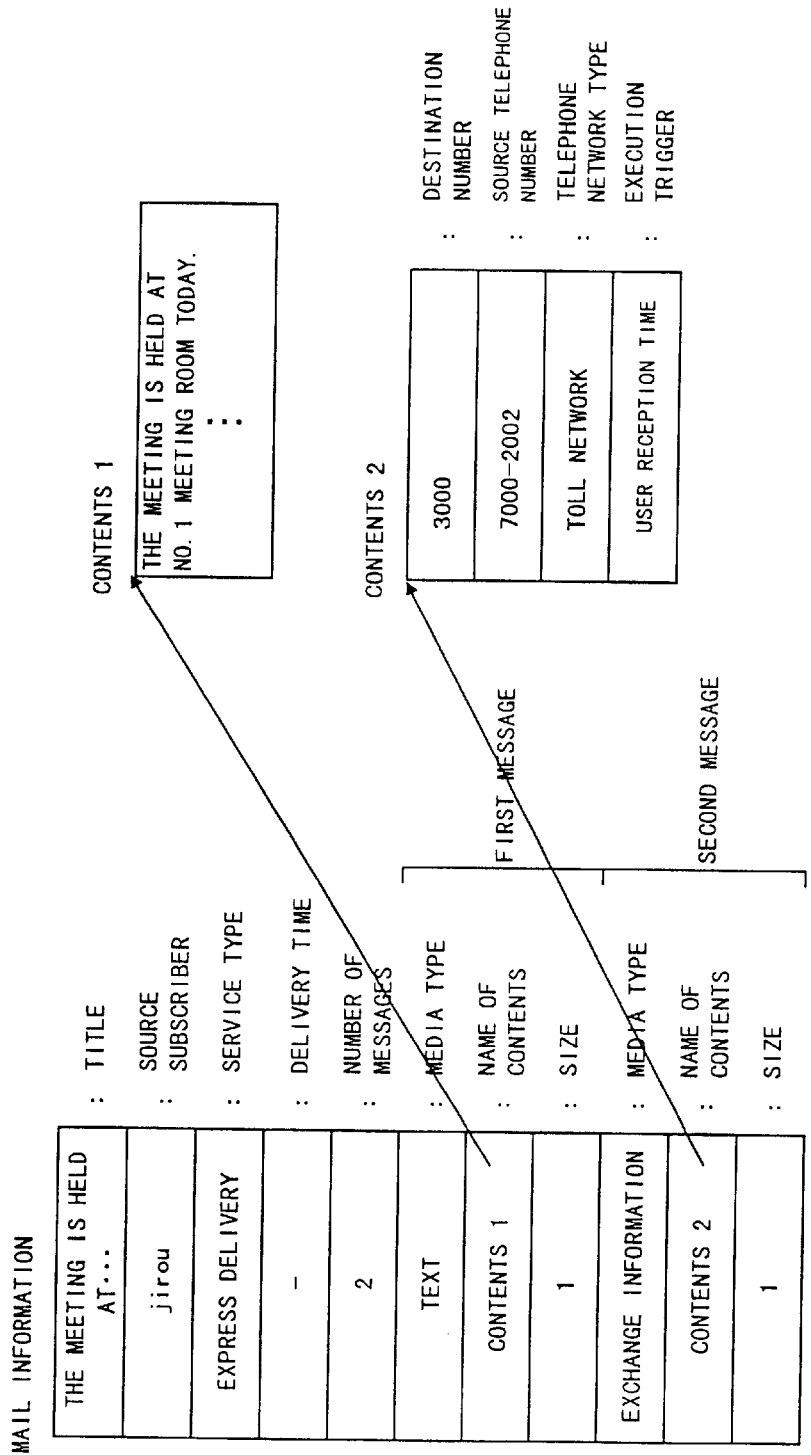
FIG. 40 shows an example (2) of the configuration of the data of mail information and contents.
Figure 41:
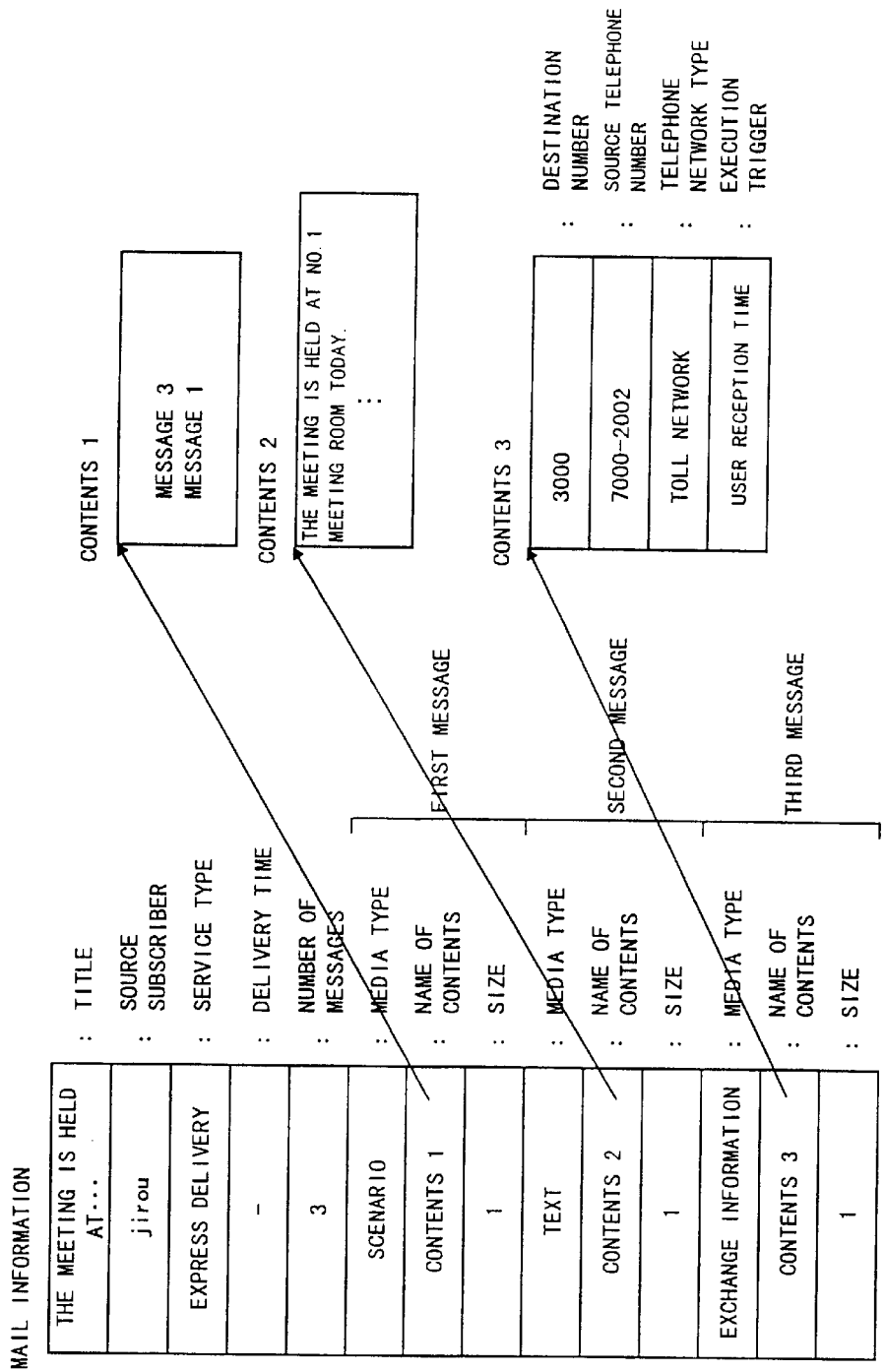
FIG. 41 shows an example (3) of the configuration of the data of mail information and contents.

The exchange information control unit 2-6-1 extracts the contents including exchange information from the mail information contained from the received mail as shown in FIG. 39, 40, or 41 (S3407). In this case, the contents corresponding to the exchange information includes a destination number, a source telephone number, a telephone network type, and an execution trigger. After the process, the exchange information control unit 2-6-1 notifies the mail procedure unit 2-5-1 of the completion of the transmission (S3408).

When the mail procedure unit 2-5-1 is instructed by the message determination unit 2-5-3 to perform the normal delivery, and the mail procedure unit 2-5-1 receives a transmission completion notification from the exchange information control unit 2-6-1, it requests the mailbox delivery control unit 2-7 (FIG. 30) to deliver the received mail (S3409).

As a result, the mailbox delivery control unit 2-7 delivers to the mailbox 2-8 corresponding to the destination user contained in the received mail, mail link data having a mail information name corresponding to the mail information and to which the mail information and the contents generated by the exchange information control unit 2-6-1 are linked as shown in FIG. 39 (S3410). The mail link data in the mailbox 2-8 and the mail information and the contents linked to the mail link data are stored in the file system (not shown in the attached drawings) in the CTI server 2. With the system configuration shown in FIG. 28, the mail link data corresponding to the mail transmitted from the WS 3a1 belonging to the office a is delivered, by the mailbox delivery control unit 2-7 in the CTI server 2a belonging to the office a which controls a domain to which the WS 3a1 belongs, to the user having an account in the WS 3a 2 belonging to the office a. On the other hand, with the system configuration shown in FIG. 29, the mail transmitted from the WS 3a belonging to the office a is relayed by the CTI server 2a and then delivered to the user having an account in the WS 3b belonging to the office b by the mailbox delivery control unit 2-7 in the CTI server 2b belonging to the office b.

After this process, the mailbox delivery control unit 2-7 notifies the mail procedure unit 2-5-1 of the completion of the delivery (S3411).

When the mail procedure unit 2-5-1 receives the completion of delivery notification from the mailbox delivery control unit 2-7, it notifies the WS 3, which is the transmission source of the mail, of the completion of the transmission by electronic mail (S3412).

The mail transmitting operation A completes after a series of the above described operations in S3401 through S3412 shown in FIG. 34.

The mail receiving operation B is described below by referring to FIG. 34. When a destination user performs a mail receiving operation in the mail receiving operation B, the two-point connection control is performed.

First, when the destination user operates the WS 3, the mail reception information is edited (S3413). To be more concrete, by following a mail reception procedure such as POP (post office protocol), etc. in the WS 3, the destination user selects necessary data in the delivered mail link data from the mailbox 2-8 corresponding to the destination user in the CTI server 2 controlling the domain to which the WS 3 belongs. This operation is controlled by the mail control unit 3-3 in the WS 3 (FIG. 33). The WS 3 is the WS 3a1 belonging to the office a in the system configuration shown in FIG. 28, and the WS 3b belonging to the office b in the system configuration shown in FIG. 29.

Next, the destination user instructs the CTI server 2 controlling the domain to which the WS 3 belongs to receive the selected mail link data from the mail control unit 3-3 in the WS 3 through the communications control unit 3-2 (FIG. 33) (S3414). This reception instruction is transferred to the mail procedure unit 2-5-1 in the mail control unit 2-5 through the communications control unit 2-2 in the CTI server 2 (FIGS. 30 and 31). The above described CTI server 2 is a CTI server 2a belonging to the office a in the system configuration shown in FIG. 28, and a CTI server 2b belonging to the office b in the system configuration shown in FIG. 29.

Upon receipt of the above described reception instruction, the mail procedure unit 2-5-1 instructs the exchange information control unit 2-6-1 (FIG. 32) in the media control unit 2-6 (FIG. 30) to receive the contents (for example, contents 1 shown in FIG. 39) of the above described exchange information if the contents of the exchange information are linked to the mail link data corresponding to the reception instruction (S3415).

According to the above described instruction from the mail procedure unit 2-5-1, the exchange information control unit 2-6-1 expands the contents of the exchange information linked to the above described mail link data (S3416), generates the exchange request information based on the contents, and transmits the generated information as a two-point connection request to the private branch exchange 1 controlled by the CTI server 2 through the mail control unit 3-3 and the exchange-unit communications unit 2-1 (FIG. 30) in the CTI server 2 containing the exchange information control unit 2-6-1 (S3417). The private branch exchange 1 is a private branch exchange 1a belonging to the office a in the system configuration shown in FIG. 28, and a private branch exchange 1b belonging to the office b in the system configuration shown in FIG. 29. This transmitting operation is performed based on the interface standard called Versit TSAPI as described above.

Although not shown in the attached drawings, the private branch exchange 1 performs a two-point connection control as in the processes in S505 through S509 shown in FIG. 5 according to the above described first preferred embodiment. If the two-point connection is successfully performed, then a reply about the successful two-point connection is returned to the CTI server 2 to which the private branch exchange 1 is connected (S3418). This returning operation is also performed based on the interface standard called Versit TSAPI as described above. The reply is transferred to the exchange information control unit 2-6-1 (FIG. 32) in the media control unit 2-6 (FIG. 30) through the exchange-unit communications unit 2-1 and the mail control unit 2-5 (FIG. 30) in the CTI server 2.

Upon receipt of the reply about the successful two-point connection, the exchange information control unit 2-6-1 notifies the mail procedure unit 2-5-1 (FIG. 31) in the mail control unit 2-5 (FIG. 30) contained in the CTI server 2 containing the exchange information control unit 2-6-1 of the completion of the reception (S3419).

Upon receipt of the completion of reception notification, the mail procedure unit 2-5-1 notifies the mail control unit 3-3 in the WS 3, which performed the mail receiving operation, of the completion of the reception (S3420).

Upon receipt of a two-point connection failure notification from the private branch exchange 1, the exchange information control unit 2-6-1 repeats the two-point connection control as in the processes in S604 through S610 in FIG. 6 according to the first preferred embodiment described above.

In the above described series of the operations in S3413 through S3420 shown in FIG. 34, the two-point connection is made and the mail receiving operation B is completed.

FIG. 35 shows the sequence of the operations for performing the camp-on control when 'system recognition time' is set in the execution trigger field (refer to FIG. 39) in the exchange information contained in the mail. That is, if 'system recognition time' is set in the execution trigger field, the two-point connection control is performed when the transmitted mail is received by the destination CTI server 2. This control is effective when a telephone call should be made immediately. In this case, the transmitted mail is not delivered to the mailbox 2-8 of the destination user.

In FIG. 35, the source user first operates the WS 3 to edit the mail transmission information (S3501). This operation is controlled by the mail control unit 3-3 in the WS 3 (FIG. 33).

Then, as in step S3402 shown in FIG. 34, the source user instructs a mail transmission so as to transmit the edited mail from the mail control unit 3-3 in the WS 3 through the communications control unit 3-2 to the CTI server 2 controlling the domain to which the WS 3 belongs (S3502).

The transmitted mail is received by the mail procedure unit 2-5-1 (FIG. 31) in the mail control unit 2-5 (FIG. 30) through the communications control unit 2-2 in the CTI server 2.

Figure 37:
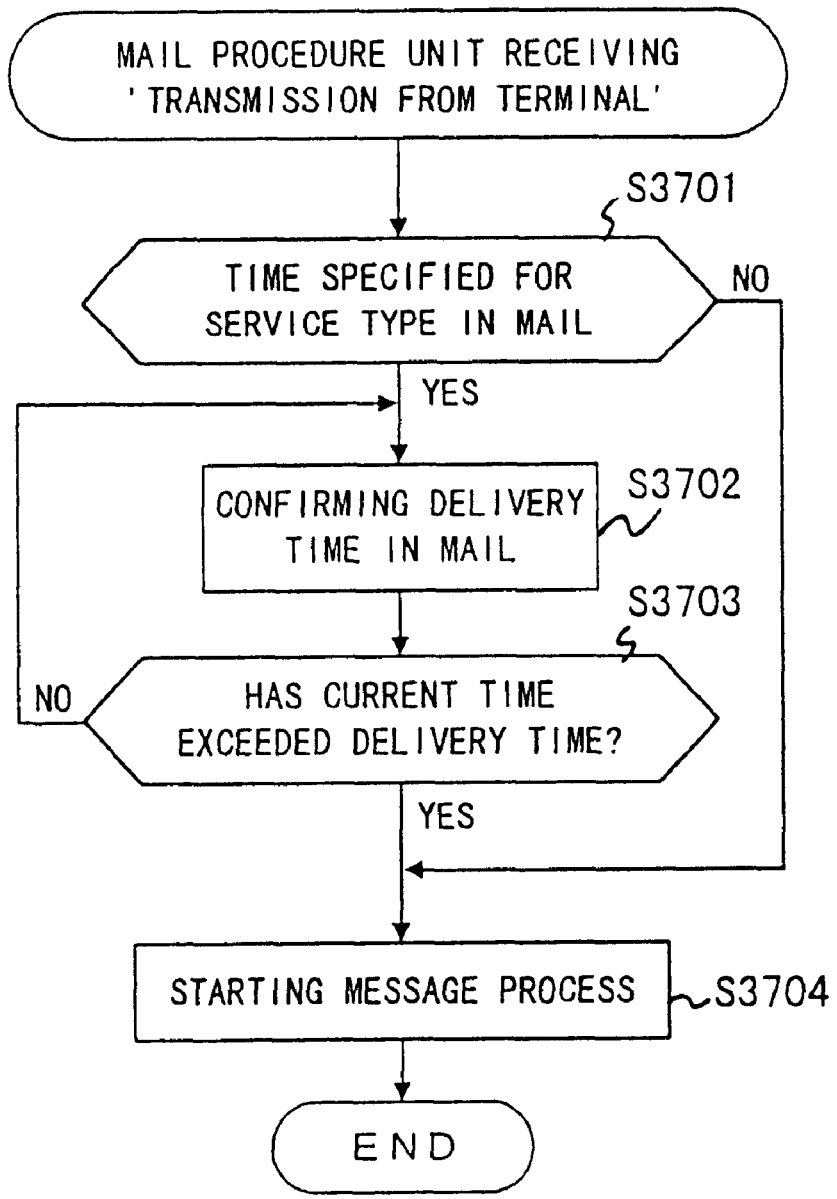
FIG. 37 is a flowchart showing the operations performed in the control process for each service type provided by the mail procedure unit.

The mail procedure unit 2-5-1 performs on the mail received from the WS 3 in the current domain the process timing control process in the flowchart of the operations shown in FIG. 37 described above.

When the mail procedure unit 2-5-1 starts the message process after controlling the process timing, it determines whether or not the destination domain of the received mail matches the current domain.

If the above described destination domain does not match the current domain, as in S3403' in FIG. 34, then the mail procedure unit 2-5-1 relays the mail to the destination CTI server 2 (S3503' shown in FIG. 35).

On the other hand, when the destination domain set in the received mail matches the current domain, then the mail procedure unit 2-5-1 requests the message determination unit 2-5-3 (FIG. 31) to perform the message determining process as described later (S3503 in FIG. 35).

The message determination unit 2-5-3 determines the contents of the execution trigger field in the exchange information contained in the received mail. In the sequence of the operations in FIG. 35, the message determination unit 2-5-3 determines that 'system recognition time' is set in the execution trigger field (S3504).

In this case, the message determination unit 2-5-3 instructs the mail procedure unit 2-5-1 to perform the system delivery (S3505).

If the system delivery is instructed and the contents of the exchange information are contained in the received mail, then the mail procedure unit 2-5-1 transmits the received mail to the exchange information control unit 2-6-1 (FIG. 32) in the media control unit 2-6 (FIG. 30) (S3506).

From the received mail, the exchange information control unit 2-6-1 extracts and generates the mail information and the contents containing the exchange information as shown in FIG. 39, 40, or 41 (S3507). After this process, the exchange information control unit 2-6-1 notifies the mail procedure unit 2-5-1 of the completion of transmission (S3508).

If the system delivery is instructed by the message determination unit 2-5-3 and the completion of transmission is notified by the exchange information control unit 2-6-1, then the mail procedure unit 2-5-1 does not request the mailbox delivery control unit 2-7 (FIG. 30) to deliver the mail, but notifies the WS 3, which is the transmission source of the mail, of the completion of transmission by electronic mail (S3509).

Unlike the case shown in FIG. 34, the mail procedure unit 2-5-1 instructs the exchange information control unit 2-6-1 (FIG. 32) in the media control unit 2-6 (FIG. 30) to receive the contents (for example, the contents 1 shown in FIG. 39) containing the exchange information generated by the exchange information control unit 2-6-1 in S3507 (S3510).

The exchange information control unit 2-6-1 expands the contents of the exchange information based on the instruction from the mail procedure unit 2-5-1 (S3511), generates the exchange request information based on the contents, and transmits the generated information as a two-point connection request to the private branch exchange 1 controlled by the CTI server 2 through the mail control unit and the exchange-unit communications unit 2-1 (FIG. 30) in the CTI server 2 containing the exchange information control unit 2-6-1 (S3512).

Although not shown in the attached drawings, the private branch exchange 1 performs a two-point connection control as in the processes in S505 through S509 shown in FIG. 5 according to the first preferred embodiment described above. If the two-point connection is successfully performed, then a reply about the successful two-point connection is returned to the CTI server 2 to which the private branch exchange 1 is connected (S3513).

Upon receipt of the reply about the successful two-point connection, the exchange information control unit 2-6-1 notifies the mail procedure unit 2-5-1 (FIG. 31) in the mail control unit 2-5 (FIG. 30) contained in the CTI server 2 containing the exchange information control unit 2-6-1 of the completion of the reception (S3414).

Upon receipt of a two-point connection failure notification, the exchange information control unit 2-6-1 repeats the two-point connection control as in the processes in S604 through S610 in FIG. 6 according to the first preferred embodiment described above.

In the above described series of the operations in S3501 through S3514 shown in FIG. 35, the two-point connection is made immediately after transmitting the mail.

In the camp-on controlling operation according to the third preferred embodiment, the transmitted mail can contain the contents of the exchange information (for example, the contents 2 shown in FIG. 40) and the contents of other media (for example, the contents 1 of a text shown in FIG. 40) as shown in FIG. 40.

Furthermore, as shown in FIG. 41, the mail can contain the contents of a scenario (for example, the contents 1 of the scenario shown in FIG. 41) to instruct the expansion order and method of processing the contents of each medium.

If the media type of the contents is text, the contents are displayed on the display screen of the WS 3 operated by the destination user when the mail is received. If the media type of the contents is voice, FAX, etc., the voice control unit 2-6-3, the FAX control unit 2-6-4, etc. in the media control unit 2-6 (FIG. 30) contained in the destination CTI server 2 processes each of the contents.

FIG. 36 shows the sequence of the operations indicating the destination user's receiving process on the mail including a voice message, an exchange information message, and a scenario shown in FIG. 42.

The mail transmission process is similar to a series of processes in S3401 through S3412 shown in FIG. 34.

In FIG. 36, as in S3413 shown in FIG. 34, the destination user first selects the mail link data in the mailbox 2-8 by operating the WS 3 and editing the mail reception information (S3601).

Next, as in the process in S3414 shown in FIG. 34, the destination user instructs the CTI server 2 controlling the domain to which the WS 3 belongs through the communications control unit 3-2 (FIG. 33) to receive the selected mail link data from the mail control unit 3-3 in the WS 3 (S3602).

Upon receipt of the above described reception instruction, the mail procedure unit 2-5-1 instructs the scenario control unit 2-6-2 (FIG. 32) in the media control unit 2-6 (FIG. 30) to receive the contents of the scenario (contents of the scenario shown in FIG. 42) linked to the mail link data corresponding to the above described reception instruction by recognizing that the contents of the scenario are contained in the mail link data corresponding to the reception instruction (S3603).

The scenario control unit 2-6-2 expands the contents of the scenario linked to the mail link data according to the above described instruction (S3604).

The scenario control unit 2-6-2 first recognizes the scenario play=message 3 in the contents shown in FIG. 42 to instruct the mail procedure unit 2-5-1 to receive the voice message 3 (S3605).

Based on the above described reception instruction, the mail procedure unit 2-5-1 instructs the voice control unit 2-6-3 (FIG. 32) in the media control unit 2-6 (FIG. 30) to receive the message 3 (S3606).

Based on the above described reception instruction, the voice control unit 2-6-3 generates voice connection request information for use in requesting the connection between the voice control board in the voice control unit 2-6-3 implemented in the CTI server 2 and the destination user telephone 4, and sends it as a two-point connection request to the private branch exchange 1 controlled by the CTI server 2 through the mail control unit and the exchange-unit communications unit 2-1 (FIG. 30) in the CTI server 2 containing the voice control unit 2-6-3 (S3607). The telephone number of the destination user telephone 4 is the destination number set in the exchange information message 2 in the received mail (for example, refer to FIG. 41). The above described private branch exchange 1 refers to the private branch exchange 1a belonging to the office a in the system configuration shown in FIG. 28, and refers to the private branch exchange 1b belonging to the office b in the system configuration shown in FIG. 29. This transmitting operation is also performed based on the interface standard called Versit TSAPI as described above.

Although not shown in the attached drawings, the private branch exchange 1 sequentially dials the numbers of the destination user telephone 4 and the voice control board in the voice control unit 2-6-3 according to the above described voice connection request information, and instructs the CTI server 2 to which the private branch exchange 1 is connected to reproduce the voice message 3 when the above described telephone 4 and the voice control board answer (S3608). This returning operation is also performed based on the interface standard called Versit TSAPI as described above. This reproduction instruction is transferred to the voice control unit 2-6-3 (FIG. 32) in the media control unit 2-6 (FIG. 30) through the exchange-unit communications unit 2-1 and the mail control unit 2-5 (FIG. 30) in the CTI server 2.

Upon receipt of the above described reproduction instruction, the voice control unit 2-6-3 instructs the voice control board which answers the private branch exchange 1 to reproduce the voice message 3.

When a two-point connection failure notification is received from the private branch exchange 1, the voice control unit 2-6-3 repeats the two-point connection control between the destination user telephone 4 and the voice control board within a predetermined monitor time.

Upon receipt of a notification of the communication disconnection between the above described telephone 4 and the voice control board from the private branch exchange 1 through the exchange-unit communications unit 2-1 and the mail control unit 2-5 (FIG. 30) in the CTI server 2, the voice control unit 2-6-3 notifies the mail procedure unit 2-5-1 of the reception completion (S3609).

Upon receipt of the above described notification of the reception completion, the mail procedure unit 2-5-1 notifies the scenario control unit 2-6-2 of the reception completion (S3610).

Upon receipt of the notification of the reception completion, the scenario control unit 2-6-2 instructs the mail procedure unit 2-5-1 to receive the exchange information message 2 with an inquiry by recognizing the contents of the scenario expanded in S3604 and shown in FIG. 42 and then the scenario 'pause=message 2' (S3611).

As a result, the mail procedure unit 2-5-1 transmits through the communications control unit 2-2 a reception inquiry request to the mail control unit 3-3 (FIG. 33) in the WS 3 operated by the destination user who received mail to inquire of the destination user whether or not the user receives the exchange information message 2 (S3612).

The destination user answers the reception inquiry request by operating the WS 3 (S3613). As a result, a reply to the reception inquiry is returned from the mail control unit 3-3 in the WS 3 to the mail procedure unit 2-5-1 (FIG. 31) in the mail control unit 2-5 through the communications control unit 2-2 in the CTI server 2 (S3614).

If the mail procedure unit 2-5-1 receives a reply to the reception inquiry that the destination user has not received the exchange information message 2 (NG), then the mail procedure unit 2-5-1 terminates the mail receiving operation.

On the other hand, if the mail procedure unit 2-5-1 receives a reply to the reception inquiry indicating that the destination user has received the exchange information message 2 (OK), then the mail procedure unit 2-5-1 recognizes the OK message (S3615) and instructs the exchange information control unit 2-6-1 (FIG. 32) in the media control unit 2-6 (FIG. 30) to receive the contents of the exchange information message 2 (S3617).

The exchange information control unit 2-6-1 expands the contents of the exchange information message 2 based on the instruction from the mail procedure unit 2-5-1 (S3617), generates the exchange request information based on the contents, and transmits the generated information as a two-point connection request to the private branch exchange 1 controlled by the CTI server 2 through the mail control unit 2-5 and the exchange-unit communications unit 2-1 (FIG. 30) in the CTI server 2 containing the exchange information control unit 2-6-1 (S3618).

Although not shown in the attached drawings, the private branch exchange 1 performs a two-point connection control as in the processes in S505 through S509 shown in FIG. 5 according to the first preferred embodiment described above. If the two-point connection is successfully performed, then a reply about the successful two-point connection is returned to the CTI server 2 to which the private branch exchange 1 is connected.

Upon receipt of the reply about the successful two-point connection, the exchange information control unit 2-6-1 notifies the mail procedure unit 2-5-1 (FIG. 31) in the mail control unit 2-5 (FIG. 30) contained in the CTI server 2 containing the exchange information control unit 2-6-1 of the reply about the successful two-point connection (S3619).

Upon receipt of a two-point connection failure notification from the private branch exchange 1, the exchange information control unit 2-6-1 repeats the two-point connection control as in the processes in S604 through S610 in FIG. 6 according to the first preferred embodiment described above.

When the mail procedure unit 2-5-1 receives the reply about the successful two-point connection, it notifies the scenario control unit 2-6-2 in the media control unit 2-6 of the completion of reception (S3620).

Upon receipt of the notification of the completion of reception, the scenario control unit 2-6-2 notifies the mail procedure unit 2-5-1 of the completion of reception by confirming that there is no scenario other than that of the already received voice message 3 and exchange information message 2 about the contents of the scenario expanded in S3604 and shown in FIG. 42 (S3621).

When the mail procedure unit 2-5-1 receives a notification of the completion of reception from the scenario control unit 2-6-2, it notifies the mail control unit 3-3 in the WS 3, which received the mail through the communications control unit 2-2, of the completion of reception (S3622).

By the series of the operations shown in FIG. 36 described above, each message can be received including camp-on reception, according to a scenario.

In a practical example of a scenario shown in FIG. 43, it is instructed that an exchange information message with an inquiry is to be received after the voice message 2 and the FAX message 3 are simultaneously received. The simultaneous reception of the voice message 2 and the FAX message 3 can be realized by the voice control unit 2-6-3 and the FAX control unit 2-6-4 (FIG. 32) in the media control unit 2-6 (FIG. 30). The FAX message 3 is output on the FAX device 5a (FIG. 28) or 5b (FIG. 29), or the display screen of the WS 3.

Fourth Preferred Embodiment

Figure 44:
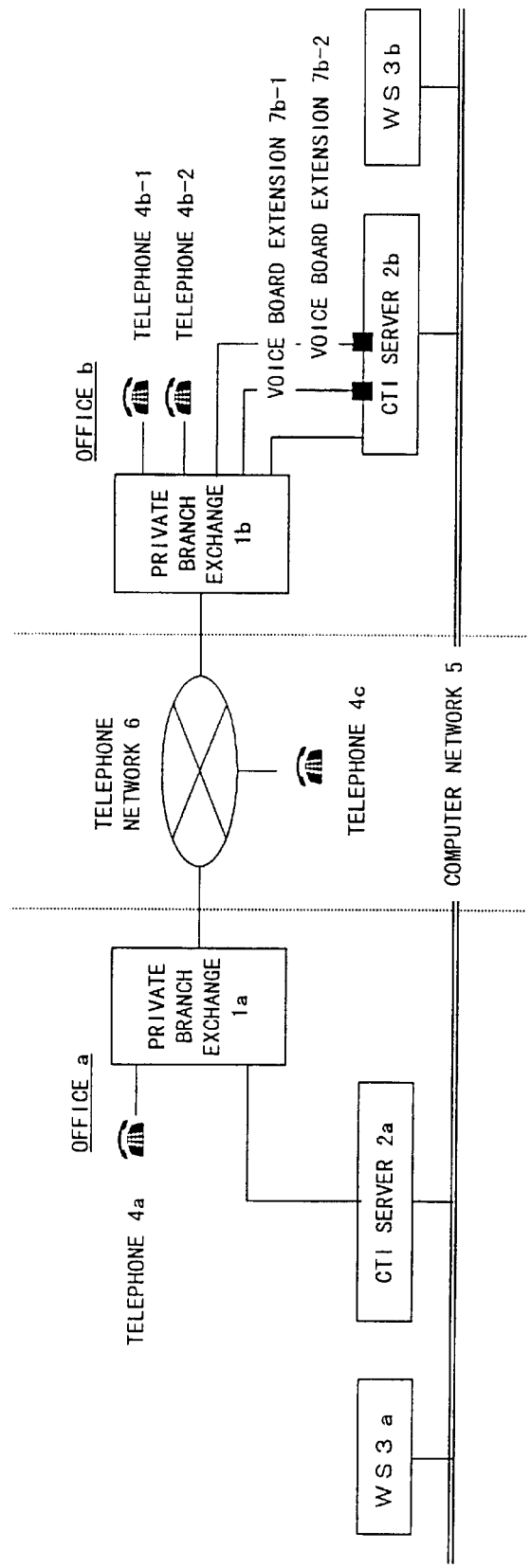
FIG. 44 shows the configuration of the system according to the fourth, fifth, and sixth preferred embodiments of the present invention.

FIG. 44 shows the configuration of the system according to the fourth preferred embodiment of the present invention.

In FIG. 44, the units assigned the same numbers as those assigned to the units shown in FIGS. 1, 10, 28, and 29 have the same function as those assigned to the corresponding numbers.

According to the fourth preferred embodiment of the present invention, if the telephone 4a detects that the telephone 4b-1 is in communication (busy state) because the telephone 4b-1 is communicating with the telephone 4b-2 using an extension in the office b, when the telephone 4a belonging to the office a calls up the telephone 4b-1 belonging to the office b, then the subscriber of the telephone 4a can request an additional connection service from the WS 3a to the WS 3b.

When the subscriber of the WS 3b allows the additional connection, the CTI server 2b controls the private branch exchange 1b in the office b so that the voice board extension 7b-1 connected to the CTI server 2b can be additionally connected to the communications through extensions between the telephone 4b-1 and the telephone 4b-2, the telephone 4a can be connected to the voice board extension 7b-2 connected to the CTI server 2b, and the voice board extensions 7b-1 and 7b-2 can be bridge-connected.

As a result, the subscriber of the telephone 4a belonging to the office a can join the communications through extensions between the subscriber of the telephone 4b-1 and the subscriber of the telephone 4b-2 in the office b through the voice board extension 7b-2 and the voice board extension 7b-1.

Described above is the feature of the fourth preferred embodiment of the present invention.

Figure 45:
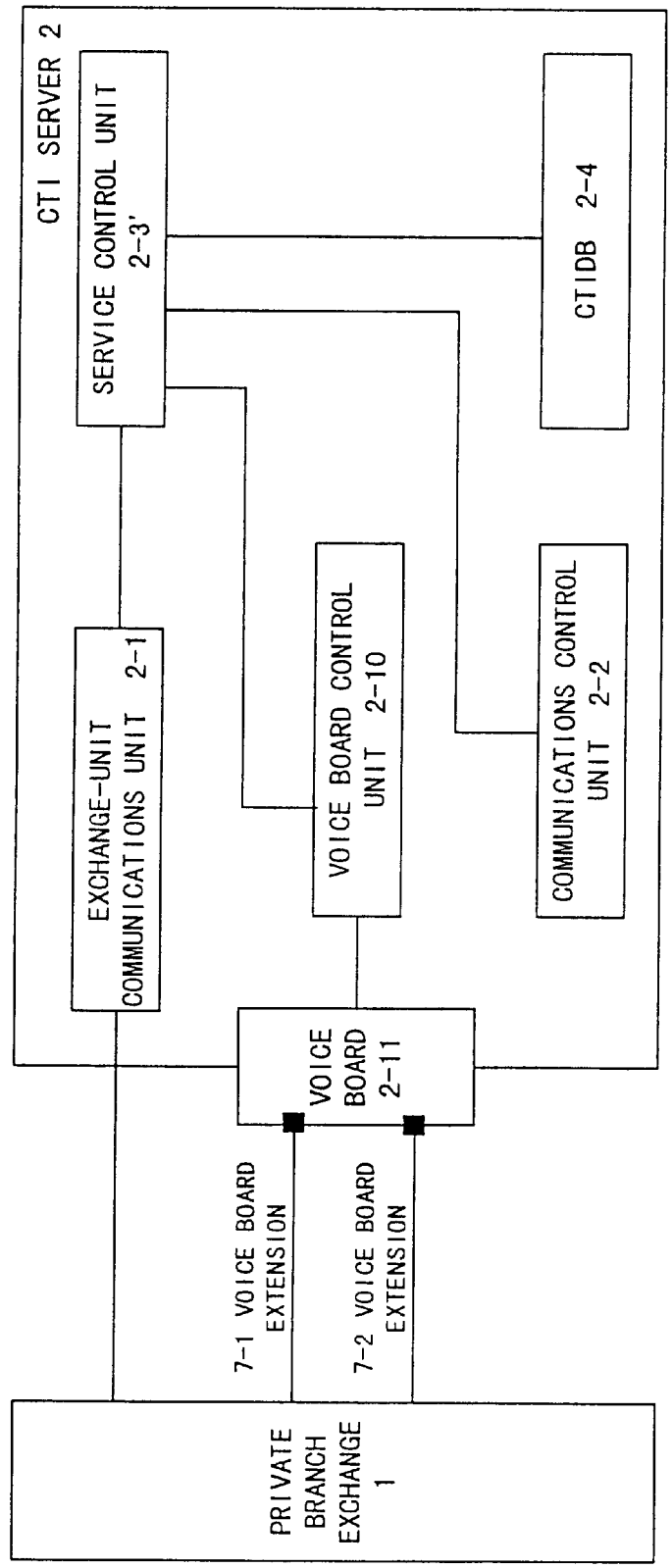
FIG. 45 shows the configuration of the CTI server according to the fourth and fifth preferred embodiments of the present invention.

FIG. 45 shows the configuration of the CTI server 2 (corresponding to the CTI servers 2a and 2b shown in FIG. 44) according to the fourth preferred embodiment of the present invention. The CTI server 2 according to the fourth preferred embodiment of the present invention comprises the service control unit 2-3', the voice board control unit 2-10, and the voice board 2-11, in addition to the exchange-unit communications unit 2-1, the communications control unit 2-2, and the CTIDB 2-4.

The service control unit 2-3' replaces the camp-on control unit 2-3 in FIG. 2 and so forth. It is obvious that the service control unit 2-3' can include the function of the camp-on control unit 2-3.

The voice board 2-11 terminates at least the voice board extension 7-1 (corresponding to the voice board extension 7b-1 shown in FIG. 44) and the voice board extension 7-2 (corresponding to the voice board extension 7b-2 shown in FIG. 44). The voice board extensions 7-1 and 7-2 are accommodated by the private branch exchange 1 (corresponding to private branch exchange 1b shown in FIG. 44).

The voice board control unit 2-10 can bridge-connect the voice board extension 7-1 to the voice board extension 7-2 by controlling the voice board 2-11.

The service control unit 2-3' controls the above ] described additional connection service.

FIG. 46 shows the configuration of the WS 3 (corresponding to the WS 3a and the WS 3b shown in FIG. 10) according to the fourth preferred embodiment of the present invention. The WS 3 comprises the service unit 3-1' and the communications control unit 3-2.

The service unit 3-1' controls the edition, transmission, etc. of the additional connection request information for an additional connection service described later.

The communications control unit 3-2 also forms part of the WS 3 according to the first preferred embodiment of the present invention shown in FIG. 3, and controls the transmission/receipt of various additional connection service control information for the above described CTI server 2 through the computer network 5 (shown in FIG. 44).

Figure 47:
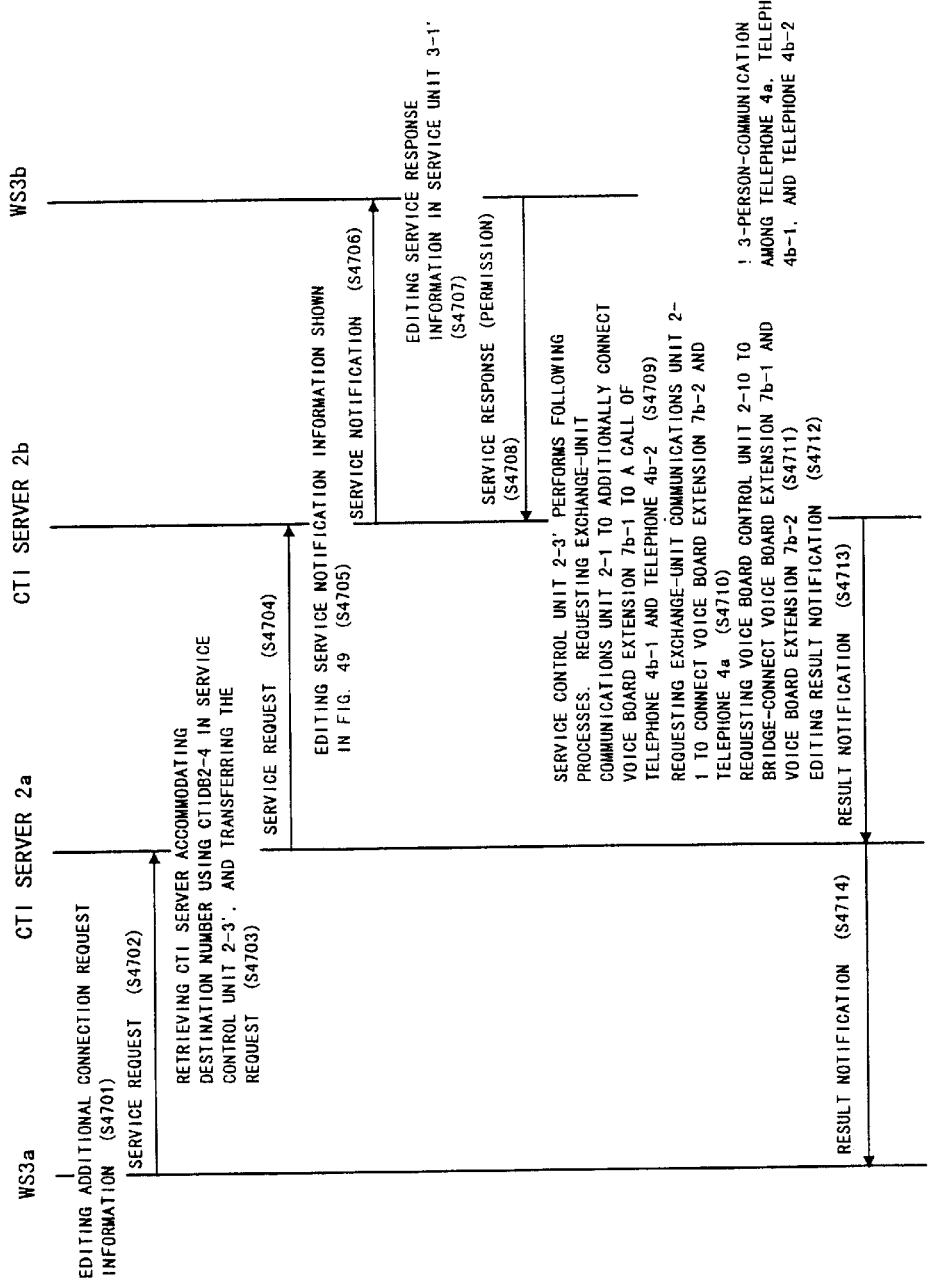
FIG. 47 shows the sequence of operations (additional connection) according to the fourth preferred embodiment of the present invention.

FIG. 47 shows the sequence of the operations for an additional connection service realized by the fourth preferred embodiment of the present invention having the configuration shown in FIGS. 44, 45, and 46.

First, the subscriber of the telephone 4a edits the additional connection request information by operating the WS 3a (S4701). This editing operation is controlled by the service unit 3-1' (FIG. 46) belonging to the WS 3a.

This additional connection request information has the data configuration, for example, as shown in FIG. 48.

An 'additional connection' is set as a request type.

The external number of the telephone of a called person (the telephone 4b-1 belonging to the office b in the example shown in FIG. 44) is specified as a destination number (for example, 044-222-3333).

The external telephone number of the telephone 4a is specified as a source telephone number (for example, 044-123-4567).

The telephone network type field (for example, a 'public network') and the existence/non-existence of result notification (for example, 'existence') are respectively the same as the telephone network type and the existence/non-existence of result notification forming the camp-on request information shown in FIG. 7 according to the first preferred embodiment of the present invention.

The name of the subscriber to be added is specified as a name of a subscriber to be added (for example, Tutaro Fuji).

The operator of the WS 3a first generates the additional connection request information including the above described contents, and then issues a transmitting instruction to instruct transmission of the generated information to the CTI server 2a. The transmitting instruction contains the IP address (or a host address) of the CTI server 2a belonging to the office a. As a result, the communications control unit 3-2 (shown in FIG. 46) in the WS 3a belonging to the office a transmits the above described additional connection request information to the CTI server 2a belonging to the office a to request an additional connection service from the WS 3a to the CTI server 2a (S4702).

Upon receipt of the above described additional connection request information, the communications control unit 2-2 (FIG. 45) in the CTI server 2a transmits the information to the service control unit 2-3' (FIG. 45) in the CTI server 2a.

Upon receipt of the above described additional connection request information, the service control unit 2-3' retrieves the IP address of the CTI server 2b belonging to the office b using the CTIDB 2-4 having the data configuration shown in FIG. 20 according to the above described second preferred embodiment of the present invention with the destination number set in the additional connection request information as a key, and issues a transmitting instruction to instruct transmission of the additional connection request information containing the added IP address to the CTI server 2b (S4703). The CTI server 2a contains, for example, the telephone number conversion data shown in FIG. 8 according to the above described first preferred embodiment of the present invention, converts the external number set in the destination number into the extension number of the telephone 4b viewed from the private branch exchange 1b belonging to the office b, and sets again the converted number into the additional connection request information.

The communications control unit 2-2 (FIG. 45) transmits the above described additional connection request information to the CTI server 2b belonging to the office b to request an additional connection service from the CTI server 2a to the CTI server 2b (S4704).

Upon receipt of the additional connection request information from the CTI server 2a belonging to the office a, the communications control unit 2-2 (FIG. 45) in the CTI server 2b belonging to the office b transmits the additional connection request information to the service control unit 2-3' (FIG. 45) in the CTI server 2b.

Upon receipt of the above described additional connection request information, the service control unit 2-3' edits the service notification information in which the 'additional connection request' is set as a request type as shown in FIG. 49, and in which the name of an added subscriber is set as a name of a requester (refer to FIG. 48) (S4705), and notifies the WS 3b in the office b through the communications control unit 2-2 (S4706) of the service notification information.

Upon receipt of the service notification information from the CTI server 2b, the communications control unit 3-2 in the WS 3b (FIG. 46) transmits it to the service unit 3-1'. As a result, the service unit 3-1' has the display connected to the WS 3b display, for example, the service notification displayed, for example, shown in FIG. 50 as a pop-up message. When the operator of the WS 3b permits the additional connection in response to this notification, the service unit 3-1' edits the service response information in which the 'additional connection request' is set as a request type, and in which an 'OK' is set as an acceptance result as shown in FIG. 51 (S4707), and returns the service response information to the CTI server 2b through the communications control unit 3-2 (S4708).

Upon receipt of the above described service response information through the communications control unit 2-2, the service control unit 2-3' in the CTI server 2b performs the following series of processes.

First, the service control unit 2-3' instructs through the exchange-unit communications unit 2-1 (FIG. 45) the private branch exchange 1b (FIG. 44) belonging to the office b to additionally connect the voice board extension 7-1 connected to the voice board 2-11 (FIG. 45) in the CTI server 2b to the call (communication through an extension) connected between the telephone 4b-1 and the telephone 4b-2 (S4709).

Then, the service control unit 2-3' instructs through the exchange-unit communications unit 2-1 the private branch exchange 1b belonging to the office b to connect to the telephone 4a in the office a the voice board extension 7-2 connected to the voice board 2-11 in the CTI server 2b (S4710).

Furthermore, the service control unit 2-3' requests the voice board control unit 2-10 (FIG. 45) to make a bridge connection, consequently the voice board control unit 2-10 instructs the voice board 2-11 [to bridge-connect the voice board extension 7-1 connected to the voice board 2-11 to the voice board extension 7-2 (S4711). The bridge-connection refers to the function of the voice board 2-11 in mutually connecting the voice signal in the voice board extension 7-1 connected to the voice board 2-11 to the voice signal in the voice board extension 7-2.

As a result, the telephone 4*a* in the office a is connected to the communications through an extension between the telephone 4*b*-1 and the telephone 4*b*-2 in the office b through the voice board extensions 7*b*-1 and 7*b*-2.

Finally, the service control unit 2-3' edits the result notification information in which the request type, the destination telephone number, and the source telephone number are set, and in which a result indicating 'success' or 'failure' is set as shown in FIG. 52 (S4712), which are set in the same way in the additional connection request information (FIG. 48) received by the service control unit 2-3', and transmits the result notification information from the communications control unit 2-2 to the CTI server 2*a* in the office a through the computer network 5 (FIG. 44) (S4713).

Upon receipt of the above described result notification information through the communications control unit 2-2, the service control unit 2-3' in the CTI server 2*a* returns it through the communications control unit 2-2 to the WS 3*a* which has requested the additional connection service (S4714).

Upon receipt of the above described result notification information through the communications control unit 3-2, the service unit 3-1' (FIG. 46) in the WS 3*a* displays the notification of the successful additional connection on the display screen as a pop-up message.

According to the above described fourth preferred embodiment of the present invention, as described above, the telephone 4*a* in the office a is additionally connected to the communications through an extension between the telephones 4*b*-1 and 4*b*-2 in the office b. Similarly, the telephone 4*a* in the office a can also be additionally connected under the above described control to the communications through an external line between the telephone 4*b*-1 in the office b and the telephone 4*c* connected to another external line.

The communication of additional connection request information, etc. between the WS 3 and the CTI server 2 can also be established through electronic mail as in the third preferred embodiment of the present invention.

Fifth Preferred Embodiment

The configuration of the system, the configuration of the CTI server 2 (CTI server 2*a* and CTI server 2*b*), and the configuration of the WS 3 (WS 3*a* and WS 3*b*) according to the fifth preferred embodiment of the present invention are the same as those shown in FIGS. 44, 45, and 46 which concern the above described the fourth preferred embodiment.

In this case, the service control unit 2-3' (FIG. 45) in the CTI server 2 controls the interruptive connection service. The service unit 3-1' (FIG. 46) in the WS 3 controls the edition and the transmission, etc. of the interruptive connection request information described later for use in an interruptive connection service.

According to the fifth preferred embodiment of the present invention, if the telephone 4*a* detects that the telephone 4*b*-1 is in communication (busy state) because the telephone 4*b*-1 is communicating with the telephone 4*b*-2 using an extension in the office b, when the telephone 4*a* belonging to the office a calls up the telephone 4*b*-1 belonging to the office b, then the subscriber of the telephone 4*a* can request an interruptive connection service from the WS 3*a* to the WS 3*b*.

When the subscriber of the WS 3*b* allows the additional connection, the CTI server 2*b* controls the private branch exchange 1*b* in the office b so that the voice board extension 7*b*-1 connected to the CTI server 2*b* can be interruptively connected to the communications through extensions between the telephone 4*b*-1 and the telephone 4*b*-2 with the telephone 4*b*-2 set in a suspended state, the telephone 4*a* can be connected to the voice board extension 7*b*-2 connected to the CTI server 2*b*, and the voice board extensions 7*b*-1 and 7*b*-2 can be bridge-connected.

As a result, the subscriber of the telephone 4*a* belonging to the office a can communicate with the subscriber of the telephone 4*b*-1 in the office b through the voice board extension 7*b*-2 and the voice board extension 7*b*-1.

Described above is the feature of the fifth preferred embodiment of the present invention.

Figure 53:
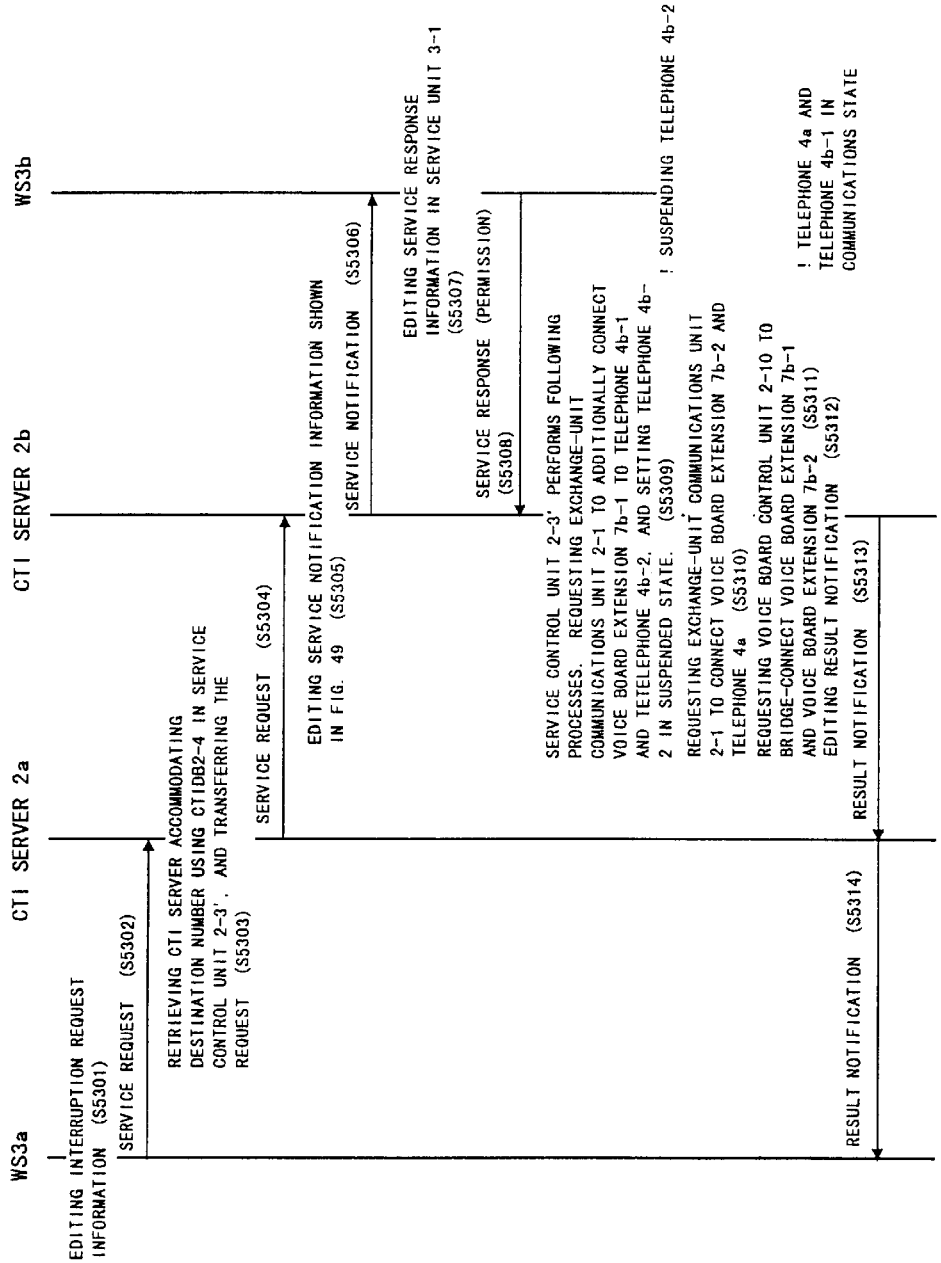
FIG. 53 shows the sequence of the operations (interruption) according to the fifth preferred embodiment of the present invention.

FIG. 53 shows the sequence of the operations for an interruptive connection service realized by the fifth preferred embodiment of the present invention having the configuration shown in FIGS. 44, 45, and 46.

First, the subscriber of the telephone 4*a* edits the interruptive connection request information by operating the WS 3*a* (S5301). This editing operation is controlled by the service unit 3-1' (FIG. 46) belonging to the WS 3*a*.

This interruptive connection request information has the data configuration as shown in FIG. 54.

An interruptive connection is set as a request type.

The destination number, source telephone number, and telephone network type are the same as those in the additional connection request information (FIG. 48) with the above described additional connection service.

The name of the interrupting subscriber is specified as a name of an interrupting subscriber (for example, Tutaro Fuji).

The operator of the WS 3*a* first generates the interruptive connection request information including the above described contents, and then issues a transmitting instruction to instruct transmission of the generated information to the CTI server 2*a*. The transmitting instruction contains the IP address (or a host address) of the CTI server 2*a* belonging to the office a. As a result, the communications control unit 3-2 (shown in FIG. 46) in the WS 3*a* belonging to the office a transmits the above described interruptive connection request information to the CTI server 2*a* belonging to the office a to request an interruptive connection service from the WS 3*a* to the CTI server 2*a* (S5302).

Upon receipt of the above described interruptive connection request information, the communications control unit 2-2 (FIG. 45) in the CTI server 2*a* transmits the information to the service control unit 2-3' (FIG. 45) in the CTI server 2*a*.

Upon receipt of the above described interruptive connection request information, the service control unit 2-3' retrieves the IP address of the CTI server 2*b* belonging to the office b using the CTIDB 2-4 having the data configuration shown in FIG. 20 according to the above described second preferred embodiment of the present invention with the destination number set in the interruptive connection request information as a key, and issues a transmitting instruction to instruct transmission of the interruptive connection request information containing the added IP address to the CTI server 2b (S5303). The CTI server 2a contains, for example, the telephone number conversion data shown in FIG. 8 according to the above described first preferred embodiment of the present invention, converts the external number set in the destination number into the extension number of the telephone 4b viewed from the private branch exchange 1b belonging to the office b, and sets again the converted number into the additional connection request information.

The communications control unit 2-2 (FIG. 45) transmits the above described interruptive connection request information to the CTI server 2b belonging to the office b to request an additional connection service from the CTI server 2a to the CTI server 2b (S5304).

Upon receipt of the interruptive connection request information from the CTI server 2a belonging to the office a, the communications control unit 2-2 (FIG. 45) in the CTI server 2b belonging to the office b transmits the service control unit 2-3' (FIG. 45) in the CTI server 2b.

Upon receipt of the above described interruptive connection request information, the service control unit 2-3' edits the service notification information in which the 'interruptive connection request' is set as a request type, in which the name of interrupting subscriber is set as a name of a requester (refer to FIG. 48) (S5305) as shown in FIG. 49, and notifies the WS 3b in the office b through the communications control unit 2-2 (S5306).

Upon receipt of the service notification information from the CTI server 2b, the communications control unit 3-2 in the WS 3b (FIG. 46) transmits it to the service unit 3-1'. As a result, the service unit 3-1' has the display connected to the WS 3b display, for example, the service notification displayed, for example, shown in FIG. 50 as a pop-up message ('interruption' not 'interruptive connection'). When the operator of the WS 3b permits the interruptive connection in response to this notification, the service unit 3-1' edits the service response information in which the 'interruptive connection request' is set as a request type, and in which an 'OK' is set as an acceptance result (S5307) as shown in FIG. 51, and returns the service response information to the CTI server 2b through the communications control unit 3-2 (S5308).

Upon receipt of the above described service response information through the communications control unit 2-2, the service control unit 2-3' in the CTI server 2b performs the following series of processes.

First, the service control unit 2-3' instructs through the exchange-unit communications unit 2-1 (FIG. 45) the private branch exchange 1b (FIG. 44) belonging to the office b to additionally connect the voice board extension 7-1 connected to the voice board 2-11 in the CTI server 2b to the call (communications through an extension) connected between the telephone 4b-1 and the telephone 4b-2, and the telephone 4b-2 is set in a suspended state (S5309).

Then, the service control unit 2-3' instructs through the exchange-unit communications unit 2-1 the private branch exchange 1b belonging to the office b to connect to the telephone 4a in the office a the voice board extension 7-2 connected to the voice board 2-11 in the CTI server 2b (S5310).

Furthermore, when the service control unit 2-3' requests the voice board control unit 2-10 (FIG. 45) to make a bridge connection, the voice board control unit 2-10 instructs the voice board 2-11 to bridge-connect the voice board extension 7-1 connected to the voice board 2-11 to the voice board extension 7-2 (S5311).

As a result, the telephone 4a in the office a is connected to the telephone 4b-1 in the office b through the voice board extensions 7b-1 and 7b-2.

Finally, the service control unit 2-3' edits the result notification information in which the request type, the destination telephone number, and the source telephone number are set, and in which a result indicating 'success' or 'failure' is set as shown in FIG. 52 (S5312), which are set in the same way in the interruptive connection request information (FIG. 54) received by the service control unit 2-3', and transmits the result notification information from the communications control unit 2-2 to the CTI server 2a in the office a through the computer network 5 (FIG. 44) (S5313).

Upon receipt of the above described result notification information through the communications control unit 2-2, the service control unit 2-3' in the CTI server 2a returns it through the communications control unit 2-2 to the WS 3a which has requested the interruptive connection service (S5314).

Upon receipt of the above described result notification information through the communications control unit 3-2, the service unit 3-1' (FIG. 46) in the WS 3a displays the notification of the successful interruptive connection on the display screen as a pop-up message.

According to the above described fifth preferred embodiment of the present invention, as described above, the telephone 4a in the office a is interruptively connected during the communications through an extension between the telephones 4b-1 and 4b-2 in the office b with the telephone 4b-2 set in a suspended state. Similarly, the telephone 4a in the office a can also be interruptively connected under the above described control during the communications through an external line between the telephone 4b-1 in the office b and the telephone 4c connected to another external line with the telephone 4a in the office a set in a suspended state.

The communications of interruptive connection request information, etc. between the WS 3 and the CTI server 2 can also be established through electronic mail as in the third preferred embodiment of the present invention.

Sixth Preferred Embodiment

The configuration of the system and the configuration of the WS 3 (WS 3a and WS 3b) according to the sixth preferred embodiment of the present invention are the same as those according to the above described fourth preferred embodiment of the present invention.

In this case, the service unit 3-1' (FIG. 46) controls the edition, the transmission, etc. for the transfer entry request information described later for a transfer entry/release service.

Figure 55:
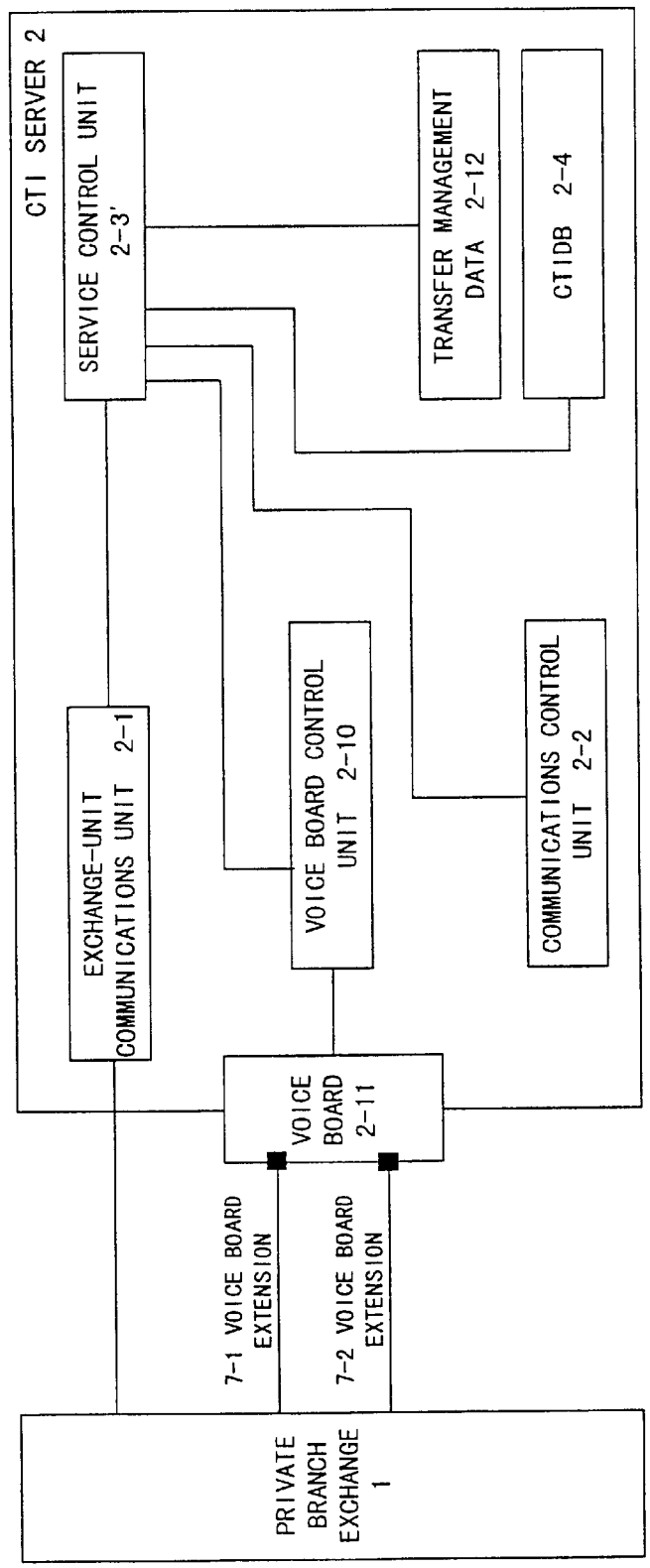
FIG. 55 shows the configuration of a CTI server according to the sixth preferred embodiment of the present invention.

FIG. 55 shows the configuration of the CTI server 2 (corresponding to the CTI servers 2a and 2b shown in FIG. 44) according to the sixth preferred embodiment of the present invention. The CTI server 2 according to the sixth preferred embodiment of the present invention comprises, as in the CTI server 2 according to the fourth and fifth preferred embodiments shown in FIG. 45, the exchange-unit communications unit 2-1, the communications control unit 2-2, the service control unit 2-3', the CTIDB 2-4, the voice board control unit 2-10, the voice board 2-11, and the transfer management data 2-12 stored in the storage device, not shown in the attached drawings.

In this case, the service control unit 2-3' controls a transfer entry/release service.

According to the sixth preferred embodiment of the present invention, a transfer entry with which a call receipt by a telephone 4b-1 belonging to the office b (which can be telephone 4b-2) is transferred to the telephone 4c connected to an external line can be made by the WS 3b belonging to the office b. It is obvious that the transfer can be released.

If the telephone 4a belonging to the office a calls up the telephone 4b-1 after the above described transfer entry has been made, then the CTI server 2b instructs the private branch exchange 1b to connect a call from the private branch exchange 1b to the telephone 4b-1 to the voice board extension 7b-1 connected to the CTI server 2b for the destination specification request in response to the call.

Simultaneously, the CTI server 2b instructs the private branch exchange 1b to connect the voice board extension 7b-2 connected to the CTI server 2b to the telephone 4c connected to an external line.

Furthermore, the CTI server 2b bridge-connects the voice board extension 7b-1 to the voice board extension 7b-2 connected to the CTI server 2b.

As a result, the subscriber of the telephone 4a in the office can communicate with the subscriber of the transfer destination telephone 4c connected to an external line through the voice board extension 7b-2 and the voice board extension 7b-1.

Described above is the feature of the sixth preferred embodiment of the present invention.

Figure 56:
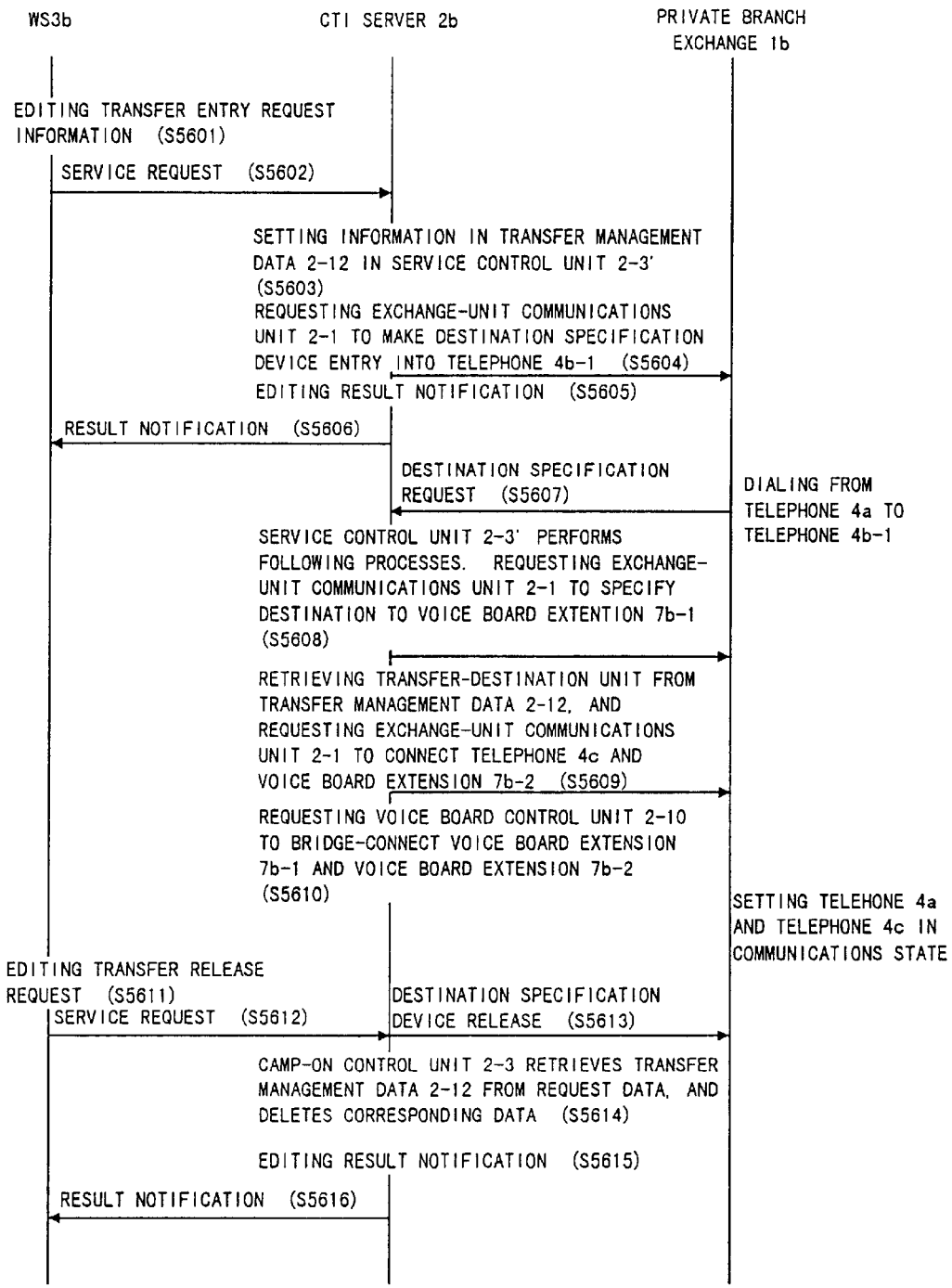
FIG. 56 shows the sequence of the operations (transfer entry/release) of the sixth preferred embodiment of the present invention.

FIG. 56 shows the sequence of the operations for a transfer entry/release service realized by the sixth preferred embodiment of the present invention having the configuration shown in FIGS. 44, 45, and 46.

First described below are the transfer entry operations.

The operator of the WS 3b in the office b edits the transfer entry request information for use in specifying that a call arriving at the telephone 4b-1 belonging to the office b is transferred to the telephone 4c connected to an external line (S5601). This editing operation is controlled by the service unit 3-1' (FIG. 46) belonging to the WS 3b.

This transfer entry request information has the data configuration as shown in FIG. 57.

A 'transfer entry' is set as a request type.

The extension number of the transfer source telephone 4b-1 (viewed from the private branch exchange 1b) is specified as a transfer source number.

The external line of the transfer destination telephone 4c is specified as a transfer destination number.

The telephone network type is specified as to whether the telephone 4c belongs to its station (the private branch exchange 1b), or the telephone 4c is to be connected to the telephone 4b through a toll network, or is to be connected to the telephone 4b through a public network.

The operator of the WS 3a first generates the transfer entry request information including the above described contents, and then issues a transmitting instruction to instruct transmission of the generated information to the CTI server 2b. The transmitting instruction contains the IP address (or a host address) of the CTI server 2b belonging to the office b. As a result, the communications control unit 3-2 (shown in FIG. 46) in the WS 3b belonging to the office b transmits the above described transfer entry request information to the CTI server 2b belonging to the office b to request a transfer entry service from the WS 3b to the CTI server 2b (S5602).

Upon receipt of the above described transfer entry request information, the communications control unit 2-2 (FIG. 55) in the CTI server 2b transmits the information to the service control unit 2-3' (FIG. 55) in the CTI server 2b.

Upon receipt of the above described transfer entry request information, the service control unit 2-3' first enters the requested contents in the transfer management data 2-12 (FIG. 55). The transfer management data 2-12 is a database containing a data set shown in FIG. 58 (S5603).

Then, the service control unit 2-3' requests the private branch exchange 1b through the exchange-unit communications unit 2-1 (FIG. 55) to make a transfer destination specifying device entry for the telephone 4b-1 (S5604).

Then, the service control unit 2-3' edits the result notification information in which the result type, the transfer source number, and the transfer destination number are set, and in which a result indicating 'success' or 'failure' is set as shown in FIG. 52 (S5605), which are set in the same way in the transfer entry request information (FIG. 57) received by the service control unit 2-3', and returns the result notification information from the communications control unit 2-2 to the WS 3a which is a requester for a transfer entry service (S5605).

Upon receipt of the above described result notification information through the communications control unit 3-2, the service unit 3-1' (FIG. 46) in the WS 3a displays a successful transfer entry notification on the display screen as a pop-up message.

Described below is an actual transfer operation.

If the telephone 4a belonging to the office a calls (dials) the telephone 4b-1 belonging to the office b after the completion of the transfer entry for the telephone 4b-1 as described above, then the private branch exchange 1b belonging to the office b requests the CTI server 2b to specify the destination of the call (S5607).

Upon receipt of the above described destination specification request from the private branch exchange 1b through the exchange-unit communications unit 2-1 (FIG. 55), the service control unit 2-3' in the CTI server 2b instructs the private branch exchange 1b through the exchange-unit communications unit 2-1 to connect the call to the voice board extension 7b-1 connected to the voice board 2-11 (FIG. 55) in the CTI server 2b (S5608).

Simultaneously, the service control unit 2-3' retrieves the transfer source number of the transfer management data 2-12 (FIG. 55) using as a key the extension number of the telephone 4b-1 received together with the destination specification request from the private branch exchange 1b, and obtains the transfer destination number, which is a pair to the transfer source number, and the telephone network type. Then, the service control unit 2-3' instructs the private branch exchange 1b through the exchange-unit communications unit 2-1 to connect the voice board extension 7b-2 connected to the CTI server 2b to the transfer destination unit (the telephone 4c connected to an external line in the example shown in FIG. 44) corresponding to the above described transfer destination number and the telephone network type (S5609).

Furthermore, when the service control unit 2-3' requests the voice board control unit 2-10 (FIG. 55) to make a bridge connection, the voice board control unit 2-10 instructs the voice board 2-11 to bridge-connect the voice board extension 7-1 connected to the voice board 2-11 to the voice board extension 7-2 (S5610).

As a result, the subscriber of the telephone 4a of the office a can communicate with the subscriber of the transfer destination telephone 4c connected to an external line through the voice board extension 7b-2 and the voice board extension 7b-1 in the CTI server 2b.

Described finally is the transfer release operation.

The operator of the WS 3b edits the transfer release request information for use in specifying the transfer release for the telephone 4b-1 belonging to the office b (S5611). This editing operation is controlled by the service unit 3-1' (FIG. 46) belonging to the WS 3b.

This transfer release request information has the same data configuration as, for example, the transfer entry request information shown in FIG. 57. In this case, the 'transfer release' is set as a request type.

After generating the transfer release request information having the above described contents, the operator of the WS 3a issues a transmitting instruction to instruct transmission of the generated information to the CTI server 2b. As a result, the communications control unit 3-2 (FIG. 46) in the WS 3b belonging to the office b transmits the above described transfer release request information to the CTI server 2b belonging to the office b, and thereby requests a transfer release service from the WS 3b to the CTI server 2b (S5612).

Upon receipt of the above described transfer release request information, the communications control unit 2-2 (FIG. 55) in the CTI server 2b passes the information to the service control unit 2-3' (FIG. 55) in the CTI server 2b.

Upon receipt of the above described transfer release request information, the service control unit 2-3' requests the private branch exchange 1b (FIG. 44) through the exchange-unit communications unit 2-1 (FIG. 55) to release the destination specification device entry for the telephone 4b-1 (S5613).

Then, the service control unit 2-3' retrieves the transfer source number of the transfer management data 2-12 (FIG. 55) using as a key the extension number of the telephone 4b-1 received from the transfer release request information, and deletes the data of the entry corresponding to the retrieved transfer source number (S5614).

Then, the service control unit 2-3' edits the result notification information in which the request type, the transfer source number, and the transfer destination number are set, and in which a result indicating 'success' or 'failure' is set as shown in FIG. 52 (S5615), which are set in the same way in the transfer release request information (FIG. 57) received by the service control unit 2-3', and returns the result notification information from the communications control unit 2-2 to the WS 3a which is a requester of the transfer release service (S5616).

Upon receipt of the above described result notification information through the communications control unit 3-2, the service unit 3-1' (FIG. 46) in the WS 3a displays the notification of the successful transfer release on the display screen as a pop-up message.

In the above described sixth preferred embodiment of the present invention, a plurality of transfer destination units are set for an optional telephone 4b-1 as the transfer management data 2-12. A call to the telephone 4b-1 can also be designed to be transferred to the second transfer destination unit when a first transfer destination unit cannot accept a call.

The WS 4b can be designed to transfer or not transfer a call to the telephone 4c when the call is issued to the telephone 4b-1. In this case, the CTI server 2b instructs the operator of the WS 3b to specify a destination when the private branch exchange 1b notifies the CTI server 2b of the destination specification request (S5607). Then, the private branch exchange 1b is notified of the destination.

Furthermore, the communications using the transfer entry/release request information, etc. between the WS 3 and the CTI server 2 can also be established through electronic mail as in the third preferred embodiment of the present invention.

Supplement on a Storage Medium Storing a Program for Realizing a Preferred Embodiment of the Present Invention The present invention can be designed as a computer-readable storage medium used to direct a computer to perform the same functions realized by each configuration of the CTI server 2 or WS 3 (CTI client) according to the above described preferred embodiment of the present invention.

Figure 59:
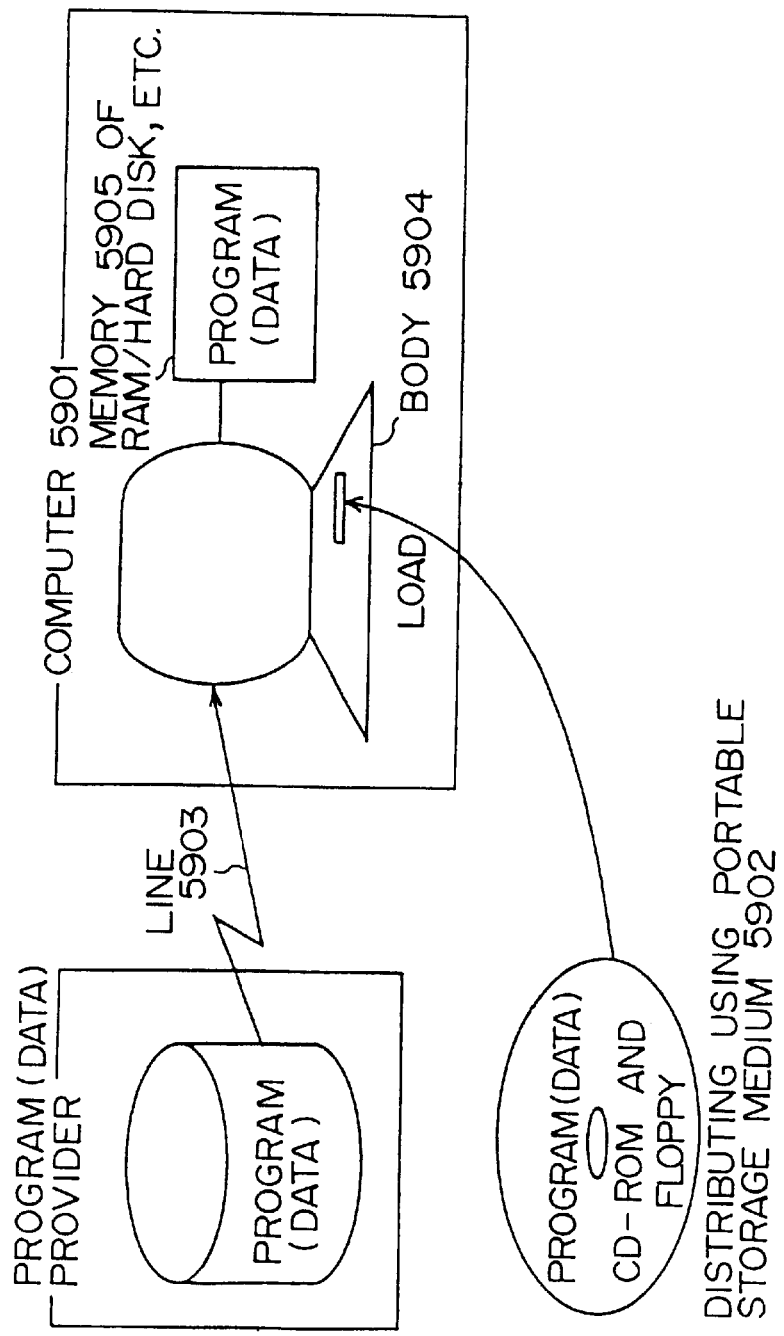
FIG. 59 shows a storage medium storing a program for realizing a preferred embodiment of the present invention.

For example, as shown in FIG. 59, a program for realizing each function according to a preferred embodiment of the present invention is executed after being loaded to memory (RAM or a hard disk, etc.) 5905 in a body 5904 of a computer 5901 forming the CTI server 2 or the WS 3 through a portable storage medium 5902 such as a floppy disk, a CD-ROM disk, an optical disk, a removable hard disk, etc. or through a network line 5903.

What is claimed is:

1. A computer telephony integration control system for performing computer telephony integration control to control a connection of an exchange line terminated by an exchange unit, comprising:

a computer telephony integration client unit for transmitting computer telephony integration control request information for use in requesting the computer telephony integration control; and a computer telephony integration server unit, connected to a computer network accessible by said computer telephony integration client unit, for receiving the computer telephony integration control request information from said computer telephony integration client unit, and performing the computer telephony integration control on the exchange unit according to the computer telephony integration control request information, wherein said computer telephony integration control request information is interruptive connection request information for use in requesting an interruptive connection to communications which have already been connected with one of communicating terminal units set in a suspended state;

said computer telephony integration server unit comprises:

an extension termination unit for terminating two or more extensions connected to said exchange unit; and interruptive connection control unit for receiving the interruptive connection request information from said computer telephony integration client unit through the computer network, instructing the exchange unit to connect according to the interruptive connection request information an optional first extension in the extensions to the communications being established, instructing the exchange unit to hold one of communicating terminal units, instructing the exchange unit to connect a second extension which is another optional extension of the extensions to a terminal unit specified according to the interruptive connection request information, and instructing said extension termination unit to connect the first and second extensions.

2. The system according to claim 1, wherein
said computer telephony integration server unit comprises:
   first communications control unit for communicating the computer telephony integration control request information and information relating to the computer telephony integration control request information with said computer telephony integration client unit through the computer network;
   computer telephony integration control execution unit for receiving the computer telephony integration control request information from said computer telephony integration client unit through the computer network and said first communications control unit, generating exchange request information for use in requesting the exchange unit to perform the computer telephony integration control according to the computer telephony integration control request information, and performing the computer telephony integration control on the exchange unit based on the generated information; and
   exchange-unit communications unit for communicating with the exchange unit the exchange request information transmitted by said computer telephony integration control execution unit and information relating to the exchange request information.

3. The system according to claim 1, wherein
said computer telephony integration client unit comprises:
   computer telephony integration control request information editing unit for editing computer telephony integration control request information for use in requesting the computer telephony integration control; and
   second communications control unit for communicating the computer telephony integration control request information and information relating to the computer telephony integration control request information with said computer telephony integration server unit through the computer network.

4. The system according to claim 1, wherein
said computer telephony integration control request information contains information specifying issue/non-issue of a result notification and information specifying a monitor time; and
when information specifying issue of the result notification is set in the computer telephony integration control request information, said computer telephony integration server unit returns a notification as to whether or not the computer telephony integration control has been successfully performed within the monitor time set in the computer telephony integration control request information.

5. The system according to claim 1, wherein
said computer telephony integration control request information is additional connection request information for use in requesting an additional connection to communications which have already been connected;
said computer telephony integration server unit comprises:
   an extension termination unit for terminating two or more extensions connected to said exchange unit; and
   additional connection control unit for receiving the additional connection request information from said computer telephony integration client unit through the computer network, instructing the exchange unit to connect according to the additional connection request information an optional first extension in the extensions during the communications being established, instructing the exchange unit to connect a second extension which is another optional extension of the extensions to a terminal unit specified according to the additional connection request information, and instructing said extension termination unit to connect the first and second extensions.

6. The system according to claim 1, wherein
said computer telephony integration control request information is transfer control request information for use in requesting a call transfer entry or release for an optional destination terminal unit; and
said computer telephony integration server unit comprises:
   an extension termination unit for terminating two or more extensions connected to said exchange unit; and
   transfer connection control unit for entering or releasing transfer control information for the optional destination terminal unit according to the transfer control request information when the transfer control request information is received from said computer telephony integration client unit through a computer network, instructing the exchange unit according to the transfer control request information to output a destination specification request for requesting the specification of a destination when a call is issued to the optional destination terminal unit, instructing the exchange unit to specify a first optional extension in the extensions as the call destination unit when the destination specification request is output from the exchange unit, instructing the exchange unit to connect a second extension which is another optional extension of the extensions to a terminal unit specified according to the transfer connection request information, and instructing said extension termination unit to connect the first and second extensions.

7. The system according to claim 1, wherein
said computer telephony integration control refers to two-point connection control to connect a source terminal unit capable of issuing a call from the exchange unit to a destination terminal unit.

8. The system according to claim 7, wherein
said two-point connection control is periodically performed until the destination terminal unit answers.

9. The system according to claim 7, wherein
said two-point connection control is performed upon receipt of a call release notification indicating that the destination terminal unit is ready.

10. The system according to claim 1, wherein
said source terminal unit and said destination terminal unit communicate with each other through the exchange unit and a switching network to which the exchange unit is connected.

11. The system according to claim 1, wherein
said source terminal unit and said destination terminal unit are connected to the exchange unit and communicate with each other through an extension network controlled by the exchange unit.

12. The exchange unit used in the computer telephony integration control system according to claim 1.

13. A computer telephony integration control system for performing computer telephony integration control to control a connection of an exchange line terminated by an exchange unit, comprising:

a computer telephony integration client unit for transmitting computer telephony integration control request information for use in requesting the computer telephony integration control; and a computer telephony integration server unit, connected to a computer network accessible by said computer telephony integration client unit, for receiving the computer telephony integration control request information from said computer telephony integration client unit in an area under control of said computer telephony integration server unit, performing the computer telephony integration control on the exchange unit according to the computer telephony integration control request information when the computer telephony integration control request information is to be processed by said computer telephony integration server unit, and transferring the computer telephony integration control request information to another computer telephony integration server unit which is to process the computer telephony integration control request information when the computer telephony integration control request information is not to be processed by said computer telephony integration server unit, wherein said computer telephony integration control request information is interruptive connection request information for use in requesting an interruptive connection to communications which have already been connected with one of communicating terminal units set in a suspended state;

said computer telephony integration server unit comprises:

an extension termination unit for terminating two or more extensions connected to said exchange unit; and interruptive connection control unit for receiving the interruptive connection request information from said computer telephony integration client unit through the computer network, instructing the exchange unit to connect according to the interruptive connection request information an optional first extension in the extensions to the communications being established, instructing the exchange unit to hold one of communicating terminal units, instructing the exchange unit to connect a second extension which is another optional extension of the extensions to a terminal unit specified according to the interruptive connection request information, and instructing said extension termination unit to connect the first and second extensions.

14. The system according to claim 13, further comprising:

a computer telephony integration database unit for storing, for each destination number, host address information in the computer network of the computer telephony integration server unit for processing the computer telephony integration control request information containing the destination number, wherein when said computer telephony integration server unit is not to process the computer telephony integration control request information, said computer telephony integration server unit obtains host address information corresponding to another computer telephony integration server unit which is to process the computer telephony integration control request information by accessing said computer telephony integration database unit based on a destination number contained in the computer telephony integration control request information, and transmits the computer telephony integration control request information to a destination according to the host address information.

15. The system according to claim 13, wherein said computer telephony integration server unit comprises:

a first communications control unit for communicating the computer telephony integration control request information and information relating to the computer telephony integration control request information with said computer telephony integration client unit through the computer network;

a computer telephony integration control execution unit for receiving the computer telephony integration control request information from said computer telephony integration client unit through the computer network and said first communications control unit, generating exchange request information for use in requesting the exchange unit to perform the computer telephony integration control according to the computer telephony integration control request information, and performing the computer telephony integration control on the exchange unit based on the generated information; and an exchange-unit communications unit for communicating with the exchange unit the exchange request information transmitted by said computer telephony integration control execution unit and information relating to the exchange request information.

16. The system according to claim 13, wherein said computer telephony integration client unit comprises:

computer telephony integration control request information editing unit for editing computer telephony integration control request information for use in requesting the computer telephony integration control; and a second communications control unit for communicating the computer telephony integration control request information and information relating to the computer telephony integration control request information with said computer telephony integration server unit through the computer network.

17. The system according to claim 13, wherein said computer telephony integration control request information contains information specifying issue/non-issue of a result notification and information specifying a monitor time; and when information specifying issue of the result notification is set in the computer telephony integration control request information, said computer telephony integration server unit returns a notification as to whether or not the computer telephony integration control has been successfully performed within the monitor time set in the computer telephony integration control request information.

18. The system according to claim 13, wherein said computer telephony integration control request information is additional connection request information for use in requesting an additional connection to communications which have already been connected;

said computer telephony integration server unit comprises:

an extension termination unit for terminating two or more extensions connected to said exchange unit; and additional connection control unit for receiving the additional connection request information from said computer telephony integration client unit through the computer network, instructing the exchange unit to connect according to the additional connection request information an optional first extension in the extensions during the communications being established, instructing the exchange unit to connect a second extension which is another optional extension of the extensions to a terminal unit specified according to the additional connection request information, and instructing said extension termination unit to connect the first and second extensions.

19. The system according to claim 13, wherein
said computer telephony integration control request information is transfer control request information for use in requesting a call transfer entry or release for an optional destination terminal unit; and
said computer telephony integration server unit comprises:
an extension termination unit for terminating two or more extensions connected to said exchange unit; and
transfer connection control unit for entering or releasing transfer control information for the optional destination terminal unit according to the transfer control request information when the transfer control request information is received from said computer telephony integration client unit through a computer network, instructing the exchange unit according to the transfer control request information to output a destination specification request for requesting the specification of a destination when a call is issued to the optional destination terminal unit, instructing the exchange unit to specify a first optional extension in the extensions as the call destination unit when the destination specification request is output from the exchange unit, instructing the exchange unit to connect a second extension which is another optional extension of the extensions to a terminal unit specified according to the transfer connection request information, and instructing said extension termination unit to connect the first and second extensions.

20. The system according to claim 13, wherein
said computer telephony integration control refers to two-point connection control to connect a source terminal unit capable of issuing a call from the exchange unit to a destination terminal unit.

21. The system according to claim 20, wherein
said two-point connection control is periodically performed until the destination terminal unit answers.

22. The system according to claim 20, wherein
said two-point connection control is performed upon receipt of a call release notification indicating that the destination terminal unit is ready.

23. The system according to claim 13, wherein
said source terminal unit and said destination terminal unit communicate with each other through the exchange unit and a switching network to which the exchange unit is connected.

24. The system according to claim 13, wherein
said source terminal unit and said destination terminal unit are connected to the exchange unit and communicate with each other through an extension network controlled by the exchange unit.

25. The exchange unit used in the computer telephony integration control system according to claim 13.

26. A computer telephony integration server unit for receiving computer telephony integration control request information from a computer telephony integration client unit, and performing computer telephony integration control to control a connection of an exchange line which terminates an exchange unit according to the computer telephony integration control request information, comprising:
a first communications control unit for communicating the computer telephony integration control request information and information relating to the computer telephony integration control request information with said computer telephony integration client unit through a computer network;
computer telephony integration control execution unit for receiving the computer telephony integration control request information from said computer telephony integration client unit through the computer network and said first communications control unit, generating exchange request information for use in requesting the exchange unit to perform the computer telephony integration control according to the computer telephony integration control request information, and performing the computer telephony integration control on the exchange unit based on the generated information; and
exchange-unit communications unit for communicating with the exchange unit the exchange request information transmitted by said computer telephony integration control execution unit and information relating to the exchange request information, wherein
said computer telephony integration control request information is interruptive connection request information for use in requesting an interruptive connection to communications which have already been connected with one of communicating terminal units set in a suspended state;
said computer telephony integration server unit further comprises:
an extension termination unit for terminating two or more extensions connected to said exchange unit; and
interruptive connection control unit for receiving the interruptive connection request information from said computer telephony integration client unit through the computer network, instructing the exchange unit to connect according to the interruptive connection request information an optional first extension in the extensions to the communications being established, instructing the exchange unit to hold one of communicating terminal units, instructing the exchange unit to connect a second extension which is another optional extension of the extensions to a terminal unit specified according to the interruptive connection request information, and instructing said extension termination unit to connect the first and second extensions.

27. The system according to claim 26, wherein
said computer telephony integration control request information contains information specifying issue/non-issue of a result notification and information specifying a monitor time; and
when information specifying issue of the result notification is set in the computer telephony integration control request information, said computer telephony integration server unit returns a notification as to whether or not the computer telephony integration control has been successfully performed within the monitor time set in the computer telephony integration control request information.

28. The system according to claim 26, wherein
said computer telephony integration control refers to two-point connection control to connect a source terminal unit capable of issuing a call from the exchange unit to a destination terminal unit.

29. The system according to claim 28, wherein
said two-point connection control is periodically performed until the destination terminal unit answers.

30. The system according to claim 28, wherein
said two-point connection control is performed upon receipt of a call release notification indicating that the destination terminal unit is ready.

31. The system according to claim 26, wherein
said source terminal unit and said destination terminal unit communicate with each other through the exchange unit and a switching network to which the exchange unit is connected.

32. The system according to claim 26, wherein
said source terminal unit and said destination terminal unit are connected to the exchange unit and communicate with each other through an extension network controlled by the exchange unit.

33. The exchange unit used in the computer telephony integration control system according to claim 26.

34. A computer telephony integration control system for performing computer telephony integration control to control a connection of an exchange line terminated by an exchange unit, comprising:

a computer telephony integration client unit for transmitting through a computer network computer telephony integration control request information for use in requesting the computer telephony integration control to control a connection of an exchange line terminated by an exchange unit; and a computer telephony integration server unit, connected to the computer network accessible by said computer telephony integration client unit, for receiving the computer telephony integration control request information from said computer telephony integration client unit, said computer telephony integration server unit operatively coupled to the exchange unit and performing the computer telephony integration control on the exchange unit according to the computer telephony integration control request information.

35. A computer telephony integration control system of claim 34, wherein said computer telephony integration control includes at least a camp-on function.

36. A computer telephony integration control system for performing computer telephony integration control to control a connection of an exchange line terminated by an exchange unit, comprising:

a computer telephony integration client unit for transmitting through a computer network computer telephony integration control request information for use in requesting the computer telephony integration control to control a connection of an exchange line terminated by an exchange unit; and a computer telephony integration server unit, connected to the computer network accessible by said computer telephony integration client unit, for receiving the computer telephony integration control request information from said computer telephony integration client unit in an area under control of said computer telephony integration server unit, said computer telephony integration server unit operatively coupled to the exchange unit and performing the computer telephony integration control on the exchange unit according to the computer telephony integration control request information when the computer telephony integration control request information is to be processed by said computer telephony integration server unit, and transferring the computer telephony integration control request information to another computer telephony integration server unit which is to process the computer telephony integration control request information when the computer telephony integration control request information is not to be processed by said computer telephony integration server unit.

37. A computer telephony integration server unit for receiving computer telephony integration control request information from a computer telephony integration client unit, and performing computer telephony integration control to control a connection of an exchange line, which terminates to an exchange unit, according to the computer telephony integration control request information, comprising:

a first communication control unit for communicating through a computer network with said computer telephony integration client unit, the communication including the computer telephony integration control request information and information relating to the computer telephony integration control request information;

computer telephony integration control execution unit for receiving the computer telephony integration control request information from said computer telephony integration client unit through the computer network and said first communications control unit, generating exchange request information for use in requesting the exchange unit to perform the computer telephony integration control according to the computer telephony integration control request information, and performing the computer telephony integration control on the exchange unit to control a connection of an exchange line based on the generated information; and exchange-unit communications unit for communicating with the exchange unit the exchange request information transmitted by said computer telephony integration control execution unit and information relating to the exchange request information.

* * * * *